(12) United States Patent
Shimamoto et al.

(10) Patent No.: US 9,934,911 B2
(45) Date of Patent: Apr. 3, 2018

(54) NONAQUEOUS ELECTROLYTE SOLUTION AND ELECTRICITY STORAGE DEVICE USING SAME

(71) Applicant: UBE INDUSTRIES, LTD., Ube-shi (JP)

(72) Inventors: Kei Shimamoto, Shimonoseki (JP); Koji Abe, Ube (JP); Yuichi Kotou, Ube (JP); Shoji Shikita, Ube (JP)

(73) Assignee: UBE INDUSTRIES, LTD., Ube-shi (JP)

( * ) Notice: Subject to any disclaimer, the term of this patent is extended or adjusted under 35 U.S.C. 154(b) by 173 days.

(21) Appl. No.: 14/781,792

(22) PCT Filed: Mar. 31, 2014

(86) PCT No.: PCT/JP2014/059568
§ 371 (c)(1),
(2) Date: Oct. 1, 2015

(87) PCT Pub. No.: WO2014/163055
PCT Pub. Date: Oct. 9, 2014

(65) Prior Publication Data
US 2016/0027592 A1   Jan. 28, 2016

(30) Foreign Application Priority Data

| Apr. 1, 2013 | (JP) | 2013-076343 |
| Aug. 1, 2013 | (JP) | 2013-160761 |
| Aug. 1, 2013 | (JP) | 2013-160769 |
| Aug. 1, 2013 | (JP) | 2013-160785 |
| Aug. 1, 2013 | (JP) | 2013-160801 |
| Aug. 1, 2013 | (JP) | 2013-160819 |

(51) Int. Cl.

| H01G 11/64 | (2013.01) |
| H01M 10/052 | (2010.01) |
| H01M 10/0567 | (2010.01) |
| H01G 11/58 | (2013.01) |
| H01M 6/16 | (2006.01) |
| H01G 11/06 | (2013.01) |
| H01G 11/38 | (2013.01) |
| H01G 11/42 | (2013.01) |

(Continued)

(52) U.S. Cl.
CPC ............ *H01G 11/64* (2013.01); *H01G 11/06* (2013.01); *H01G 11/38* (2013.01); *H01G 11/42* (2013.01); *H01G 11/58* (2013.01); *H01G 11/60* (2013.01); *H01G 11/62* (2013.01); *H01M 4/131* (2013.01); *H01M 4/133* (2013.01); *H01M 4/134* (2013.01); *H01M 4/386* (2013.01); *H01M 4/485* (2013.01); *H01M 4/505* (2013.01); *H01M 4/525* (2013.01); *H01M 4/587* (2013.01); *H01M 4/623* (2013.01); *H01M 4/625* (2013.01); *H01M 4/661* (2013.01); *H01M 6/168* (2013.01); *H01M 10/052* (2013.01); *H01M 10/0525* (2013.01); *H01M 10/0567* (2013.01); *H01M 10/0568* (2013.01); *H01M 10/0569* (2013.01); *H01M 2004/027* (2013.01); *H01M 2004/028* (2013.01); *H01M 2220/20* (2013.01); *H01M 2220/30* (2013.01); *H01M 2300/004* (2013.01); *H01M 2300/0037* (2013.01); *H01M 2300/0042* (2013.01); *Y02E 60/13* (2013.01); *Y02T 10/7011* (2013.01); *Y02T 10/7022* (2013.01)

(58) Field of Classification Search
None
See application file for complete search history.

(56) References Cited

U.S. PATENT DOCUMENTS

| 6,013,394 A * | 1/2000 | Gan ...................... H01M 4/626 429/220 |
| 6,180,283 B1 * | 1/2001 | Gan ...................... H01M 4/626 429/205 |

(Continued)

FOREIGN PATENT DOCUMENTS

| CN | 102956373 A | 3/2013 |
| EP | 1 109 244 A2 | 6/2001 |

(Continued)

OTHER PUBLICATIONS

Extended European Search Report dated Sep. 12, 2016 in Patent Application No. 14778298.1.

(Continued)

*Primary Examiner* — Scott J. Chmielecki
(74) *Attorney, Agent, or Firm* — Oblon, McClelland, Maier & Neustadt, L.L.P.

(57) ABSTRACT

The present invention provides a nonaqueous electrolytic solution capable of improving electrochemical characteristics in a broad temperature range and an energy storage device using the same. [1] A nonaqueous electrolytic solution having an electrolyte salt dissolved in a nonaqueous solvent, the nonaqueous electrolytic solution containing, as an additive, an $SO_4$ group-containing compound having a specified structure and [2] an energy storage device including a positive electrode, a negative electrode, and a nonaqueous electrolytic solution having an electrolyte salt dissolved in a nonaqueous solvent, wherein the nonaqueous electrolytic solution contains, as an additive, 0.001% by mass or more and less than 5% by mass of an $SO_4$ group-containing compound having a specified structure in the nonaqueous electrolytic solution, are disclosed.

17 Claims, No Drawings

(51) Int. Cl.
*H01G 11/60* (2013.01)
*H01G 11/62* (2013.01)
*H01M 4/131* (2010.01)
*H01M 4/133* (2010.01)
*H01M 4/134* (2010.01)
*H01M 4/38* (2006.01)
*H01M 4/485* (2010.01)
*H01M 4/505* (2010.01)
*H01M 4/525* (2010.01)
*H01M 4/587* (2010.01)
*H01M 4/62* (2006.01)
*H01M 4/66* (2006.01)
*H01M 10/0525* (2010.01)
*H01M 10/0568* (2010.01)
*H01M 10/0569* (2010.01)
*H01M 4/02* (2006.01)

(56) References Cited

U.S. PATENT DOCUMENTS

| | | | | |
|---|---|---|---|---|
| 6,265,106 | B1* | 7/2001 | Gan | H01M 4/626 |
| | | | | 429/205 |
| 6,350,546 | B1* | 2/2002 | Gan | H01M 10/0525 |
| | | | | 429/205 |
| 2001/0006751 | A1* | 7/2001 | Gan | H01M 6/168 |
| | | | | 429/340 |
| 2002/0061450 | A1 | 5/2002 | Tsujioka et al. | |
| 2003/0138702 | A1 | 7/2003 | Gerald, II et al. | |
| 2005/0118512 | A1* | 6/2005 | Onuki | H01M 6/168 |
| | | | | 429/326 |
| 2007/0238025 | A1 | 10/2007 | Onuki et al. | |
| 2008/0102375 | A1* | 5/2008 | Shima | H01M 10/0525 |
| | | | | 429/331 |
| 2008/0138714 | A1* | 6/2008 | Ihara | H01M 6/164 |
| | | | | 429/338 |
| 2010/0015514 | A1 | 1/2010 | Miyagi et al. | |
| 2010/0021823 | A1 | 1/2010 | Onuki et al. | |
| 2010/0216036 | A1 | 8/2010 | Shima | |
| 2010/0227226 | A1 | 9/2010 | Onuki et al. | |
| 2011/0052998 | A1 | 3/2011 | Liang et al. | |
| 2011/0159380 | A1 | 6/2011 | Onuki et al. | |
| 2011/0229771 | A1 | 9/2011 | Onuki et al. | |
| 2012/0040252 | A1 | 2/2012 | Shima | |
| 2012/0045698 | A1 | 2/2012 | Shima | |
| 2013/0022861 | A1 | 1/2013 | Miyagi et al. | |
| 2013/0071733 | A1* | 3/2013 | Abe | H01G 11/58 |
| | | | | 429/200 |
| 2013/0330607 | A1 | 12/2013 | Mizuno et al. | |
| 2015/0221949 | A1 | 8/2015 | Liang et al. | |
| 2016/0126593 | A1 | 5/2016 | Abe et al. | |

FOREIGN PATENT DOCUMENTS

| | | |
|---|---|---|
| EP | 3 012 896 A1 | 4/2016 |
| JP | 5-290844 | 11/1993 |
| JP | 7-23521 | 1/1995 |
| JP | 8-306386 | 11/1996 |
| JP | 9-245833 | 9/1997 |
| JP | 2001 176548 | 6/2001 |
| JP | 2003-68359 | 3/2003 |
| JP | 2004 134232 | 4/2004 |
| JP | 2007-103214 | 4/2007 |
| JP | 2007 184257 | 7/2007 |
| JP | 2007 227367 | 9/2007 |
| JP | 2008 41412 | 2/2008 |
| JP | 2008-71559 | 3/2008 |
| JP | 2008 146983 | 6/2008 |
| JP | 2008-198409 | 8/2008 |
| JP | 2008 198409 | 8/2008 |
| JP | 2008-537841 | 9/2008 |
| JP | 2012-174339 | 9/2012 |
| JP | 2014-209471 | 11/2014 |
| WO | 2006 137224 | 12/2006 |
| WO | 2011 152534 | 12/2011 |
| WO | 2013 024717 | 2/2013 |

OTHER PUBLICATIONS

International Search Report dated Jun. 10, 2014 in PCT/JP14/059568 Filed Mar. 31, 2014.

* cited by examiner

NONAQUEOUS ELECTROLYTE SOLUTION AND ELECTRICITY STORAGE DEVICE USING SAME

TECHNICAL FIELD

The present invention relates to a nonaqueous electrolytic solution capable of improving electrochemical characteristics in a broad temperature range and an energy storage device using the same.

In addition, the present invention relates to a nonaqueous electrolytic solution capable of improving electrochemical characteristics at high temperatures and high voltages and an energy storage device using the same.

BACKGROUND ART

An energy storage device, especially a lithium secondary battery, has been widely used recently for a power source of a small-sized electronic device, such as a mobile telephone, a notebook personal computer, etc., and a power source for an electric vehicle or electric power storage. Since there is a possibility that such an electronic device or a vehicle is used in a broad temperature range, such as a high temperature in midsummer, a low temperature in an extremely cold region, etc., it is demanded to improve electrochemical characteristics with a good balance in a broad temperature range.

In particular, in order to prevent the global warming, it is an urgent need to reduce the $CO_2$ emission. Among eco-friendly vehicles mounted with an energy storage apparatus composed of an energy storage device, such as lithium secondary batteries, capacitors, etc., early dissemination of a hybrid electric vehicle (HEV), a plug-in hybrid electric vehicle (PHEV), or a battery electric vehicle (BEV) is demanded.

Since a vehicle is long in moving distance, there is a possibility that the vehicle is used in regions in a broad temperature range of from a very hot region of the torrid zone to an extremely cold region. In consequence, in particular, these onboard energy storage devices are required such that even when used in a broad temperature range of from high temperatures to low temperatures, the electrochemical characteristics are not worsened.

In the present specification, the term, lithium secondary battery, is used as a concept also including a so-called lithium ion secondary battery.

A lithium secondary battery is mainly constituted of a positive electrode and a negative electrode, each containing a material capable of absorbing and releasing lithium, and a nonaqueous electrolytic solution containing a lithium salt and a nonaqueous solvent, and a carbonate, such as ethylene carbonate (EC), propylene carbonate (PC), etc., is used as the nonaqueous solvent.

In addition, metallic lithium, a metal compound capable of absorbing and releasing lithium (e.g., a metal elemental substance, a metal oxide, an alloy with lithium, etc.), and a carbon material are known as the negative electrode. In particular, a lithium secondary battery using a carbon material capable of absorbing and releasing lithium, such as coke, artificial graphite, natural graphite, etc., is widely put into practical use.

For example, in a lithium secondary battery using, as the negative electrode material, a highly crystallized carbon material, such as natural graphite, artificial graphite, etc., it is known that a decomposition product or gas generated by reductive decomposition of a solvent in a nonaqueous electrolytic solution on the negative electrode surface on charging hinders a desired electrochemical reaction of the battery, so that worsening of cycle properties is possibly caused. When decomposition products of the nonaqueous solvent are accumulated, absorption and release of lithium on the negative electrode may not be performed smoothly, and the electrochemical characteristics when used in a broad temperature range are liable to be worsened.

Furthermore, it is known that a lithium secondary battery using a lithium metal or an alloy thereof, or a metal elemental substance, such as tin, silicon, etc., or an oxide thereof as the negative electrode material may have a high initial battery capacity, but the battery performance thereof, such as battery capacity and cycle properties, may be largely worsened because the micronized powdering may be promoted during cycles, thereby bringing about accelerated reductive decomposition of the nonaqueous solvent, as compared with the negative electrode formed of a carbon material. When such a negative material is micronized, or decomposition products of the nonaqueous solvent are accumulated, absorption and release of lithium on the negative electrode may not be performed smoothly, and the electrochemical characteristics when used in a broad temperature range are liable to be worsened.

Meanwhile, it is known that in a lithium secondary battery using, as a positive electrode material, for example, $LiCoO_2$, $LiMn_2O_4$, $LiNiO_2$, $LiFePO_4$, etc., on an interface between the positive electrode material and the nonaqueous electrolytic solution in such a state that the nonaqueous solvent in the nonaqueous electrolytic solution is charged, a decomposition product or gas generated by a partial oxidative decomposition which is caused locally hinders a desired electrochemical reaction of the battery, and therefore, the electrochemical characteristics when used in a broad temperature range are liable to be worsened, too.

In the light of the above, the battery performance was worsened due to the matter that the movement of a lithium ion is hindered or the battery is expanded by a decomposition product or gas when the nonaqueous electrolytic solution is decomposed on the positive electrode or negative electrode. Irrespective of such a situation, the multifunctionality of electronic devices on which lithium secondary batteries are mounted is more and more advanced, and power consumption tends to increase. For that reason, the capacity of lithium secondary battery is thus being much increased, and the space volume for the nonaqueous electrolytic solution in the battery is decreased by increasing the density of the electrode, or reducing the useless space volume in the battery, or the like. In consequence, it is a situation that the electrochemical characteristics when used in a broad temperature range are liable to be worsened due to even a bit of decomposition of the nonaqueous electrolytic solution.

PTL 1 proposes a nonaqueous electrolyte secondary battery containing a sulfuric acid ester compound, such as dimethyl sulfate, etc., for the purpose of increasing cycle properties and suggests that in view of the fact that such a compound reacts on the negative electrode surface to form a surface film, the cycle properties are improved.

PTL 2 proposes an electrochemical battery containing a sulfuric acid ester compound, such as methyl sulfate, etc., for the purpose of improving a first cycle irreversible capacity and keeping a low-temperature cycle capacity and suggests that in view of the fact that such a compound reacts on the negative electrode surface to form a surface film, the first cycle irreversible capacity is improved.

PTL 3 proposes a secondary battery containing, as an anionic active agent, an alkyl sulfate, such as lithium dodecylsulfate, etc., for the purpose of improving high-rate discharging properties and suggests that by improving wettability of the negative electrode, the high-rate discharging properties are improved.

PTL 4 proposes a secondary battery containing a cyclic disulfonic acid ester and a surfactant for the purpose of improving a long-term cycle life and suggests that wettability of an electrolytic solution to a negative electrode is improved so that the cyclic disulfonic acid ester penetrates into details, whereby SEI is uniformly formed and the cycle properties are improved.

In general, as an electrolyte salt which is used for energy storage devices, such as lithium secondary batteries, etc., an electrolyte having sufficient solubility in an organic solvent, for example, $LiPF_6$, $LiBF_4$, $LiClO_4$, $LiN(SO_2CF_3)_2$, $LiN(SO_2C_2F_5)_2$, $LiCF_3SO_3$, etc., is selected, and of those, especially, $LiPF_6$ is widely used (PTLs 5 and 6, etc.).

PTL 7 discloses a nonaqueous electrolytic solution containing $LiPF_6$ as a main lithium salt, to which a small amount of a perfluoroalkane sulfonic acid salt, such as lithium perfluorobutanesulfonate (LiPFBS), etc. and indicates that not only the charging and discharging cycle properties may be improved, but also the time for injecting the electrolytic solution into a battery may be shortened.

CITATION LIST

Patent Literature

PTL 1: JP-A 9-245833
PTL 2: JP-A 2001-176548
PTL 3: JP-A 8-306386
PTL 4: JP-A 2008-71559
PTL 5: JP-A 5-290844
PTL 6: JP-A 7-235321
PTL 7: JP-A 2008-198409

SUMMARY OF INVENTION

Technical Problem

A problem of the present invention is to provide a nonaqueous electrolytic solution capable of improving electrochemical characteristics in a broad temperature range, and an energy storage device using the same.

In addition, a problem of the present invention is to provide a nonaqueous electrolytic solution capable of improving electrochemical characteristics at high temperatures and high voltages, and an energy storage device using the same.

Solution to Problem

The present inventors made extensive and intensive investigations regarding the performances of the nonaqueous electrolytic solutions of the aforementioned conventional techniques. As a result, in the nonaqueous electrolyte secondary batteries of PTLs 1 to 7, it was the actual situation that the effects may not be substantially exhibited with respect to the problem that the electrochemical characteristics in a broad temperature range, such as low-temperature discharging properties after high-temperature storage, etc., are improved.

Then, in order to solve the foregoing problem, the present inventors made extensive and intensive investigations. As a result, it has been found that in a nonaqueous electrolytic solution having an electrolyte salt dissolved in a nonaqueous solvent, by incorporating a specified $SO_4$ group-containing compound, electrochemical characteristics of an energy storage device, especially electrochemical characteristics of a lithium battery in a broad temperature range may be improved, leading to accomplishment of the present invention. Such an effect is not suggested at all in PTLs 1 to 7.

Though $LiPF_6$ is excellent in solubility in an organic solvent, it involves problems in heat resistance, hydrolysis properties, and the like, and especially, it was the actual situation that $LiPF_6$ may not substantially bring about an effect with respect to a problem of improving a gas generation suppressing effect at high temperatures and high voltages. Even if a perfluoroalkanesulfonate represented by $LiCF_3SO_3$ is added to a nonaqueous electrolytic solution using $LiPF_6$ as a main lithium salt, the foregoing problem could not be solved.

Then, in order to solve the foregoing problem, the present inventors made extensive and intensive investigations. As a result, it has been found that in a nonaqueous electrolytic solution having an electrolyte salt dissolved in a nonaqueous solvent, by incorporating a specified $SO_4$ group-containing compound in a specified addition amount, electrochemical characteristics of an energy storage device, especially electrochemical characteristics of a lithium battery at high temperatures and high voltages may be improved.

Specifically, the present invention provides the following (1) and (2).

(1) A nonaqueous electrolytic solution having an electrolyte salt dissolved in a nonaqueous solvent, the nonaqueous electrolytic solution comprising, as an additive, at least one selected from $SO_4$ group-containing compounds represented by any one of the following general formulae (I) to (IV):

(I)

wherein $L^1$ represents an alkyl group having 1 to 12 carbon atoms, an alkoxyalkyl group having 2 to 12 carbon atoms, an aryl group having 6 to 12 carbon atoms, an alkenyl group having 2 to 7 carbon atoms, an alkynyl group having 3 to 8 carbon atoms, a linear or cyclic ester group having 3 to 18 carbon atoms, a sulfur atom-containing organic group having 1 to 6 carbon atoms, a silicon atom-containing organic group having 4 to 10 carbon atoms, a cyano group-containing organic group having 2 to 7 carbon atoms, a phosphorus atom-containing organic group having 2 to 12 carbon atoms, a —P(=O)F$_2$ group, an alkylcarbonyl group having 2 to 7 carbon atoms, or an arylcarbonyl group having 7 to 13 carbon atoms, provided that each of the alkyl group, the alkoxyalkyl group, the alkenyl group, the alkynyl group, and the alkylcarbonyl group is straight-chain or branched, and in each of the alkyl group, the alkoxyalkyl group, the aryl group, the ester group, the sulfur atom-containing organic group, the phosphorus atom-containing organic group, the alkylcarbonyl group, and the arylcarbonyl group, at least one hydrogen atom may be substituted with a halogen atom;

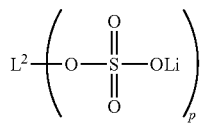
(II)

wherein $L^2$ represents a p-valent hydrocarbon connecting group which may contain an ether bond, a thioether bond, or an $—S(=O)_2—$ bond, and p is an integer of 2 to 4, provided that at least one hydrogen atom which $L^2$ has may be substituted with a halogen atom;

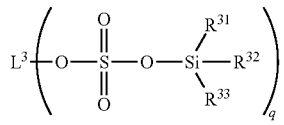
(III)

wherein each of $R^{31}$ to $R^{33}$ independently represents an alkyl group having 1 to 12 carbon atoms, an alkenyl group having 2 to 3 carbon atoms, or an aryl group having 6 to 8 carbon atoms, and q is an integer of 1 to 4, when q is 1, then $R^{31}$ may be $—OSO_3—R^{37}$, and $R^{37}$ is synonymous with $R^{31}$, when q is 1, then $L^3$ represents an alkyl group having 1 to 12 carbon atoms, an alkenyl group having 2 to 6 carbon atoms, an alkynyl group having 3 to 6 carbon atoms, an alkoxyalkyl group having 2 to 12 carbon atoms, a $—CR^{34}R^{35}C(=O)OR^{36}$ group, or an aryl group having 6 to 12 carbon atoms, and when q is 2 to 4, then $L^3$ represents a q-valent hydrocarbon connecting group which may contain an ether bond, a thioether bond, or an $—S(=O)_2—$ bond, each of $R^{34}$ and $R^{35}$ independently represents a hydrogen atom, a halogen atom, or an alkyl group having 1 to 4 carbon atoms, and $R^{36}$ represents an alkyl group having 1 to 8 carbon atoms, an alkenyl group having 2 to 6 carbon atoms, or an alkynyl group having 3 to 6 carbon atoms, and in each of the alkyl group and the aryl group represented by $L^3$, and the alkyl group represented by each of $R^{34}$ to $R^{36}$, at least one hydrogen atom may be substituted with a halogen atom; and

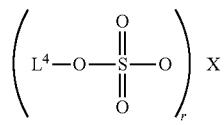
(IV)

wherein $L^4$ represents an alkyl group having 1 to 12 carbon atoms, an alkenyl group having 2 to 6 carbon atoms, an alkynyl group having 3 to 6 carbon atoms, an alkoxyalkyl group having 2 to 12 carbon atoms, a $—CR^{41}R^{42}C(=O)OR^{43}$ group, or an aryl group having 6 to 12 carbon atoms, X represents an $SiR^{44}R^{45}$ group, a quaternary onium, an alkali metal belonging to the third or fourth period of the Periodic Table, or an alkaline earth metal belonging to the third or fourth period of the Periodic Table, and r is an integer of 1 or 2, provided that when X is a quaternary onium or an alkali metal belonging to the third or fourth period of the Periodic Table, then r is 1, and when X is an $SiR^{44}R^{45}$ group or an alkaline earth metal belonging to the third or fourth period of the Periodic Table, then r is 2, each of $R^{41}$ and $R^{42}$ independently represents a hydrogen atom, a halogen atom, or an alkyl group having 1 to 4 carbon atoms, $R^{43}$ represents an alkyl group having 1 to 8 carbon atoms, an alkenyl group having 2 to 6 carbon atoms, or an alkynyl group having 3 to 6 carbon atoms, and each of $R^{44}$ and $R^{45}$ independently represents an alkyl group having 1 to 12 carbon atoms, an alkenyl group having 2 to 3 carbon atoms, or an aryl group having 6 to 8 carbon atoms, and in each of the alkyl group and the aryl group, at least one hydrogen atom may be substituted with a halogen atom.

The Periodic Table as referred to in the present specification means a generally used Long Periodic Table.

(2) An energy storage device comprising a positive electrode, a negative electrode, and a nonaqueous electrolytic solution having an electrolyte salt dissolved in a nonaqueous solvent, wherein the nonaqueous electrolytic solution contains, as an additive, 0.001% by mass or more and less than 5% by mass of at least one selected from the $SO_4$ group-containing compounds represented by any one of the foregoing general formulae (I) to (IV) in the nonaqueous electrolytic solution.

Advantageous Effects of Invention

According to the present invention, it is possible to provide a nonaqueous electrolytic solution capable of improving electrochemical characteristics of an energy storage device in a broad temperature range, especially low-temperature discharging properties after high-temperature storage and an energy storage device using the same, such as a lithium battery, etc.

In addition, according to the present invention, it is possible to provide a nonaqueous electrolytic solution capable of improving electrochemical characteristics of an energy storage device at high temperatures and high voltages, especially a gas generation suppressing effect at high temperatures and high voltages, and an energy storage device using the same, such as a lithium battery, etc.

DESCRIPTION OF EMBODIMENTS

The present invention relates to a nonaqueous electrolytic solution and an energy storage device using the same.

[Nonaqueous Electrolytic Solution]

The nonaqueous electrolytic solution of the present invention is a nonaqueous electrolytic solution having an electrolyte salt dissolved in a nonaqueous solvent, the nonaqueous electrolytic solution comprising, as an additive, at least one selected from $SO_4$ group-containing compounds represented by any one of the foregoing general formulae (I) to (IV).

Although the reason why the nonaqueous electrolytic solution of the present invention is capable of significantly improving electrochemical characteristics of an energy storage device in a broad temperature range has not always been elucidated yet, the following may be considered.

The $SO_4$ group-containing compound which is used in the present invention is a compound in which one hydrogen atom of sulfuric acid is substituted with an alkyl group, an alkoxyalkyl group, an aryl group, an alkenyl group, an alkynyl group, a linear or cyclic ester group, an alkylcarbonyl group, an arylcarbonyl group, a sulfur atom-containing organic group, a silicon atom-containing organic group, a cyano group-containing organic group, or a phosphorus atom-containing organic group, each having a specified carbon number, or a $—P(=O)F_2$ group, and the other hydrogen atom of sulfuric acid is substituted with an alkali metal, such as lithium, etc., an alkaline earth metal, such as magnesium, etc., a quaternary onium, or a silyl group. According to this characteristic feature on chemical structure, a part of the $SO_4$ group-containing compound of the present invention is decomposed on a negative electrode, thereby forming a surface film and is also decomposed on a positive electrode, thereby forming a surface film with low electric resistance. It may be considered that in view of the fact that the surface film is formed on both the positive electrode and the negative electrode in this way, the effect for improving electrochemical characteristics in a broad temperature range, the effect being not seen in a dialkyl sulfate in which the both hydrogen atoms of sulfuric acid are substituted with an alkyl group, or a monoalkyl sulfate in which only one hydrogen of sulfuric acid is substituted with an alkyl group, is more increased. In particular, since the monoalkyl sulfate is a strong acid, the metal elution of the positive electrode is accelerated at the time of high-temperature storage, whereby the capacity is greatly decreased. However, it has become clear that since the $SO_4$ group-containing compound of the present invention is not a strong acid, the electrochemical characteristics of an energy storage device may be remarkably improved in a broad temperature range.

Other $SO_4$ group-containing compound which is used in the present invention is a compound in which plural $SO_4$ groups in which one hydrogen atom of sulfuric acid is substituted with lithium or a silyl group are connected with each other via a hydrocarbon group. According to this characteristic feature on chemical structure, a part of the $SO_4$ group-containing compound of the present invention is decomposed on a negative electrode, thereby forming a surface film and is also decomposed on a positive electrode, thereby forming a surface film with low electric resistance. As a result, similar to the foregoing, it may be considered that the effect for improving electrochemical characteristics in a broad temperature range has been much more increased.

Though the reason why the nonaqueous electrolytic solution of the present invention using, as the $SO_4$ group-containing compound represented by the general formula (I), a halogen-substituted $SO_4$ group-containing compound represented by the general formula (I-3) as described later is capable of significantly improving electrochemical characteristics of an energy storage device at high temperatures and high voltages has not always been elucidated yet, the following may be considered.

$LiPF_6$ which is generally used as a main electrolyte salt is liable to be decomposed, and especially, the decomposition proceeds at high temperatures and high voltages, whereby a hydrogen fluoride concentration in the electrolytic solution increases, and the nonaqueous solvent is decomposed, resulting in worsening of the electrochemical characteristics. In the case where the $SO_4$ group-containing compound which is used in the present invention is a fluorine-containing mono-substituted lithium sulfate in which one hydrogen atom of sulfuric acid is substituted with an alkyl group in which at least one hydrogen atom is substituted with a halogen atom, an alkoxyalkyl group in which at least one hydrogen atom is substituted with a halogen atom, or an aryl group in which at least one hydrogen atom is substituted with a halogen atom, and the other hydrogen atom is substituted with lithium, the fluorine-containing mono-substituted lithium sulfate is high in solubility in the electrolytic solution and also high in stability at high temperatures. For this reason, it has been understood that by substituting the whole or a part of $LiPF_6$ as the main electrolyte salt with a halogen atom, the effect for improving electrochemical characteristics in a much broader temperature range is increased because the halogen atom concentration in the electrolytic solution does not increase, or the nonaqueous solvent is not decomposed.

The $SO_4$ group-containing compound which is contained in the nonaqueous electrolytic solution of the present invention is represented by any one of the foregoing general formulae (I) to (IV).

The $SO_4$ group-containing compound represented by any one of the general formulae (I) to (IV) is hereunder successively explained.

[$SO_4$ Group-Containing Compounds Represented by the General Formula (I)]

(I)

In the general formula (I), $L^1$ represents an alkyl group having 1 to 12 carbon atoms, an alkoxyalkyl group having 2 to 12 carbon atoms, an aryl group having 6 to 12 carbon atoms, an alkenyl group having 2 to 7 carbon atoms, an alkynyl group having 3 to 8 carbon atoms, a linear or cyclic ester group having 3 to 18 carbon atoms, a sulfur atom-containing organic group having 1 to 6 carbon atoms, a silicon atom-containing organic group having 4 to 10 carbon atoms, a cyano group-containing organic group having 2 to 7 carbon atoms, a phosphorus atom-containing organic group having 2 to 12 carbon atoms, a —P(=O)F$_2$ group, an alkylcarbonyl group having 2 to 7 carbon atoms, or an arylcarbonyl group having 7 to 13 carbon atoms.

However, each of the alkyl group, the alkoxyalkyl group, the alkenyl group, the alkynyl group, and the alkylcarbonyl group is straight-chain or branched, and in each of the alkyl group, the alkoxyalkyl group, the aryl group, the ester group, the sulfur atom-containing organic group, the phosphorus atom-containing organic group, the alkylcarbonyl group, and the arylcarbonyl group, at least one hydrogen atom may be substituted with a halogen atom.

Suitable examples of the $SO_4$ group-containing compound represented by the general formula (I) include compounds represented by the following general formula (I-1):

(I-1)

In the formula (I-1), $L^{11}$ represents an alkyl group having 1 to 12 carbon atoms, an alkoxyalkyl group having 2 to 12 carbon atoms, or an aryl group having 6 to 12 carbon atoms, provided that, in each of the alkyl group, the alkoxyalkyl group, and the aryl group, at least one hydrogen atom may be substituted with a halogen atom.

In the foregoing general formula (I-1), $L^{11}$ is preferably a straight-chain or branched alkyl group having 1 to 8 carbon atoms, in which at least one hydrogen atom may be substituted with a halogen atom, an alkoxyalkyl group having 2 to 8 carbon atoms, in which at least one hydrogen atom may be substituted with a halogen atom, or an aryl group having 6 to 10 carbon atoms, in which at least one hydrogen atom may be substituted with a halogen atom; more preferably a straight-chain or branched alkyl group having 1 to 6 carbon atoms, in which at least one hydrogen atom may be substituted with a halogen atom, an alkoxyalkyl group having 2 to 6 carbon atoms, or an aryl group having 6 to 9 carbon atoms, in which at least one hydrogen atom may be substituted with a halogen atom; and still more preferably a straight-chain or branched alkyl group having 1 to 5 carbon atoms, and preferably 1 to 4 carbon atoms, in which at least one hydrogen atom may be substituted with a halogen atom, an alkoxyalkyl group having 2 to 4 carbon atoms, in which at least one hydrogen atom may be substituted with a halogen atom, or an aryl group having 6 to 8 carbon atoms, in which at least one hydrogen atom may be substituted with a halogen atom.

As specific examples of $L^{11}$, there are suitably exemplified a straight-chain alkyl group, such as a methyl group, an ethyl group, an n-propyl group, an n-butyl group, an n-pentyl group, an n-hexyl group, an n-heptyl group, an n-octyl group, an n-decyl group, an n-dodecyl group, etc.; a branched alkyl group, such as an isopropyl group, a sec-butyl group, a tert-butyl group, a tert-amyl group, a 2-ethylhexyl group, etc.; a fluoroalkyl group, such as a fluoromethyl group, a difluoromethyl group, a trifluoromethyl group, a 2-fluoroethyl group, a 2,2-difluoroethyl group, a 2,2,2-trifluoroethyl group, a 3-fluoropropyl group, a 3,3-difluoropropyl group, a 3,3,3-trifluoropropyl group, a 2,2,3,3-tetrafluoropropyl group, a 2,2,3,3,3-pentafluoropropyl group, a 1,1,1,3,3,3-hexafluoro-2-propyl group, etc.; an alkoxyalkyl group, such as a methoxymethyl group, an ethoxymethyl group, a methoxyethyl group, an ethoxyethyl group, an n-propoxyethyl group, an n-butoxyethyl group, an n-hexyloxyethyl group, a methoxypropyl group, an ethoxypropyl group, etc.; a fluoroalkoxyalkyl group, such as a fluoromethoxymethyl group, a difluoromethoxymethyl group, a trifluoromethoxymethyl group, a 2-fluoroethoxymethyl group, a 2,2-difluoroethoxymethyl group, a 2,2,2-trifluoroethoxymethyl group, a fluoromethoxyethyl group, a difluoromethoxyethyl group, a trifluoromethoxyethyl group, a 2-fluoroethoxyethyl group, a 2,2-difluoroethoxyethyl group, a 2,2,2-trifluoroethoxymethyl group, etc.; and an aryl group, such as a phenyl group, a 2-methylphenyl group, a 3-methylphenyl group, a 4-methylphenyl group, a 4-tert-butylphenyl group, a 2-fluorophenyl group, a 4-fluorophenyl group, a 4-trifluoromethylphenyl group, a 2,4-difluorophenyl group, a perfluorophenyl group, etc.

Of those, a methyl group, an ethyl group, an n-propyl group, an n-butyl group, an n-pentyl group, an n-hexyl group, an n-heptyl group, an n-octyl group, an isopropyl group, a sec-butyl group, a trifluoromethyl group, a 2,2,2-trifluoroethyl group, a 2,2,3,3-tetrafluoropropyl group, a methoxyethyl group, an ethoxyethyl group, an n-propoxyethyl group, an n-butoxyethyl group, an n-hexyloxyethyl group, a methoxypropyl group, an ethoxypropyl group, a fluoromethoxyethyl group, a 2,2,2-trifluoroethoxymethyl group, a phenyl group, a 4-methylphenyl group, a 4-fluorophenyl group, and a perfluorophenyl group are preferred; a methyl group, an ethyl group, an n-propyl group, an n-butyl group, an n-pentyl group, an n-hexyl group, an isopropyl group, a sec-butyl group, a trifluoromethyl group, a 2,2,2-trifluoroethyl group, a methoxyethyl group, an ethoxyethyl group, an n-propoxyethyl group, an n-butoxyethyl group, a methoxypropyl group, an ethoxypropyl group, a phenyl group, a 4-methylphenyl group, a 4-fluorophenyl group, and a perfluorophenyl group are more preferred; and a methyl group, an ethyl group, an n-propyl group, an n-butyl group, an isopropyl group, a 2,2,2-trifluoroethyl group, a 2,2,3,3-tetrafluoropropyl group, a methoxyethyl group, a methoxypropyl group, a phenyl group, and a 4-fluorophenyl group are still more preferred.

Specifically, examples of the $SO_4$ group-containing compound represented by the foregoing general formula (I-1) include the following compounds.

There are suitably exemplified lithium methyl sulfate, lithium ethyl sulfate, lithium propyl sulfate, lithium butyl sulfate, lithium pentyl sulfate, lithium hexyl sulfate, lithium heptyl sulfate, lithium octyl sulfate, lithium decyl sulfate, lithium dodecyl sulfate, lithium isopropyl sulfate, lithium sec-butyl sulfate, lithium tert-butyl sulfate, lithium tert-amyl sulfate, lithium 2-ethylhexyl sulfate, lithium fluoromethyl sulfate, lithium difluoromethyl sulfate, lithium trifluoromethyl sulfate, lithium 2-fluoroethyl sulfate, lithium 2,2-difluoroethyl sulfate, lithium 2,2,2-trifluoroethyl sulfate, lithium 3-fluoropropyl sulfate, lithium 3,3-difluoropropyl sulfate, lithium 3,3,3-trifluoropropyl sulfate, lithium 2,2,3,3-tetrafluoropropyl sulfate, lithium 2,2,3,3,3-pentafluoropropyl sulfate, lithium 1,1,3,3,3-hexafluoro-2-propyl sulfate, lithium methoxymethyl sulfate, lithium ethoxymethyl sulfate, lithium methoxyethyl sulfate, lithium ethoxyethyl sulfate, lithium n-propoxyethyl sulfate, lithium n-butoxyethyl sulfate, lithium n-hexyloxyethyl sulfate, lithium methoxypropyl sulfate, lithium ethoxypropyl sulfate, lithium fluoromethoxymethyl sulfate, lithium difluoromethoxymethyl sulfate, lithium trifluoromethoxymethyl sulfate, lithium 2-fluoroethoxymethyl sulfate, lithium 2,2-difluoroethoxymethyl sulfate, lithium 2,2,2-trifluoroethoxymethyl sulfate, lithium fluoromethoxyethyl sulfate, lithium difluoromethoxyethyl sulfate, lithium trifluoromethoxyethyl sulfate, lithium 2-fluoroethoxydethyl sulfate, lithium 2,2-difluoroethoxyethyl sulfate, lithium 2,2,2-trifluoroethoxyethyl sulfate, lithium phenyl sulfate, lithium 2-methylphenyl sulfate, lithium 3-methylphenyl sulfate, lithium 4-methylphenyl sulfate, lithium 4-tert-butylphenyl sulfate, lithium 2-fluorophenyl sulfate, lithium 4-fluorophenyl sulfate, lithium 4-trifluoromethylphenyl sulfate, lithium 2,4-difluorophenyl sulfate, and lithium perfluorophenyl sulfate.

Of the $SO_4$ group-containing compounds represented by the foregoing general formula (I-1), one or more selected from lithium methyl sulfate, lithium ethyl sulfate, lithium propyl sulfate, lithium butyl sulfate, lithium pentyl sulfate, lithium hexyl sulfate, lithium heptyl sulfate, lithium octyl sulfate, lithium isopropyl sulfate, lithium sec-butyl sulfate, lithium trifluoromethyl sulfate, lithium 2,2,2-trifluoroethyl sulfate, lithium 2,2,3,3-tetrafluoropropyl sulfate, lithium 1,1,3,3,3-hexafluoro-2-propyl sulfate, lithium methoxyethyl sulfate, lithium ethoxyethyl sulfate, lithium methoxypropyl sulfate, lithium phenyl sulfate, lithium 4-methylphenyl sulfate, lithium 4-fluorophenyl sulfate, and lithium perfluorophenyl sulfate are more preferred.

In the nonaqueous electrolytic solution of the present invention, a content of the $SO_4$ group-containing compound represented by the foregoing general formula (I-1), which is contained in the nonaqueous electrolytic solution, is preferably 0.001% by mass or more and less than 5% by mass in terms of an additive in the nonaqueous electrolytic solution. So long as the content is less than 5% by mass, there is less concern that a surface film is excessively formed on the electrode, thereby worsening the low-temperature properties, and so long as the content is 0.001% by mass or more, the formation of a surface film is satisfactory, and the effect for improving high-temperature storage properties is increased. Thus, the foregoing range is preferred. The content is more preferably 0.05% by mass or more, and still more preferably 0.1% by mass or more in the nonaqueous electrolytic solution. Its upper limit is more preferably 3% by mass or less, and still more preferably 1% by mass or less.

Other suitable examples of the $SO_4$ group-containing compound represented by the general formula (I) include compounds represented by the following general formula (I-2):

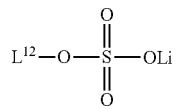
(I-2)

In the formula (I-2), $L^{12}$ represents a straight-chain or branched alkenyl group having 2 to 7 carbon atoms, a straight-chain or branched alkynyl group having 3 to 8 carbon atoms, a linear or cyclic ester group having 3 to 18 carbon atoms, a linear or cyclic carbonate group having 3 to 18 carbon atoms, a sulfur atom-containing organic group having 1 to 6 carbon atoms, a silicon atom-containing organic group having 4 to 10 carbon atoms, a cyano group-containing organic group having 2 to 7 carbon atoms, a phosphorus atom-containing organic group having 2 to 12 carbon atoms, a —P(=O)F$_2$ group, an alkylcarbonyl group having 2 to 7 carbon atoms, or an arylcarbonyl group having 7 to 13 carbon atoms, provided that each of the alkenyl group, the alkynyl group, and the alkylcarbonyl group is straight-chain or branched, and in each of the ester group, the sulfur atom-containing organic group, the phosphorus atom-containing organic group, the alkylcarbonyl group, and the arylcarbonyl group, at least one hydrogen atom may be substituted with a halogen atom.

As specific examples of $L^{12}$, there are suitably exemplified the following groups.

(i) The case where $L^{12}$ is a straight-chain or branched alkenyl group having 2 to 7 carbon atoms:

As such an alkenyl group, a straight-chain or branched alkenyl group having 2 to 6 carbon atoms is preferred, and a straight-chain or branched alkenyl group having 2 to 5 carbon atoms is more preferred. Above all, a straight-chain alkenyl group, such as a vinyl group, a 2-propenyl group, a 2-butenyl group, a 3-butenyl group, a 4-pentenyl group, etc., and a branched alkenyl group, such as a 2-methyl-2-propenyl group, a 2-methyl-2-butenyl group, a 3-methyl-2-butenyl group, etc., are preferred, and a vinyl group and a 2-propenyl group are more preferred.

(ii) The case where $L^{12}$ is a straight-chain or branched alkynyl group having 3 to 8 carbon atoms:

As such an alkynyl group, a straight-chain or branched alkynyl group having 3 to 6 carbon atoms is preferred, and a straight-chain or branched alkynyl group having 3 to 5 carbon atoms is more preferred. Above all, a straight-chain alkynyl group, such as a 2-propynyl group, a 2-butynyl group, a 3-butynyl group, a 4-pentynyl group, a 5-hexynyl group, etc., and a branched alkynyl group, such as a 1-methyl-2-propynyl group, a 1-methyl-2-butynyl group, a 1,1-dimethyl-2-propynyl group, etc., are preferred, and a 2-propynyl group and a 1-methyl-2-propynyl group are more preferred.

(iii) The case where $L^{12}$ is a linear or cyclic ester group having 3 to 18 carbon atoms:

As such an ester group, substituents having a linear or cyclic ester group having 3 to 15 carbon atoms are preferred, and substituents having a linear or cyclic ester group having 3 to 10 carbon atoms, as represented by the following [Chem. 8] or [Chem. 9] are more preferred.

* in the formulae of the substituents shown in [Chem. 8] or [Chem. 9] represents a binding site in the foregoing formula (I-2), hereinafter the same.

[Chem. 8]

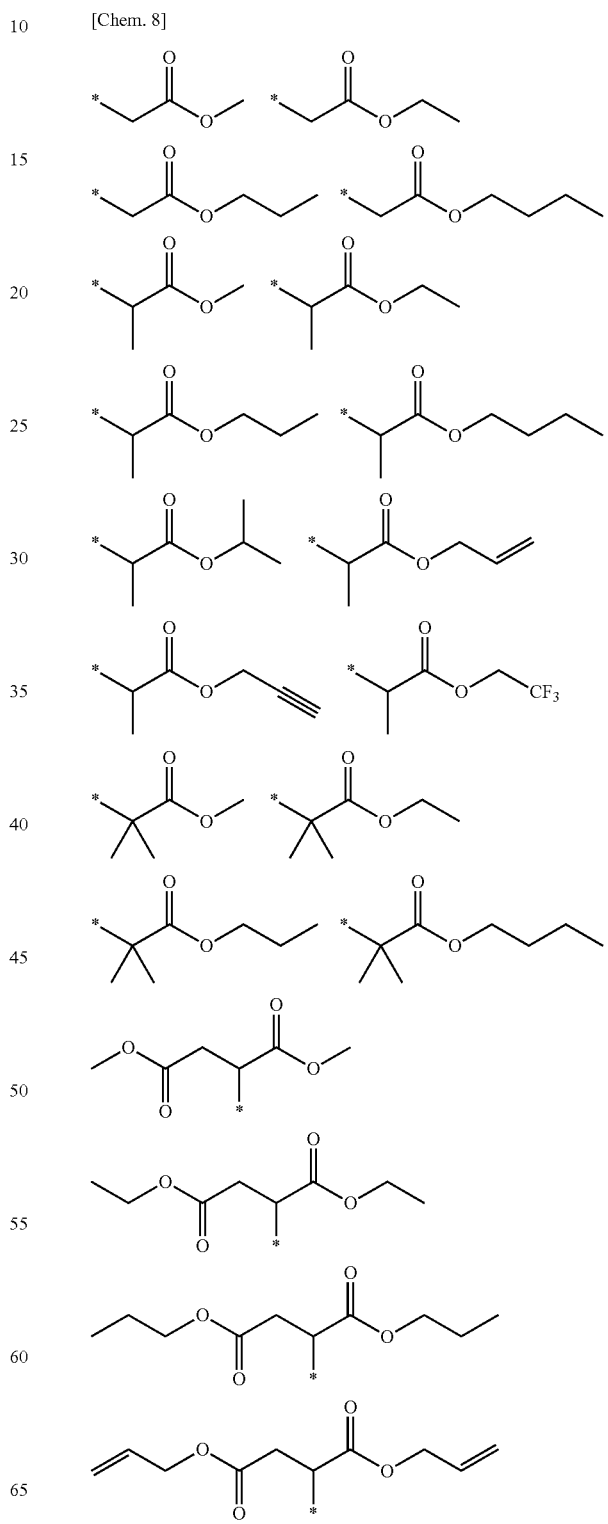

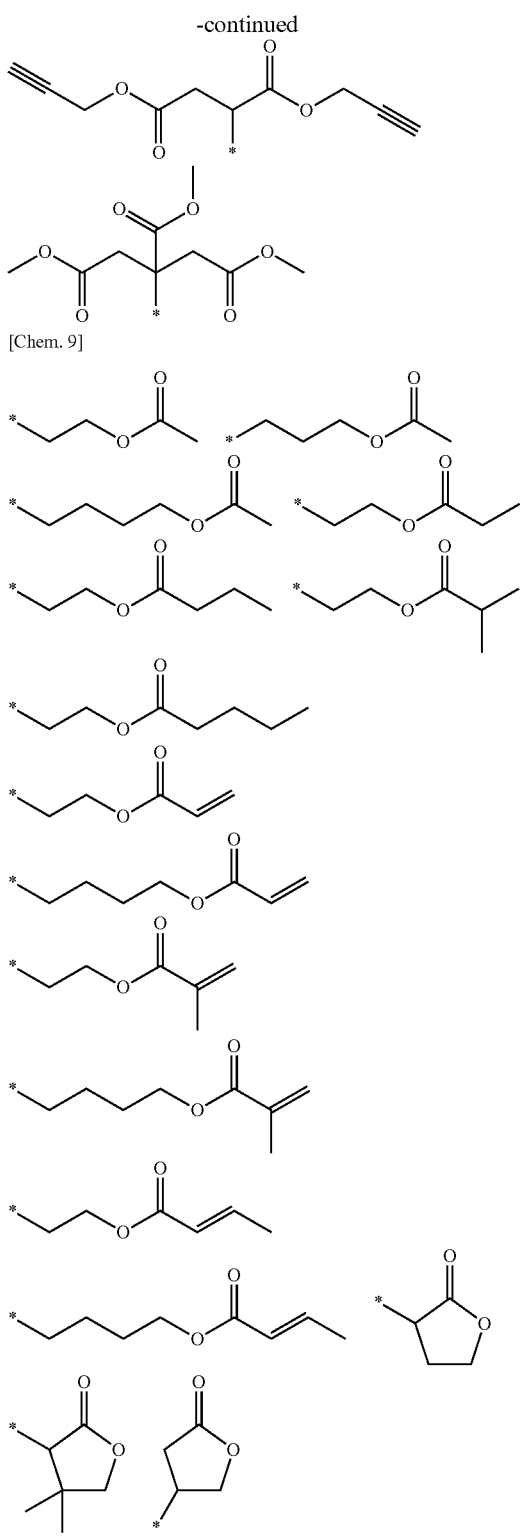

[Chem. 9]

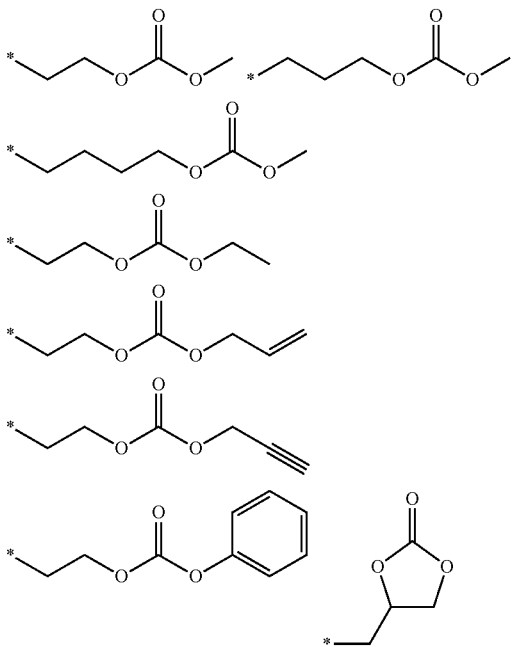

[Chem. 10]

(v) The case where $L^{12}$ is a sulfur atom-containing organic group having 1 to 6 carbon atoms:

As such an organic group, substituents having a sulfur atom-containing organic group having preferably 1 to 5 carbon atoms, more preferably 1 to 4 carbon atoms, and still more preferably 3 to 4 carbon atoms are preferred. As especially preferred groups, there are exemplified the following groups.

[Chem. 11]

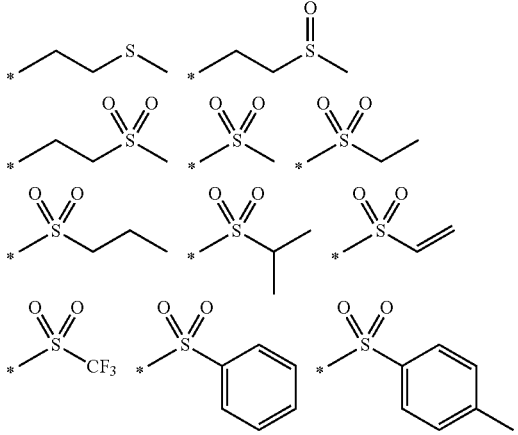

(iv) The case where $L^{12}$ is a linear or cyclic carbonate group having 3 to 18 carbon atoms:

As such a carbonate group, substituents having a linear or cyclic carbonate group having preferably 3 to 10 carbon atoms, and more preferably 3 to 8 carbon atoms are preferred. As especially preferred groups, there are exemplified the following groups.

(vi) The case where $L^{12}$ is a silicon atom-containing organic group having 4 to 10 carbon atoms:

As such an organic group, substituents having a silicon atom-containing organic group having preferably 4 to 9 carbon atoms, and more preferably 4 to 7 carbon atoms are preferred. As especially preferred groups, there are exemplified the following groups.

[Chem. 12]

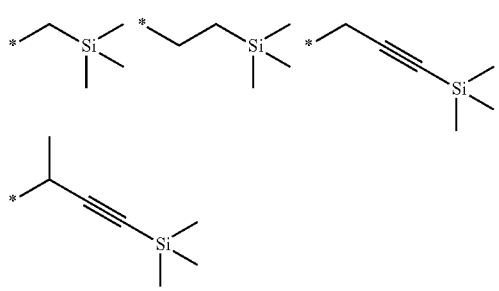

(vii) The case where $L^{12}$ is a cyano group-containing organic group having 2 to 7 carbon atoms:

As such an organic group, substituents having a cyano group-containing organic group having preferably 2 to 6 carbon atoms, and more preferably 2 to 5 carbon atoms are preferred. As especially preferred groups, there are exemplified the following groups.

[Chem. 13]

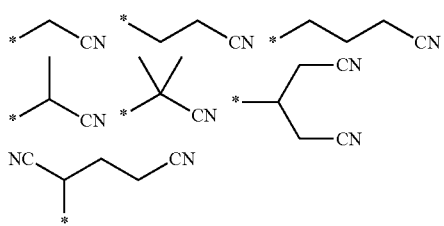

(viii) The case where $L^{12}$ is a phosphorus atom-containing organic group having 2 to 12 carbon atoms or a —P(=O)F$_2$ group:

As such an organic group, substituents having a phosphorus atom-containing organic group having preferably 2 to 10 carbon atoms, and more preferably 3 to 8 carbon atoms and a —P(=O)F$_2$ group are preferred. As especially preferred groups, there are exemplified the following groups.

[Chem. 14]

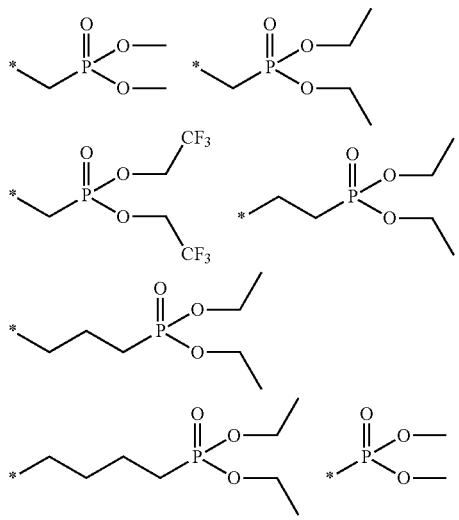

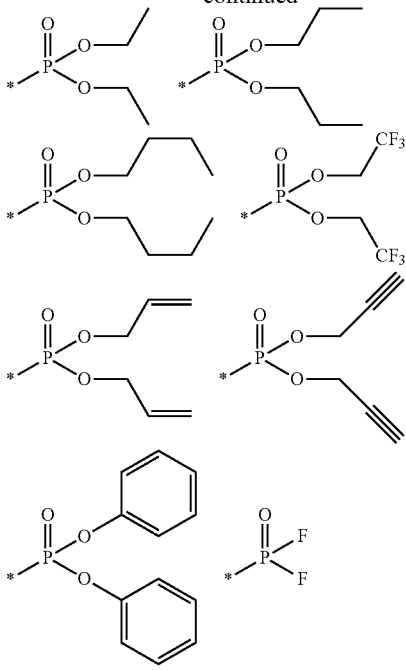

(ix) The case where $L^{12}$ is an alkylcarbonyl group having 2 to 7 carbon atoms or an arylcarbonyl group having 7 to 13 carbon atoms:

As such an organic group, an alkylcarbonyl group having 2 to 5 carbon atoms and an arylcarbonyl group having 7 to 10 carbon atoms are preferred, and an alkylcarbonyl group having 2 to 3 carbon atoms and an arylcarbonyl group having 7 to 8 carbon atoms are more preferred. As especially preferred groups, there are exemplified the following groups.

[Chem. 15]

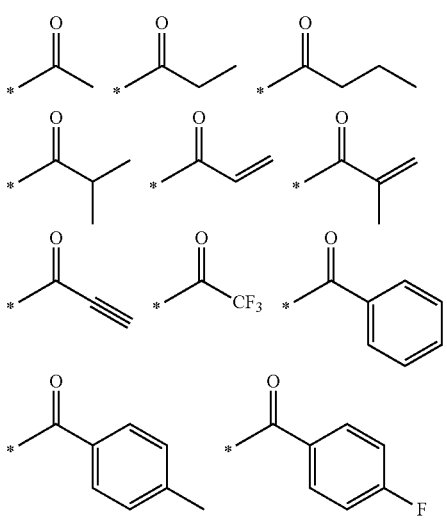

Specifically, suitable examples of the SO$_4$ group-containing compound represented by the foregoing general formula (I-2) include the following compounds.

(A) Compounds in which $L^{12}$ is a straight-chain or branched alkenyl group:

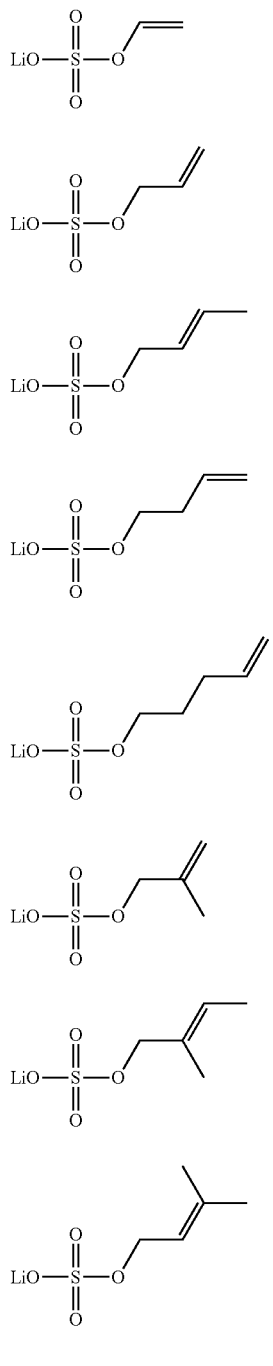
(B) Compounds in which $L^{12}$ is a straight-chain or branched alkynyl group:
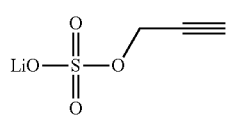
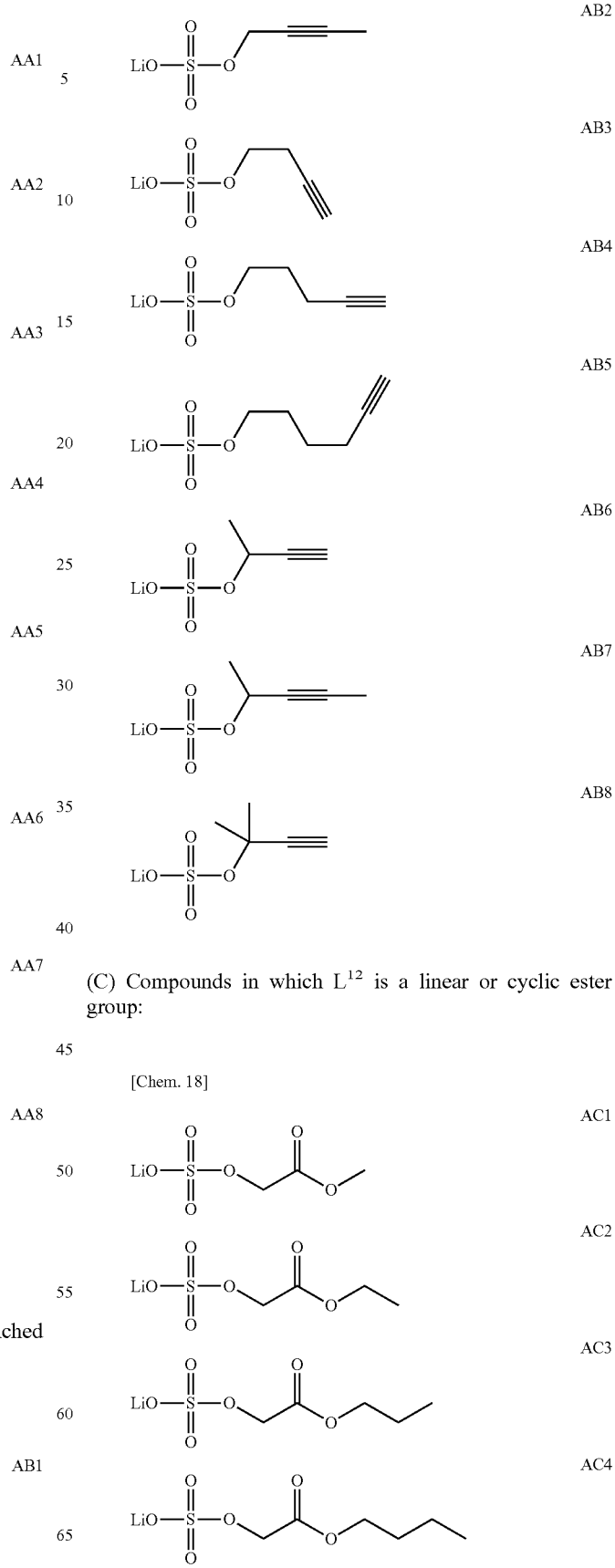
(C) Compounds in which $L^{12}$ is a linear or cyclic ester group:

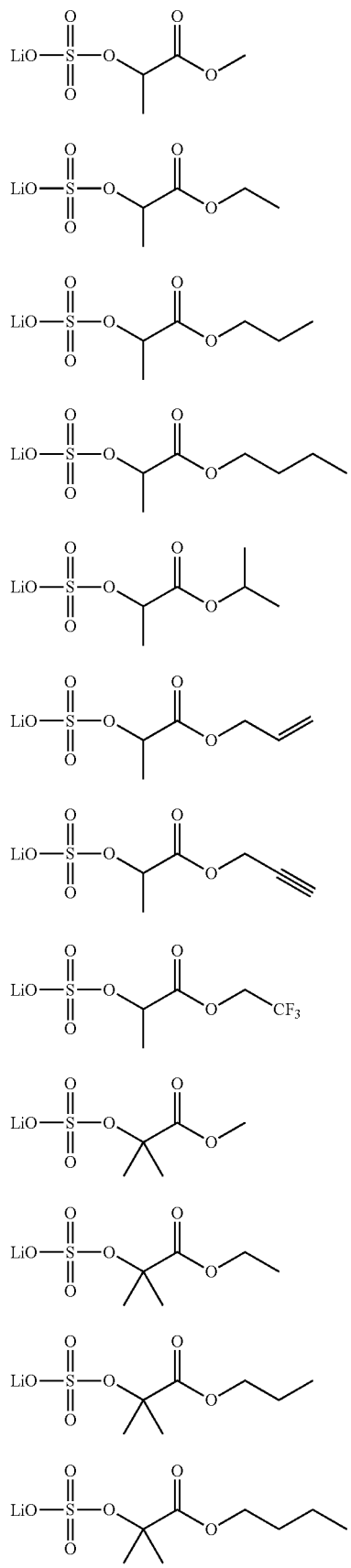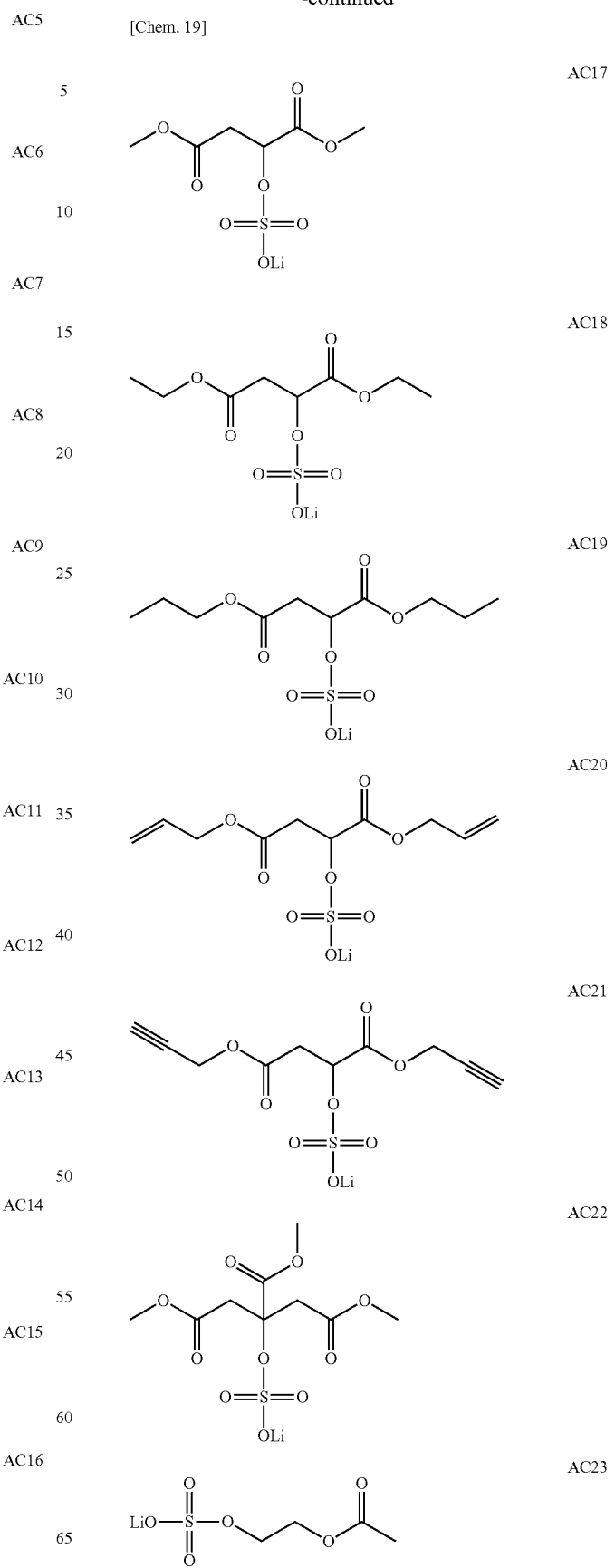

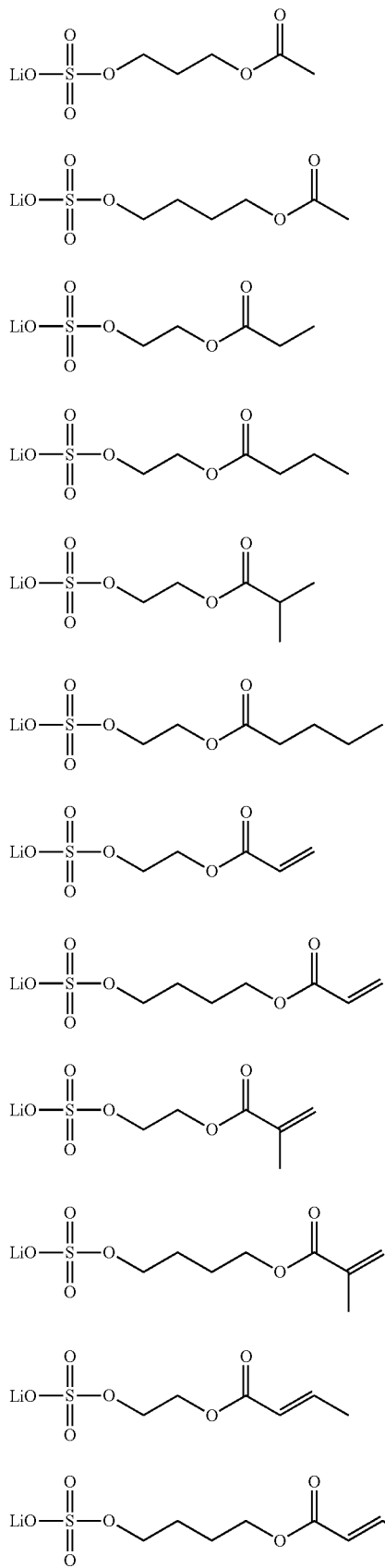
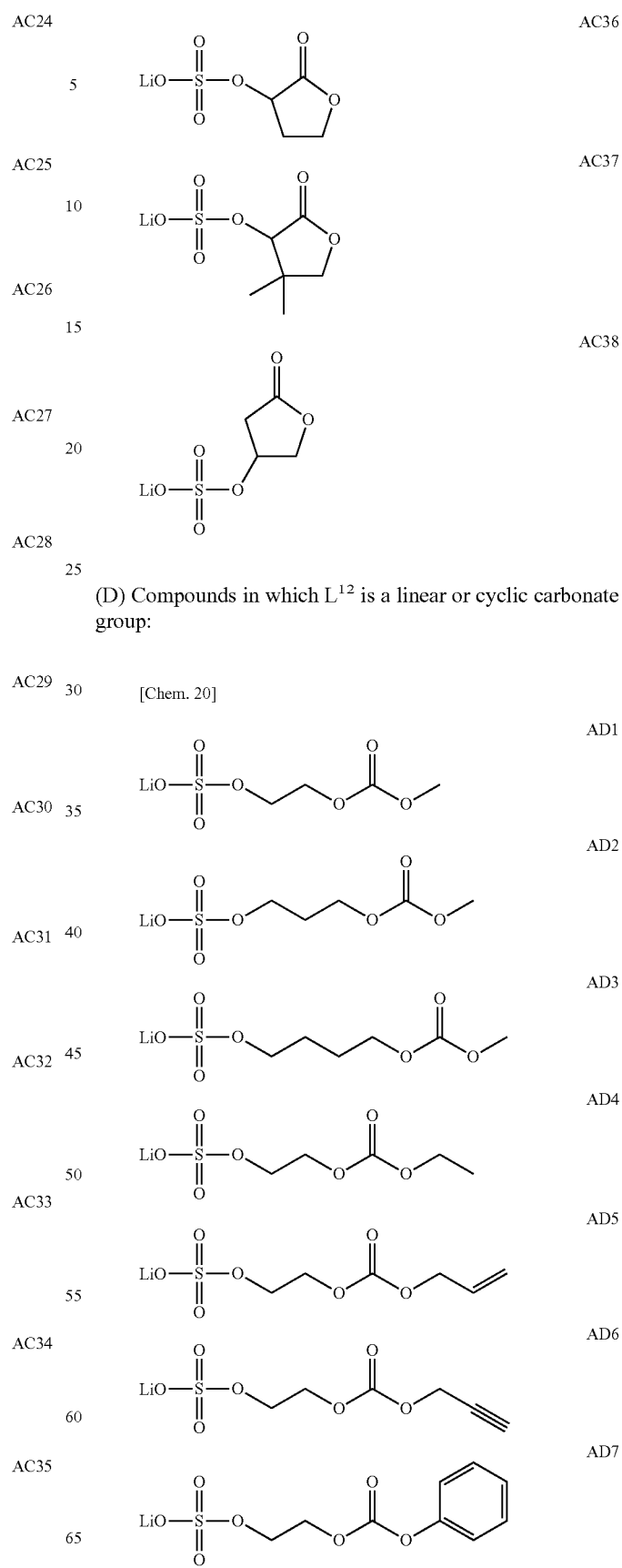
(D) Compounds in which $L^{12}$ is a linear or cyclic carbonate group:
[Chem. 20]

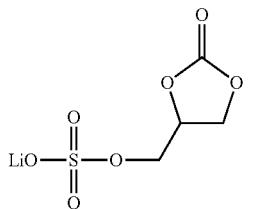
AD8
(E) Compounds in which $L^{12}$ is a sulfur atom-containing organic group:
[Chem. 21]
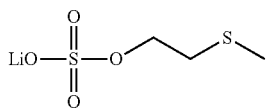
AE1
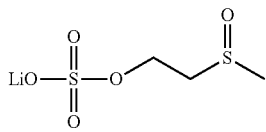
AE2
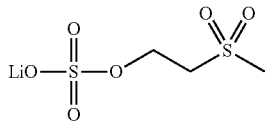
AE3
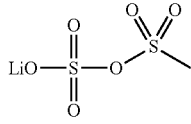
AE4
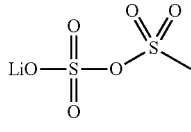
AE5
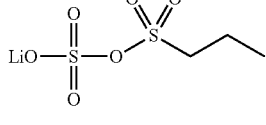
AE6
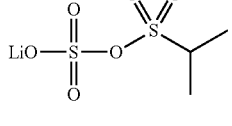
AE7
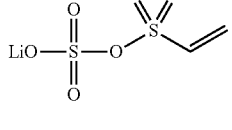
AE8
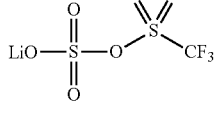
AE9
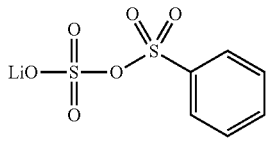
AE10
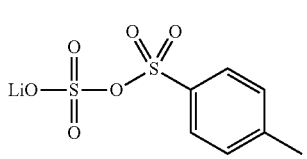
AE11
(F) Compounds in which $L^{12}$ is a silicon atom-containing organic group:
[Chem. 22]
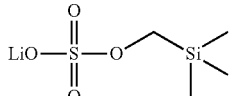
AF1
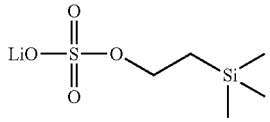
AF2
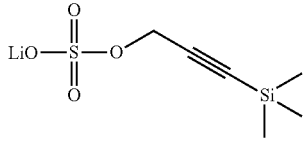
AF3
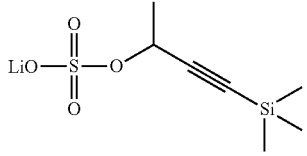
AF4
(G) Compounds in which $L^{12}$ is a cyano group-containing organic group:
[Chem. 23]
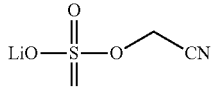
AG1
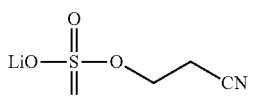
AG2
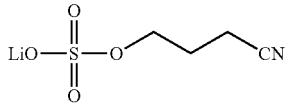
AG3

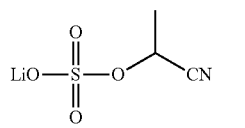
AG4
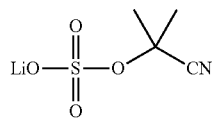
AG5
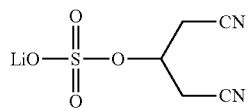
AG6
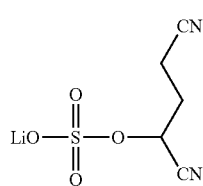
AG7
(H) Compounds in which $L^{12}$ is a phosphorus atom-containing organic group or a —P(=O)F$_2$ group:
[Chem. 24]
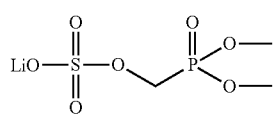
AH1
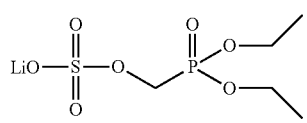
AH2
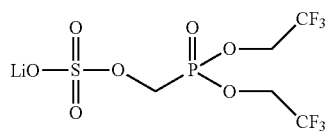
AH3
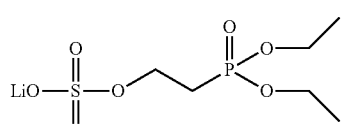
AH4
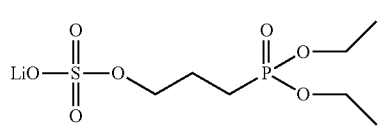
AH5
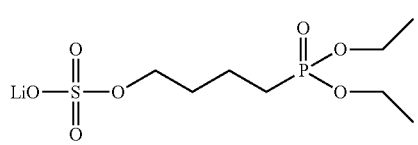
AH6
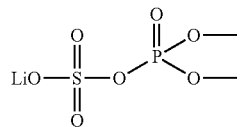
AH7
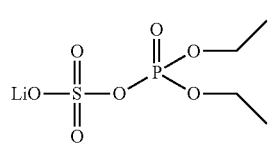
AH8
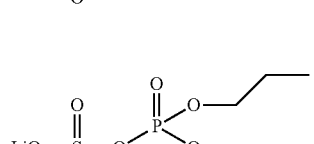
AH9
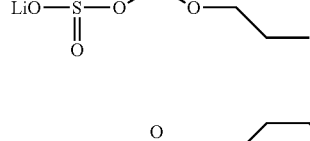
AH10
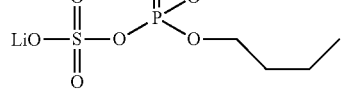
AH11
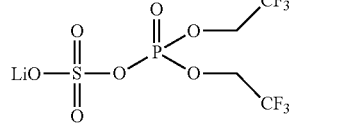
AH12
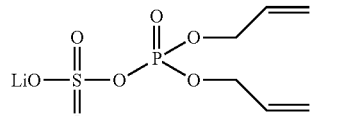
AH13
AH14
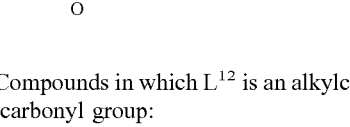
AH15
(J) Compounds in which $L^{12}$ is an alkylcarbonyl group or an arylcarbonyl group:

[Chem. 25]

AJ1 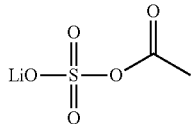

AJ2 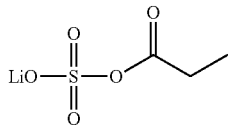

AJ3 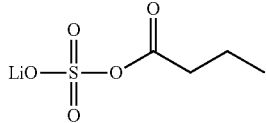

AJ4 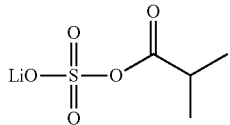

AJ5 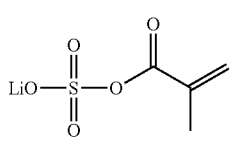

AJ6 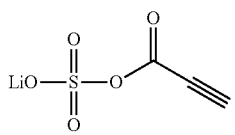

AJ7 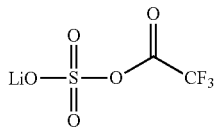

AJ8 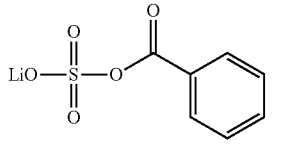

AJ9 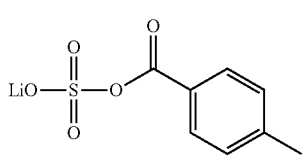

AJ10

-continued

AJ11 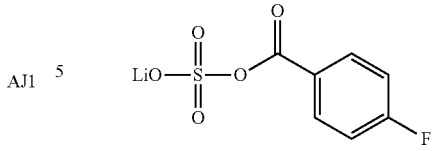

Among the $SO_4$ group-containing compounds represented by the foregoing general formula (I-2), one or more selected from Compounds AA1, AA2, AA6, AB1, AB6, AC1, AC5, AC6, AC10 to AC12, AC17, AC18, AC21, AC23, AC30, AC32, AC34, AC36, AC37, AD1, AD4 to AD8, AE3, AE4, AE8 to AE11, AF2, AG2, AG4 to AG6, AH1, AH2, AH7 to AH10, AH15, AJ1, AJ5, AJ6, AJ8, and AJ9 are preferred, and one or more selected from lithium vinyl sulfate (Compound AA1), lithium allyl sulfate (Compound AA2), lithium propargyl sulfate (Compound AB1), lithium 1-oxo-1-ethoxy-1-oxopropan-2-yl sulfate (Compound AC6), lithium 1-oxo-1-(2-propynyloxy)propan-2-yl sulfate (Compound AC11), lithium 2-(acryloyloxy)ethyl sulfate (Compound AC30), lithium 2-(methacryloyloxy)ethyl sulfate (Compound AC32), lithium 2-((methoxycarbonyl)oxy)ethyl sulfate (Compound AD1), lithium (2-oxo-1,3-dioxolan-4-yl) methyl sulfate (Compound AD8), lithium 2-(methanesulfonyl)ethyl sulfate (Compound AE3), lithium methanesulfonyl sulfate (Compound AE4), lithium trifluoromethanesulfonyl sulfate (Compound AE9), lithium 2-(trimethylsilyl)ethyl sulfate (Compound AF2), lithium 2-cyanoethyl sulfate (Compound AG2), lithium 1,3-dicyanopropynyl 2-sulfate (Compound AG6), lithium (diethoxyphosphoryl)methyl sulfate (Compound AH2), lithium diethoxyphosphoryl sulfate (Compound AH8), lithium dibutoxyphosphoryl sulfate (Compound AH10), and lithium difluorophosphoryl sulfate (Compound AH15) are more preferred.

In the nonaqueous electrolytic solution of the present invention, a content of the $SO_4$ group-containing compound represented by the foregoing general formula (I-2), which is contained in the nonaqueous electrolytic solution, is preferably 0.001% to 5% by mass in the nonaqueous electrolytic solution. So long as the content is 5% by mass or less, there is less concern that a surface film is excessively formed on the electrode, thereby worsening the low-temperature properties, and so long as the content is 0.001% by mass or more, the formation of a surface film is satisfactory, and the effect for improving high-temperature storage properties is increased. Thus, the foregoing range is preferred. The content is more preferably 0.05% by mass or more, and still more preferably 0.1% by mass or more in the nonaqueous electrolytic solution. Its upper limit is more preferably 3% by mass or less, and still more preferably 1% by mass or less.

Other suitable examples of the $SO_4$ group-containing compound represented by the general formula (I) include compounds represented by the following general formula (I-3):

(I-3)

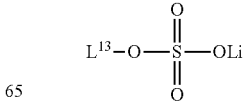

In the formula (I-3), $L^{13}$ represents an alkyl group having 1 to 12 carbon atoms, in which at least one hydrogen atom is substituted with a halogen atom, an alkoxyalkyl group having 2 to 12 carbon atoms, in which at least one hydrogen atom is substituted with a halogen atom, or an aryl group having 6 to 12 carbon atoms, in which at least one hydrogen atom is substituted with a halogen atom.

In the foregoing general formula (I-3), $L^{13}$ is preferably an alkyl group having 1 to 8 carbon atoms, in which at least one hydrogen atom is substituted with a halogen atom, an alkoxyalkyl group having 2 to 8 carbon atoms, in which at least one hydrogen atom is substituted with a halogen atom, or an aryl group having 6 to 10 carbon atoms, in which at least one hydrogen atom is substituted with a halogen atom, and more preferably an alkyl group having 1 to 5 carbon atoms, and preferably 1 to 4 carbon atoms, in which at least one hydrogen atom is substituted with a halogen atom, an alkoxyalkyl group having 2 to 4 carbon atoms, in which at least one hydrogen atom is substituted with a halogen atom, or an aryl group having 6 to 8 carbon atoms.

The halogen atom is preferably a fluorine atom.

As specific examples of $L^{13}$, there are suitably exemplified a fluoroalkyl group, such as a fluoromethyl group, a difluoromethyl group, a trifluoromethyl group, a 2-fluoroethyl group, a 2,2-difluoroethyl group, a 2,2,2-trifluoroethyl group, a 3-fluoropropyl group, a 3,3-difluoropropyl group, a 3,3,3-trifluoropropyl group, a 2,2,3,3-tetrafluoropropyl group, a 2,2,3,3,3-pentafluoropropyl group, a 1,1,1,3,3,3-hexafluoro-2-propyl group, etc.; a fluoroalkoxyalkyl group, such as a fluoromethoxymethyl group, a difluoromethoxymethyl group, a trifluoromethoxymethyl group, a 2-fluoroethoxymethyl group, a 2,2-difluoroethoxymethyl group, a 2,2,2-trifluoroethoxymethyl group, a fluoromethoxyethyl group, a difluoromethoxyethyl group, a trifluoromethoxyethyl group, a 2-fluoroethoxyethyl group, a 2,2-difluoroethoxyethyl group, a 2,2,2-trifluoroethoxymethyl group, etc.; and an aryl group, such as a 2-fluorophenyl group, a 4-fluorophenyl group, a 4-trifluoromethylphenyl group, a 2,4-difluorophenyl group, a perfluorophenyl group, etc. Above all, a trifluoromethyl group, a 2,2,2-trifluoroethyl group, a 2,2,3,3,3-pentafluoropropyl group, a fluoromethoxyethyl group, a 2,2,2-trifluoroethoxymethyl group, a 4-fluorophenyl group, and a perfluorophenyl group are preferred; and a 2,2,2-trifluoroethyl group, a 2,2,3,3-tetrafluoropropyl group, and a 4-fluorophenyl group are more preferred.

Specifically, examples of the $SO_4$ group-containing compound represented by the foregoing general formula (I-3) include the following compounds.

There are suitably exemplified lithium fluoromethyl sulfate, lithium difluoromethyl sulfate, lithium trifluoromethyl sulfate, lithium 2-fluoroethyl sulfate, lithium 2,2-difluoroethyl sulfate, lithium 2,2,2-trifluoroethyl sulfate, lithium 3-fluoropropyl sulfate, lithium 3,3-difluoropropyl sulfate, lithium 3,3,3-trifluoropropyl sulfate, lithium 2,2,3,3-tetrafluoropropyl sulfate, lithium 2,2,3,3,3-pentafluoropropyl sulfate, lithium 1,1,1,3,3,3-hexafluoro-2-propyl sulfate, lithium fluoromethoxymethyl sulfate, lithium difluoromethoxymethyl sulfate, lithium trifluoromethoxymethyl sulfate, lithium 2-fluoroethoxymethyl sulfate, lithium 2,2-difluoroethoxymethyl sulfate, lithium 2,2,2-trifluoroethoxymethyl sulfate, lithium fluoromethoxyethyl sulfate, lithium difluoromethoxyethyl sulfate, lithium trifluoromethoxyethyl sulfate, lithium 2-fluoroethoxyethyl sulfate, lithium 2,2-difluoroethoxyethyl sulfate, lithium 2,2,2-trifluoroethoxyethyl sulfate, lithium 2-fluorophenyl sulfate, lithium 4-fluorophenyl sulfate, lithium 4-trifluoromethylphenyl sulfate, lithium 2,4-difluorophenyl sulfate, and lithium perfluorophenyl sulfate.

Among the $SO_4$ group-containing compounds represented by the foregoing general formula (I-3), one or more selected from lithium trifluoromethyl sulfate, lithium 2,2,2-trifluoroethyl sulfate, lithium 2,2,3,3-tetrafluoropropyl sulfate, lithium 1,1,1,3,3,3-hexafluoro-2-propyl sulfate, lithium 4-fluorophenyl sulfate, and lithium perfluorophenyl sulfate are more preferred.

A concentration of the $SO_4$ group-containing compound represented by the foregoing general formula (I-3) in the nonaqueous electrolytic solution is preferably 5% by mass or more, and more preferably 5.5% by mass or more. Its upper limit is preferably 25% by mass or less, more preferably 20% by mass or less, and still more preferably 13% by mass or less.

[$SO_4$ Group-Containing Compounds Represented by the General Formula (II)]

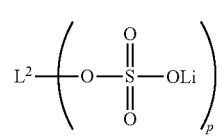

(II)

wherein $L^2$ represents a p-valent hydrocarbon connecting group which may contain an ether bond, a thioether bond, or an $—S(=O)_2$ bond, and p is an integer of 2 to 4, provided that at least one hydrogen atom which $L^2$ has may be substituted with a halogen atom.

In the foregoing general formula (II), p is preferably 2 or 3, and more preferably 2.

Specific examples of $L^2$ include the following connecting groups.

(i) Connecting Group in the Case of p=2:

There are suitably exemplified a straight-chain alkylene group, such as an ethylene group, a propane-1,3-diyl group, a butane-1,4-diyl group, a pentane-1,5-diyl group, a hexane-1,6-diyl group, etc.; a branched alkylene group, such as a propane-1,2-diyl group, a butane-1,3-diyl group, a butane-2,3-diyl group, a 2-methylpropane-1,2-diyl group, a 2,2-dimethylpropane-1,3-diyl group, etc.; a haloalkylene group, such as a 2,2-difluoropropane-1,3-diyl group, a 2,2,3,3-tetrafluorobutane-1,4-diyl group, a 2,2,3,3,4,4-hexafluoropentane-1,5-diyl group, a 2,2,3,3,4,4,5,5-octafluorohexane-1,6-diyl group, a 2,2-dichloropropane-1,3-diyl group, a 2,2,3,3-tetrachlorobutane-1,4-diyl group, etc.; an alkenylene group, such as a 2-butene-1,4-diyl group, a 2-pentene-1,5-diyl group, a 3-hexene-1,6-diyl group, a 3-hexene-2,5-diyl group, a 2,5-dimethyl-3-hexene-2,5-diyl group, etc.; an alkynylene group, such as a 2-butyne-1,4-diyl group, a 2-pentyne-1,5-diyl group, a 3-hexyne-1,6-diyl group, a 3-hexyne-2,5-diyl group, a 2,5-dimethyl-3-hexyne-2,5-diyl group, etc.; a cycloalkylene group, such as a cyclopentane-1,2-diyl group, a cyclopentane-1,3-diyl group, a cyclohexane-1,2-diyl group, a cyclohexane-1,4-diyl group, a cycloheptane-1,2-diyl group, a cycloheptane-1,4-diyl group, a cyclooctane-1,2-diyl group, a cyclooctane-1,5-diyl group, etc.; a connecting group having an ether bond, such as —$CH_2CH_2OCH_2CH_2$—, —$CH_2CH_2OCH_2CH_2OCH_2CH_2$—, —$CH_2CH_2CH_2OCH_2CH_2CH_2$—, —$CH(CH_3)CH_2OCH_2CH(CH_3)$—, etc.; a connecting group having a thioether bond, such as —$CH_2CH_2SCH_2CH_2$—, —$CH_2CH_2CH_2SCH_2CH_2CH_2$—, etc.; a connecting group having an S(=O)₂ bond, such as —CH₂CH₂S(=O)₂CH₂CH₂—, —CH₂CH₂CH₂S(=O)₂CH₂CH₂CH₂—, etc.; and an aromatic connecting group, such as a benzene-1,2-diyl group, a benzene-1,3-diyl group, a benzene-1,4-diyl group, etc.

(ii) The Case of p=3:

There are suitably exemplified connecting groups having the following structures.

[Chem. 28]

(iii) The Case of p=4:

There are suitably exemplified connecting groups having the following structures.

[Chem. 29]

In L², an ethylene group, a propane-1,3-diyl group, a butane-1,4-diyl group, a pentane-1,5-diyl group, a hexane-1,6-diyl group, a propane-1,2-diyl group, a butane-1,3-diyl group, a butane-2,3-diyl group, a 2,2-dimethylpropane-1,3-diyl group, a 2,2-difluoropropane-1,3-diyl group, a 2,2,3,3-tetrafluorobutane-1,4-diyl group, a 2,2,3,3,4,4-hexafluoropentane-1,5-diyl group, a 2-butene-1,4-diyl group, a 3-hexene-2,5-diyl group, a 2-butyne-1,4-diyl group, a 3-hexyne-2,5-diyl group, a cyclohexane-1,2-diyl group, a cyclohexane-1,4-diyl group, a cycloheptane-1,2-diyl group, —CH₂CH₂OCH₂CH₂—, —CH₂CH₂OCH₂CH₂OCH₂CH₂—, —CH₂CH₂S(=O)₂CH₂CH₂—, and a benzene-1,4-diyl group are preferred; and an ethylene group, a propane-1,3-diyl group, a butane-1,4-diyl group, a propane-1,2-diyl group, a butane-1,3-diyl group, a butane-2,3-diyl group, a 2,2-difluoropropane-1,3-diyl group, a 2,2,3,3-tetrafluorobutane-1,4-diyl group, a 2-butene-1,4-diyl group, a 2-butyne-1,4-diyl group, a cyclohexane-1,4-diyl group, —CH₂CH₂OCH₂CH₂—, and —CH₂CH₂S(=O)₂CH₂CH₂— are more preferred.

Specifically, examples of the SO₄ group-containing compound represented by the foregoing general formula (II) include the following compounds.

(A) Suitable Compounds in the Case of p=2:

[Chem. 30]

BA1
BA2
BA3
BA4
BA5
BA6
BA7
BA8
BA9
BA10
BA11
BA12

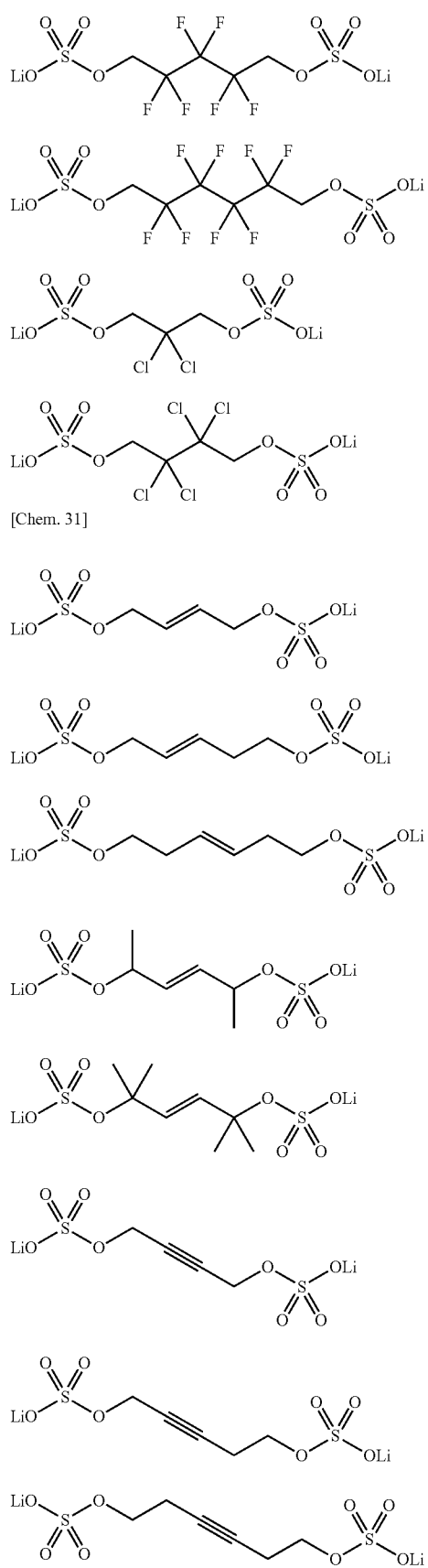
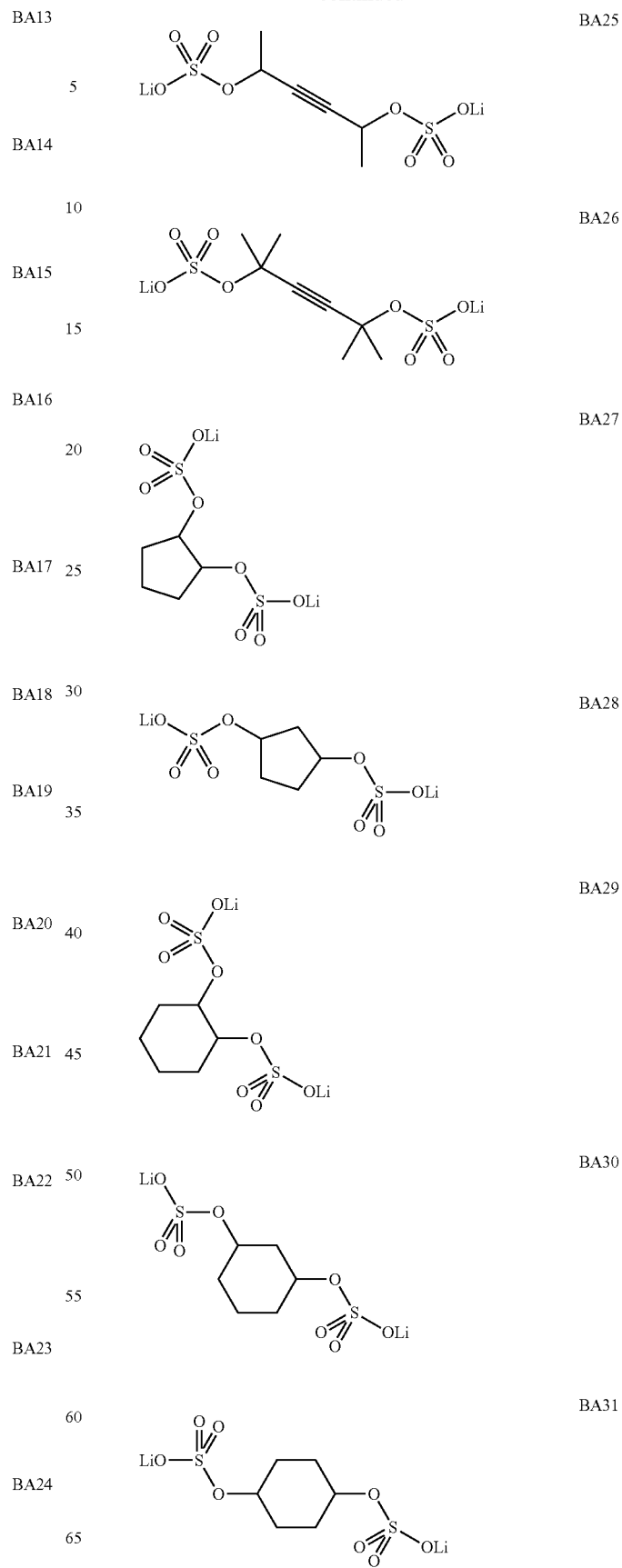

BA32 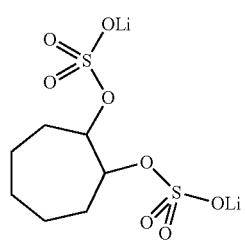
[Chem. 32]
BA33 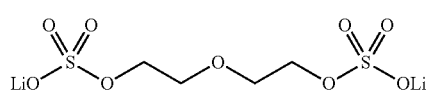
BA34 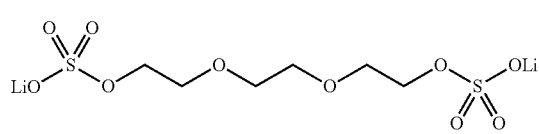
BA35 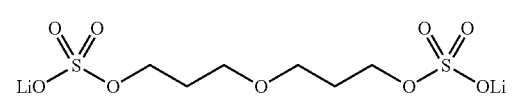
BA36 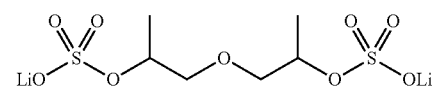
BA37 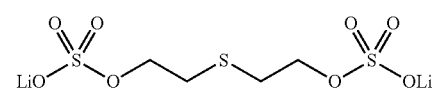
BA38 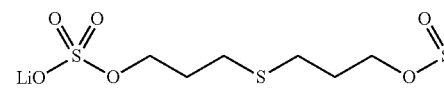
BA39 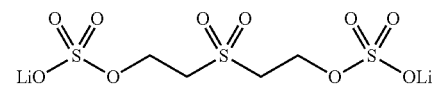
BA40 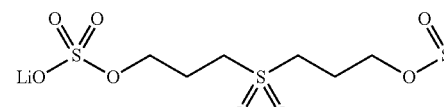
BA41 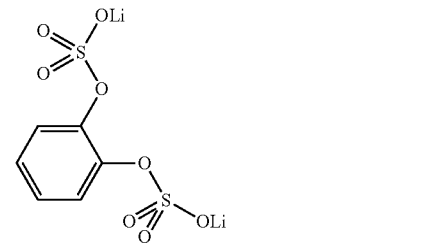
BA42 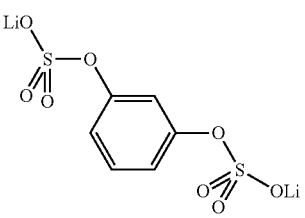
BA43 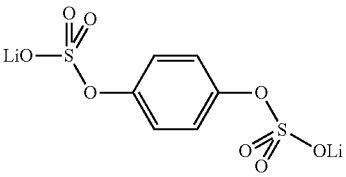
(B) Suitable Compounds in the Case of p=3:
[Chem. 33]
BA44 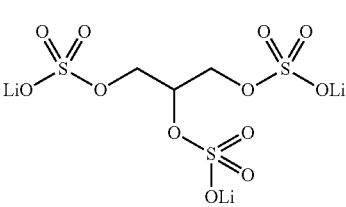
BA45 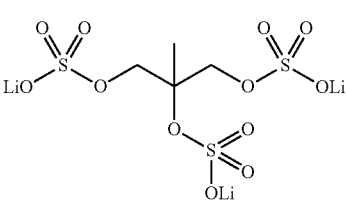
BA46 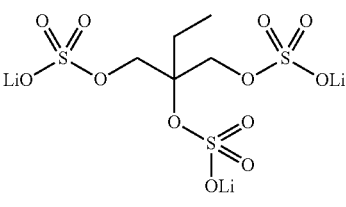
BA47 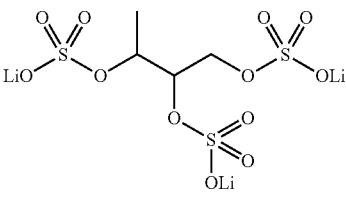
BA48 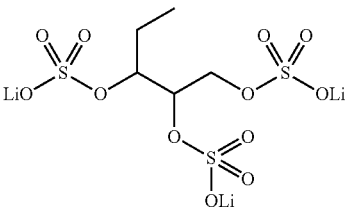

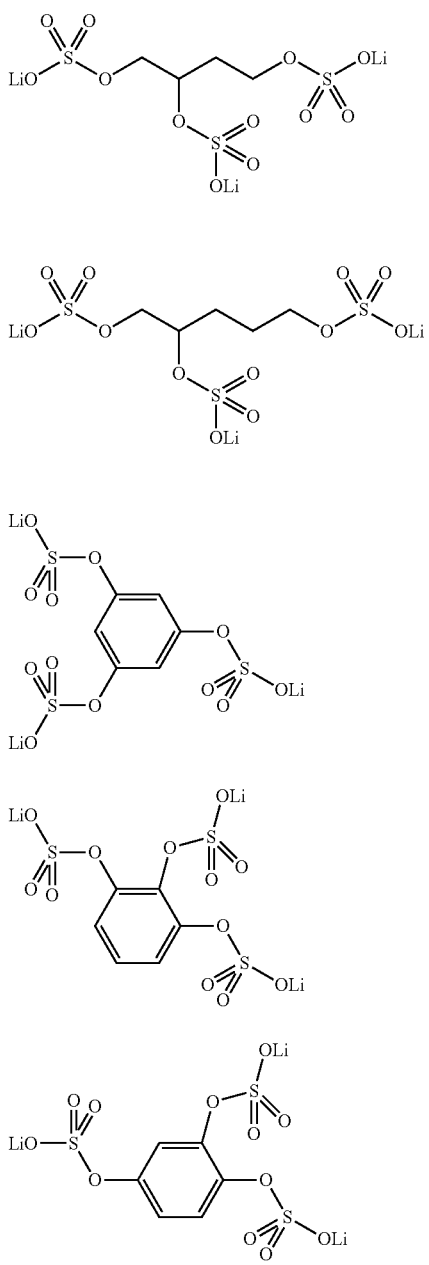

(C) Suitable Compounds in the Case of p=4:

[Chem. 34]

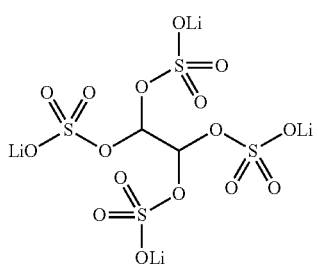

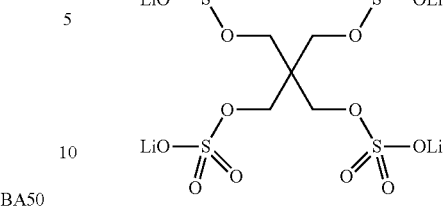

Among the $SO_4$ group-containing compounds represented by the foregoing general formula (II), one or more selected from Compounds BA1 to BAB, BA10 to BA13, BA17, BA20, BA22, BA29, BA31 to BA34, BA39, and BA43 to BA46 are preferred; and one or more selected from lithium ethane-1,2-diyl bis(sulfate) (Compound BA1), lithium propane-1,3-diyl bis(sulfate) (Compound BA2), lithium butane-1,4-diyl bis(sulfate) (Compound BA3), lithium pentane-1,5-diyl bis(sulfate) (Compound BA4), lithium hexane-1,6-diyl bis(sulfate) (Compound BA5), lithium propane-1,2-diyl bis(sulfate) (Compound BA6), lithium butane-1,3-diyl bis (sulfate) (Compound BA7), lithium butane-2,3-diyl bis(sulfate) (Compound BA8), lithium 2,2-difluoropropane-1,3-diyl bis(sulfate) (Compound BA11), lithium 2,2,3,3-tetrafluorobutane-1,4-diyl bis(sulfate) (Compound BA12), lithium 2-butene-1,4-diyl bis(sulfate) (Compound BA17), lithium 2-butyne-1,4-diyl bis(sulfate) (Compound BA22), lithium cyclohexane-1,4-diyl bis(sulfate) (Compound BA31), lithium oxybis(ethane-2,1-diyl)bis(sulfate) (Compound BA33), and lithium sulfonylbis(ethane-2,1-diyl)bis(sulfate) (Compound BA39) are more preferred.

In the nonaqueous electrolytic solution of the present invention, a content of the $SO_4$ group-containing compound represented by the foregoing general formula (II), which is contained in the nonaqueous electrolytic solution, is preferably 0.001% to 5% by mass in the nonaqueous electrolytic solution. So long as the content is 5% by mass or less, there is less concern that a surface film is excessively formed on the electrode, thereby worsening the low-temperature properties, and so long as the content is 0.001% by mass or more, the formation of a surface film is satisfactory, and the effect for improving high-temperature storage properties is increased. Thus, the foregoing range is preferred. The content is more preferably 0.05% by mass or more, and still more preferably 0.1% by mass or more in the nonaqueous electrolytic solution. Its upper limit is more preferably 3% by mass or less, and still more preferably 1% by mass or less.

[$SO_4$ Group-Containing Compounds Represented by the General Formula (III)]

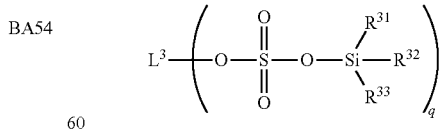

wherein each of $R^{31}$ to $R^{33}$ independently represents an alkyl group having 1 to 12 carbon atoms, an alkenyl group having 2 to 3 carbon atoms, or an aryl group having 6 to 8 carbon atoms, and q is an integer of 1 to 4, when q is 1, then $R^{31}$ may be $-OSO_3-R^{37}$, and $R^{37}$ is synonymous with $R^{31}$.

when q is 1, then $L^3$ represents an alkyl group having 1 to 12 carbon atoms, an alkenyl group having 2 to 6 carbon atoms, an alkynyl group having 3 to 6 carbon atoms, an alkoxyalkyl group having 2 to 12 carbon atoms, a —$CR^{34}R^{35}C(\!\!=\!\!O)OR^{36}$ group, or an aryl group having 6 to 12 carbon atoms, and when q is 2 to 4, then $L^3$ represents a q-valent hydrocarbon connecting group which may contain an ether bond, a thioether bond, or an —$S(\!\!=\!\!O)_2\!\!$— bond, each of $R^{34}$ and $R^{35}$ independently represents a hydrogen atom, a halogen atom, or an alkyl group having 1 to 4 carbon atoms, and $R^{36}$ represents an alkyl group having 1 to 8 carbon atoms, an alkenyl group having 2 to 6 carbon atoms, or an alkynyl group having 3 to 6 carbon atoms, and in each of the alkyl group and the aryl group represented by $L^3$, and the alkyl group represented by each of $R^{34}$ to $R^{36}$, at least one hydrogen atom may be substituted with a halogen atom.

Suitable examples of the $SO_4$ group-containing compound represented by the general formula (III) include compounds represented by the following general formula (III-1):

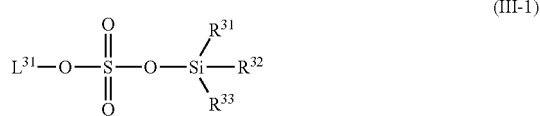

(III-1)

wherein $L^{31}$ represents an alkyl group having 1 to 12 carbon atoms, an alkenyl group having 2 to 6 carbon atoms, an alkynyl group having 3 to 6 carbon atoms, an alkoxyalkyl group having 2 to 12 carbon atoms, a —$CR^{34}R^{35}C(\!\!=\!\!O)OR^{36}$ group, or an aryl group having 6 to 12 carbon atoms, and $R^{31}$ to $R^{33}$ and $R^{34}$ to $R^{36}$ are the same as those described above, and in each of the alkyl group and the aryl group represented by $L^{31}$, at least one hydrogen atom may be substituted with a halogen atom.

In the foregoing general formula (III-1), $L^{31}$ is preferably an alkyl group having 1 to 8 carbon atoms, an alkenyl group having 3 to 4 carbon atoms, an alkynyl group having 3 to 4 carbon atoms, an alkoxyalkyl group having 2 to 8 carbon atoms, a —$CR^{34}R^{35}C(\!\!=\!\!O)OR^{36}$ group, or an aryl group having 6 to 10 carbon atoms, and more preferably an alkyl group having 1 to 5 carbon atoms, and preferably 1 to 4 carbon atoms, in which at least one hydrogen atom may be substituted with a halogen atom, an alkenyl group having 3 carbon atoms, an alkynyl group having 3 carbon atoms, an alkoxyalkyl group having 2 to 4 carbon atoms, a —$CR^{34}R^{35}C(\!\!=\!\!O)OR^{36}$ group, or an aryl group having 6 to 8 carbon atoms.

In the case where $L^{31}$ is a group other than the —$CR^{34}R^{35}C(\!\!=\!\!O)OR^{36}$ group, as specific examples thereof, there are suitably exemplified a straight-chain alkyl group, such as a methyl group, an ethyl group, an n-propyl group, an n-butyl group, an n-pentyl group, an n-hexyl group, an n-heptyl group, an n-octyl group, an n-decyl group, an n-dodecyl group, etc.; a branched alkyl group, such as an isopropyl group, a sec-butyl group, a tert-butyl group, a tert-amyl group, a 2-ethylhexyl group, etc.; a cycloalkyl group, such as a cyclopentyl group, a cyclohexyl group, etc.; a fluoroalkyl group, such as a fluoromethyl group, a difluoromethyl group, a trifluoromethyl group, a 2-fluoroethyl group, a 2,2-difluoroethyl group, a 2,2,2-trifluoroethyl group, a 3-fluoropropyl group, a 3,3-difluoropropyl group, a 3,3,3-trifluoropropyl group, a 2,2,3,3-tetrafluoropropyl group, a 2,2,3,3,3-pentafluoropropyl group, etc.; a straight-chain alkenyl group, such as a vinyl group, a 2-propenyl group, a 2-butenyl group, a 3-butenyl group, etc.; a branched alkenyl group, such as a 2-methyl-2-propenyl group, etc.; a straight-chain alkynyl group, such as a 2-propynyl group, a 2-butynyl group, a 3-butynyl group, a 4-pentynyl group, a 5-hexynyl group, etc.; a branched alkynyl group, such as a 1-methyl-2-propynyl group, a 1-methyl-2-butynyl group, a 1,1-dimethyl-2-propynyl group, etc.; an alkoxyalkyl group, such as a methoxymethyl group, an ethoxymethyl group, a methoxyethyl group, an ethoxyethyl group, an n-propoxyethyl group, an n-butoxyethyl group, an n-hexyloxyethyl group, a methoxypropyl group, an ethoxypropyl group, etc.; and an aryl group, such as a phenyl group, a 2-methylphenyl group, a 3-methylphenyl group, a 4-methylphenyl group, a 4-tert-butylphenyl group, a 2-fluorophenyl group, a 4-fluorophenyloxy group, a 4-trifluoromethylphenyl group, a 2,4-difluorophenyl group, a perfluorophenyl group, etc.

Among the foregoing, a methyl group, an ethyl group, an n-propyl group, an n-butyl group, an n-pentyl group, an n-hexyl group, an n-heptyl group, an n-octyl group, an isopropyl group, a sec-butyl group, a trifluoromethyl group, a 2,2,2-trifluoroethyl group, a 2,2,3,3-tetrafluoropropyl group, a methoxyethyl group, an ethoxyethyl group, an n-propoxyethyl group, an n-butoxyethyl group, an n-hexyloxyethyl group, a methoxypropyl group, an ethoxypropyl group, a vinyl group, a 2-propenyl group, a 2-butenyl group, a 2-methyl-2-propenyl group, a 2-propynyl group, a 2-butynyl group, a 3-butynyl group, a 1-methyl-2-propynyl group, a phenyl group, a 4-methylphenyl group, a 4-fluorophenyl group, and a perfluorophenyl group are preferred; and a methyl group, an ethyl group, an n-propyl group, an n-butyl group, an isopropyl group, a 2,2,2-trifluoroethyl group, a 2,2,3,3-tetrafluoropropyl group, a 2-propenyl group, a 2-propynyl group, a methoxyethyl group, a methoxypropyl group, a phenyl group, and a 4-fluorophenyl group are more preferred.

In the case where $L^{31}$ is a —$CR^{34}R^{35}C(\!\!=\!\!O)OR^{36}$ group, each of $R^{34}$ and $R^{35}$ is preferably a hydrogen atom or an alkyl group having 1 to 3 carbon atoms, in which at least one hydrogen atom may be substituted with a halogen atom, and more preferably a hydrogen atom or an alkyl group having 1 carbon atom.

As specific examples of $R^{34}$ and $R^{35}$, there are suitably exemplified a hydrogen atom; a halogen atom, such as a fluorine atom, a chlorine atom, etc.; a straight-chain alkyl group, such as a methyl group, an ethyl group, an n-propyl group, an n-butyl group, etc.; a branched alkyl group, such as an isopropyl group, a sec-butyl group, a tert-butyl group, etc.; and a halogen atom-substituted alkyl group, such as a fluoromethyl group, a difluoromethyl group, a trifluoromethyl group, a 2-fluoroethyl group, a 2,2-difluoroethyl group, a 2,2,2-trifluoroethyl group, a 3-fluoropropyl group, a 3,3-difluoropropyl group, a 3,3,3-trifluoropropyl group, a 2,2,3,3-tetrafluoropropyl group, a 2,2,3,3,3-pentafluoropropyl group, etc. Above all, a hydrogen atom, a fluorine atom, a methyl group, an ethyl group, an n-propyl group, and an n-butyl group are more preferred; and a hydrogen atom and a methyl group are still more preferred.

In the —$CR^{34}R^{35}C(\!\!=\!\!O)OR^{36}$ group, $R^{36}$ is preferably an alkyl group having 1 to 3 carbon atoms, in which at least one hydrogen atom may be substituted with a halogen atom, an alkenyl group having 2 to 4 carbon atoms, or an alkynyl group having 3 to 4 carbon atoms.

As specific examples of $R^{36}$, there are suitably exemplified a straight-chain alkyl group, such as a methyl group, an ethyl group, an n-propyl group, an n-butyl group, an n-pentyl group, an n-hexyl group, an n-heptyl group, an n-octyl group, etc.; a branched alkyl group, such as an isopropyl group, a sec-butyl group, a tert-butyl group, a tert-amyl group, a 2-ethylhexyl group, etc.; a cycloalkyl group, such as a cyclopentyl group, a cyclohexyl group, etc.; an alkyl group in which at least one hydrogen atom is substituted with a halogen group, such as a fluoromethyl group, a difluoromethyl group, a trifluoromethyl group, a 2-fluoroethyl group, a 2,2-difluoroethyl group, a 2,2,2-trifluoroethyl group, a 3-fluoropropyl group, a 3,3-difluoropropyl group, a 3,3,3-trifluoropropyl group, a 2,2,3,3-tetrafluoropropyl group, a 2,2,3,3,3-pentafluoropropyl group, etc.; a straight-chain alkenyl group, such as a vinyl group, a 2-propenyl group, a 2-butenyl group, a 3-butenyl group, etc.; a branched alkenyl group, such as a 2-methyl-2-propenyl group, etc.; a straight-chain alkynyl group, such as a 2-propynyl group, a 2-butynyl group, a 3-butynyl group, a 4-pentynyl group, a 5-hexynyl group, etc.; and a branched alkynyl group, such as a 1-methyl-2-propynyl group, a 1-methyl-2-butynyl group, a 1,1-dimethyl-2-propynyl group, etc. Above all, a methyl group, an ethyl group, an n-propyl group, an n-butyl group, a 2-fluoroethyl group, a 2,2,2-trifluoroethyl group, a 2,2,3,3-tetrafluoropropyl group, a 2-propenyl group, a 2-butenyl group, a 2-propynyl group, and a 2-butynyl group are more preferred; and a methyl group, an ethyl group, a 2,2,2-trifluoroethyl group, a 2,2,3,3-tetrafluoropropyl group, a 2-propenyl group, and a 2-propynyl group are still more preferred.

In the case where $L^{31}$ is a $-CR^{34}R^{35}C(=O)OR^{36}$ group, as specific examples thereof, there are suitably exemplified the following groups.

[Chem. 37]

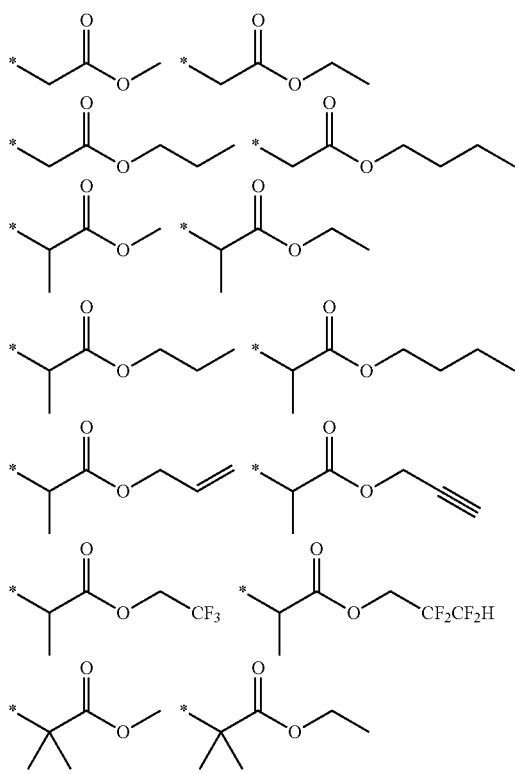

In $L^{31}$, the following groups are more preferred.

[Chem. 38]

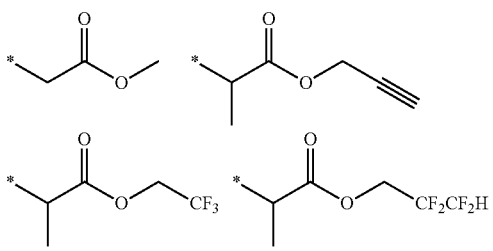

In the general formula (III-1), each of $R^{31}$ to $R^{33}$ independently represents an alkyl group having 1 to 12 carbon atoms, an alkenyl group having 2 to 3 carbon atoms, or an aryl group having 6 to 8 carbon atoms, preferably an alkyl group having 1 to 4 carbon atoms, an alkenyl group having 2 carbon atoms, or an aryl group having 6 to 7 carbon atoms, more preferably an alkyl group having 1 to 2 carbon atoms or an aryl group having 6 carbon atoms, and still more preferably an alkyl group having 1 carbon atom.

As specific examples of $R^{31}$ to $R^{33}$, there are suitably exemplified a straight-chain alkyl group, such as a methyl group, an ethyl group, an n-propyl group, an n-butyl group, an n-pentyl group, an n-hexyl group, an n-heptyl group, an n-octyl group, an n-decyl group, an n-dodecyl group, etc.; a branched alkyl group, such as an isopropyl group, a sec-butyl group, a tert-butyl group, a tert-amyl group, a 2-ethylhexyl group, etc.; a cycloalkyl group, such as a cyclopentyl group, a cyclohexyl group, etc.; an alkenyl group, such as a vinyl group, a 2-propenyl group, etc.; an aryl group, such as a phenyl group, a 2-methylphenyl group, a 3-methylphenyl group, a 4-methylphenyl group, a 4-tert-butylphenyl group, a 2-fluorophenyl group, a 4-fluorophenyl group, a 4-trifluoromethylphenyl group, a 2,4-difluorophenyl group, a perfluorophenyl group, etc.; and the like.

Above all, a methyl group, an ethyl group, an n-propyl group, an n-butyl group, an isopropyl group, a sec-butyl group, a tert-butyl group, a vinyl group, a phenyl group, a 4-methylphenyl group, a 4-fluorophenyl group, and a perfluorophenyl group are more preferred; and a methyl group is still more preferred.

$R^{31}$ to $R^{33}$ may be bonded to each other to form a ring.

Specifically, as the $SO_4$ group-containing compound represented by the foregoing general formula (III-1), there are suitably exemplified the following compounds.

[Chem. 39]

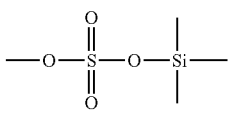

CA1

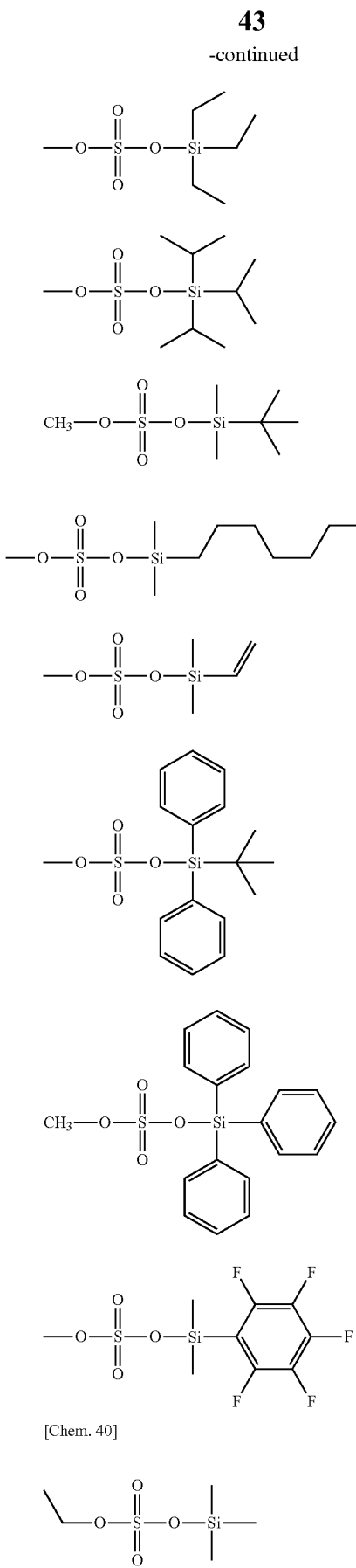
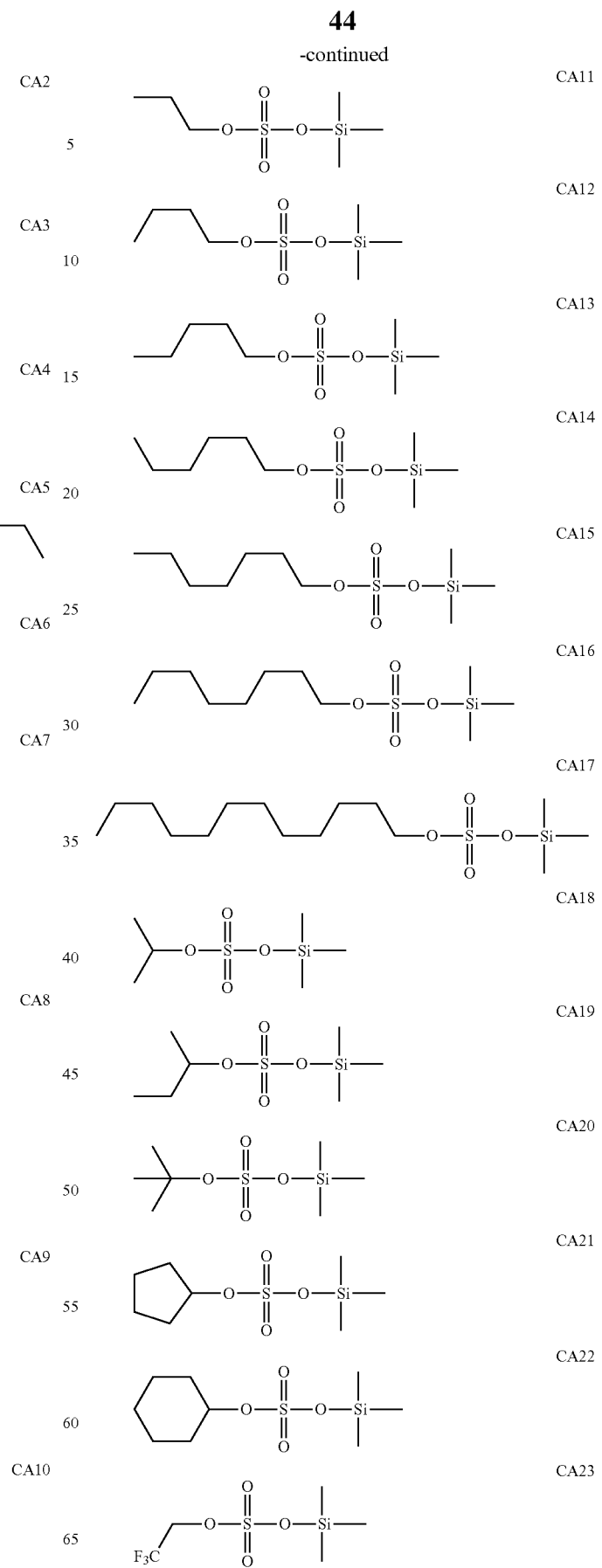

-continued

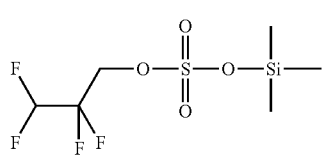

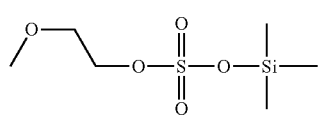

[Chem. 41]

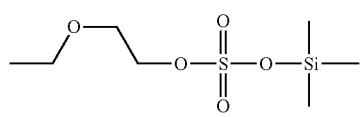

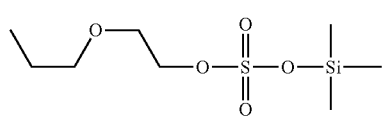

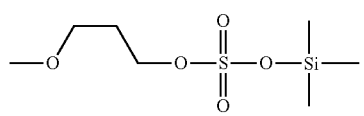

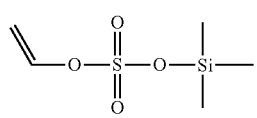

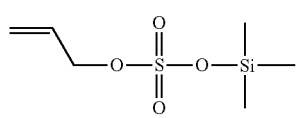

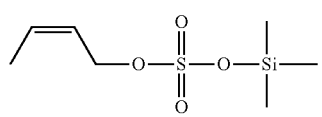

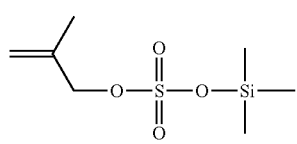

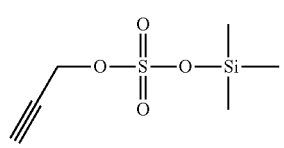

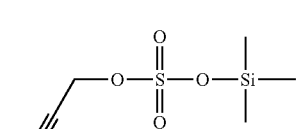

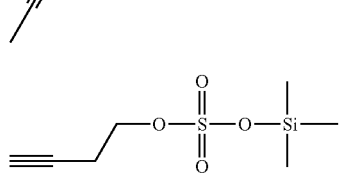

CA24 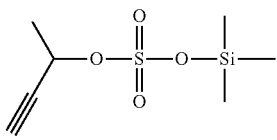

CA25 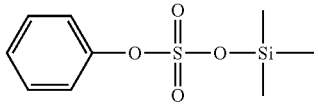

CA26 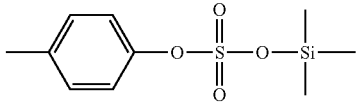

CA27 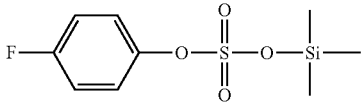

CA28 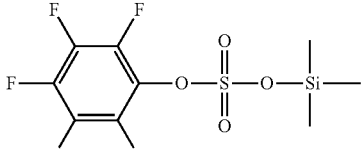

CA29

CA30

CA31

CA32

CA33

CA34

CA35

CA36

CA37

CA38

CA39

CA40

CA50 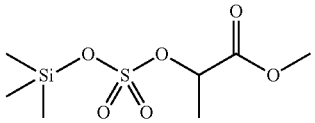

CA51 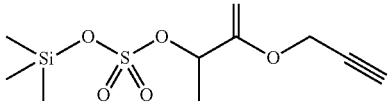

Among the SO₄ group-containing compounds represented by the foregoing general formula (III-1), Compounds CA1 to CA16, CA18 to CA20, and CA23 to CA51 are preferred; Compounds CA1, CA10 to CA16, CA18 to CA20, CA23 to CA40, and CA50 to CA51 are more preferred; and one or more selected from methyl trimethylsilyl sulfate (Compound CA1), ethyl trimethylsilyl sulfate (Compound CA10), n-propyl trimethylsilyl sulfate (Compound CA11), n-butyl trimethylsilyl sulfate (Compound CA12), isopropyl trimethylsilyl sulfate (Compound CA18), 2,2,2-trifluoroethyl trimethylsilyl sulfate (Compound CA23), 2,2,3,3-tetrafluoropropyl trimethylsilyl sulfate (Compound CA24), methoxyethyl trimethylsilyl sulfate (Compound CA25), methoxypropyl trimethylsilyl sulfate (Compound CA28), allyl trimethylsilyl sulfate (Compound CA30), 2-propynyl trimethylsilyl sulfate (Compound CA33), phenyl trimethylsilyl sulfate (Compound CA37), 4-fluorophenyl trimethylsilyl sulfate (Compound CA39), pentafluorophenyl trimethylsilyl sulfate (Compound CA40), trimethylsilyl 1-(methoxycarbonyl) ethyl sulfate (Compound CA50), and trimethylsilyl 1-(2-propynyloxycarbonyl)ethyl sulfate (Compound CA51) are still more preferred.

Suitable examples of the SO₄ group-containing compound represented by the general formula (III) include compounds represented by the following general formula (III-2):

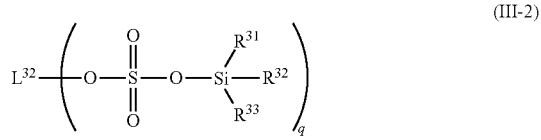

(III-2)

wherein each of $R^{31}$ to $R^{33}$ independently represents an alkyl group having 1 to 12 carbon atoms, an alkenyl group having 2 to 3 carbon atoms, or an aryl group having 6 to 8 carbon atoms, and may be bonded to each other to form a ring, $L^{32}$ represents a q-valent hydrocarbon connecting group, and q is an integer of 2 to 4, provided that $L^{32}$ may contain an ether bond, a thioether bond, or an $SO_2$ bond, and at least one hydrogen atom may be substituted with a halogen atom, and q is preferably 2 or 3, and more preferably 2.

In the general formula (III-2), each of $R^{31}$ to $R^{33}$ independently represents an alkyl group having 1 to 12 carbon atoms, an alkenyl group having 2 to 3 carbon atoms, or an aryl group having 6 to 8 carbon atoms, preferably an alkyl group having 1 to 4 carbon atoms, an alkenyl group having 2 carbon atoms, or an aryl group having 6 to 7 carbon atoms, more preferably an alkyl group having 1 to 2 carbon atoms or an aryl group having 6 carbon atoms, and still more preferably an alkyl group having 1 carbon atom.

As specific examples of $R^{31}$ to $R^{33}$, there are suitably exemplified a straight-chain alkyl group, such as a methyl group, an ethyl group, an n-propyl group, an n-butyl group, an n-pentyl group, an n-hexyl group, an n-heptyl group, an n-octyl group, an n-decyl group, an n-dodecyl group, etc.; a branched alkyl group, such as an isopropyl group, a sec-butyl group, a tert-butyl group, a tert-amyl group, a 2-ethylhexyl group, etc.; a cycloalkyl group, such as a cyclopentyl group, a cyclohexyl group, etc.; an alkenyl group, such as a vinyl group, a 2-propenyl group, etc.; an aryl group, such as a phenyl group, a 2-methylphenyl group, a 3-methylphenyl group, a 4-methylphenyl group, a 4-tert-butylphenyl group, a 2-fluorophenyl group, a 4-fluorophenyl group, a 4-trifluoromethylphenyl group, a 2,4-difluorophenyl group, a perfluorophenyl group, etc.; and the like.

Above all, one or more selected from a methyl group, an ethyl group, an n-propyl group, an n-butyl group, an iso-propyl group, a sec-butyl group, a tert-butyl group, a vinyl group, a phenyl group, a 4-methylphenyl group, a 4-fluorophenyl group, and a perfluorophenyl group are more preferred; and a methyl group is still more preferred.

Specific examples of $L^{32}$ include the following connecting groups.

(i) Connecting Group in the Case of q=2:

There are suitably exemplified a straight-chain alkylene group, such as an ethylene group, a propane-1,3-diyl group, a butane-1,4-diyl group, a pentane-1,5-diyl group, a hexane-1,6-diyl group, etc.; a branched alkylene group, such as a propane-1,2-diyl group, a butane-1,3-diyl group, a butane-2,3-diyl group, a 2-methylpropane-1,2-diyl group, a 2,2-dimethylpropane-1,3-diyl group, etc.; a haloalkyl group, such as a 2,2-difluoropropane-1,3-diyl group, a 2,2,3,3-tetrafluorobutane-1,4-diyl group, a 2,2,3,3,4,4-hexafluoropentane-1,5-diyl group, a 2,2,3,3,4,4,5,5-octafluorohexane-1,6-diyl group, a 2,2-dichloropropane-1,3-diyl group, a 2,2,3,3-tetrachlorobutane-1,4-diyl group, etc.; an alkenylene group, such as a 2-butene-1,4-diyl group, a 2-pentene-1,5-diyl group, a 3-hexene-1,6-diyl group, a 3-hexene-2,5-diyl group, a 2,5-dimethyl-3-hexene-2,5-diyl group, etc.; an alkynylene group, such as a 2-butyne-1,4-diyl group, a 2-pentyne-1,5-diyl group, a 3-hexyne-1,6-diyl group, a 3-hexyne-2,5-diyl group, a 2,5-dimethyl-3-hexyne-2,5-diyl group, etc.; a cycloalkylene group, such as a cyclopentane-1,2-diyl group, a cyclopentane-1,3-diyl group, a cyclohexane-1,2-diyl group, a cyclohexane-1,4-diyl group, a cycloheptane-1,2-diyl group, a cycloheptane-1,4-diyl group, a cyclooctane-1,2-diyl group, a cyclooctane-1,5-diyl group, etc.; a connecting group having an ether bond, such as —$CH_2CH_2OCH_2CH_2$—, —$CH_2CH_2OCH_2CH_2OCH_2CH_2$—, —$CH_2CH_2OCH_2CH_2OCH_2CH_2OCH_2CH_2$—, —$CH_2CH_2CH_2OCH_2CH_2CH_2$—, etc.; a connecting group having a thioether bond, such as —$CH_2CH_2SCH_2CH_2$—, —$CH_2CH_2CH_2SCH_2CH_2CH_2$—, etc.; a connecting group having an $S(=O)_2$ bond, such as —$CH_2CH_2S(=O)_2CH_2CH_2$—, —$CH_2CH_2CH_2S(=O)_2CH_2CH_2CH_2$—, etc.; and an aromatic connecting group, such as a benzene-1,2-diyl group, a benzene-1,3-diyl group, a benzene-1,4-diyl group, etc.

(ii) The Case of q=3:

There are suitably exemplified connecting groups having the following structures.

[Chem. 43]

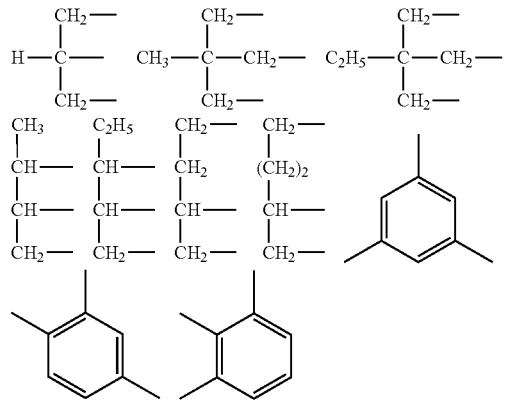

(iii) The Case of q=4:

There are suitably exemplified connecting groups having the following structures.

[Chem. 44]

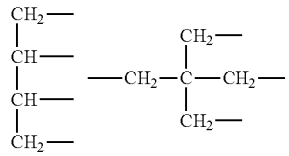

In $L^{32}$, an ethylene group, a propane-1,3-diyl group, a butane-1,4-diyl group, a pentane-1,5-diyl group, a hexane-1,6-diyl group, a propane-1,2-diyl group, a butane-1,3-diyl group, a butane-2,3-diyl group, a 2,2-dimethylpropane-1,3-diyl group, a 2,2-difluoropropane-1,3-diyl group, a 2,2,3,3-tetrafluorobutane-1,4-diyl group, a 2,2,3,3,4,4-hexafluoropentane-1,5-diyl group, a 2-butene-1,4-diyl group, a 3-hexene-2,5-diyl group, a 2-butyne-1,4-diyl group, a 3-hexyne-2,5-diyl group, a cyclohexane-1,2-diyl group, a cyclohexane-1,4-diyl group, a cycloheptane-1,2-diyl group, —CH$_2$CH$_2$OCH$_2$CH$_2$—, —CH$_2$CH$_2$OCH$_2$CH$_2$OCH$_2$CH$_2$—, —CH$_2$CH$_2$S(=O)$_2$CH$_2$CH$_2$—, and a benzene-1,4-diyl group are preferred; and an ethylene group, a propane-1,3-diyl group, a butane-1,4-diyl group, a propane-1,2-diyl group, a butane-1,3-diyl group, a butane-2,3-diyl group, a 2,2-difluoropropane-1,3-diyl group, a 2,2,3,3-tetrafluorobutane-1,4-diyl group, a 2-butene-1,4-diyl group, a 2-butyne-1,4-diyl group, a cyclohexane-1,4-diyl group, —CH$_2$CH$_2$OCH$_2$CH$_2$—, and —CH$_2$CH$_2$S(=O)$_2$CH$_2$CH$_2$— are more preferred.

Specifically, examples of the SO$_4$ group-containing compound represented by the foregoing general formula (III-2) include the following compounds.

[a] The case of q=2:

[Chem. 45]

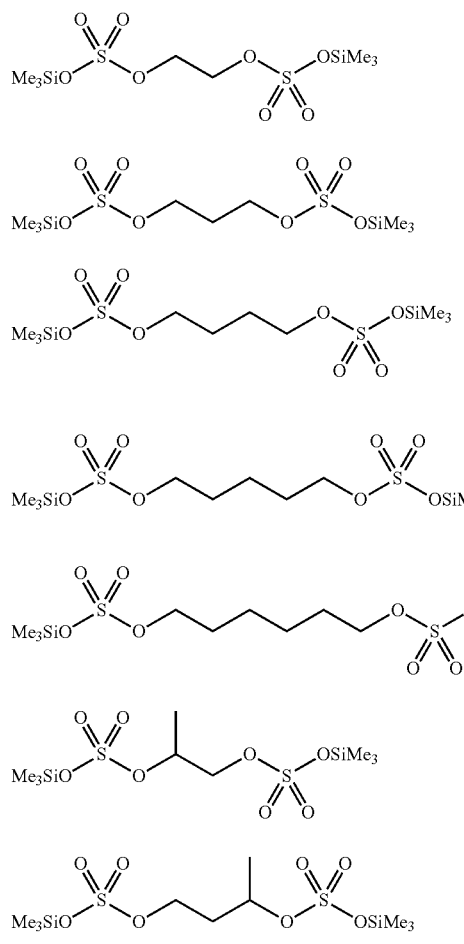

[Chem. 46]

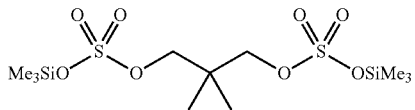
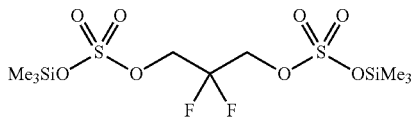
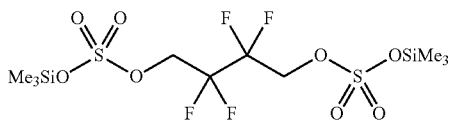
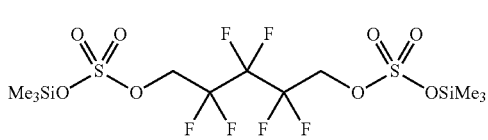
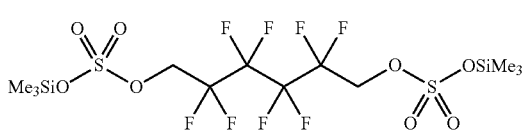
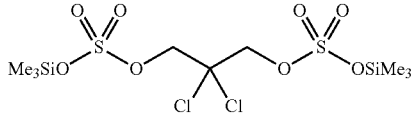
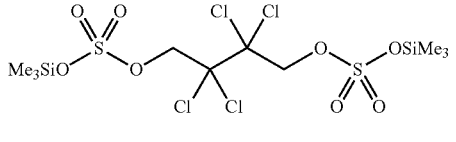
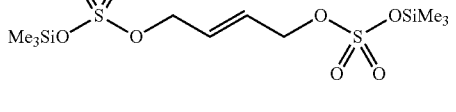
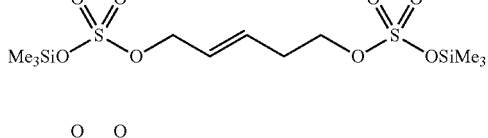
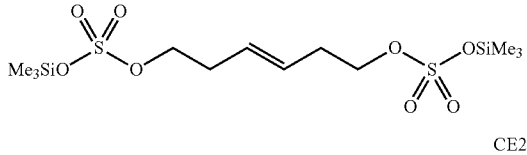
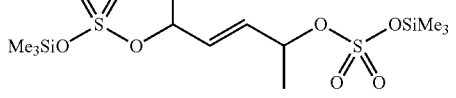

[Chem. 47]

[Chem. 48]

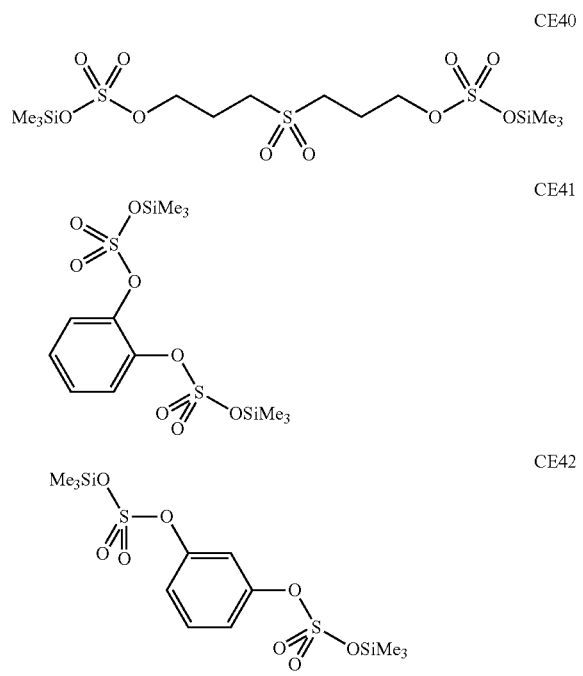
[b] The case of q=3:
[Chem. 49]
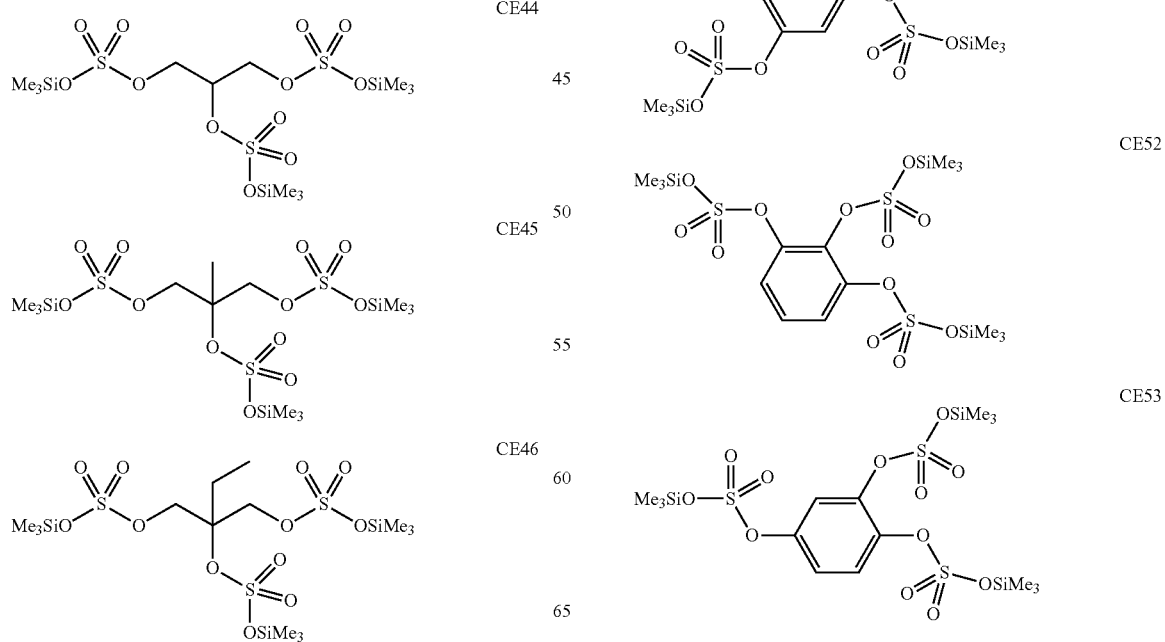
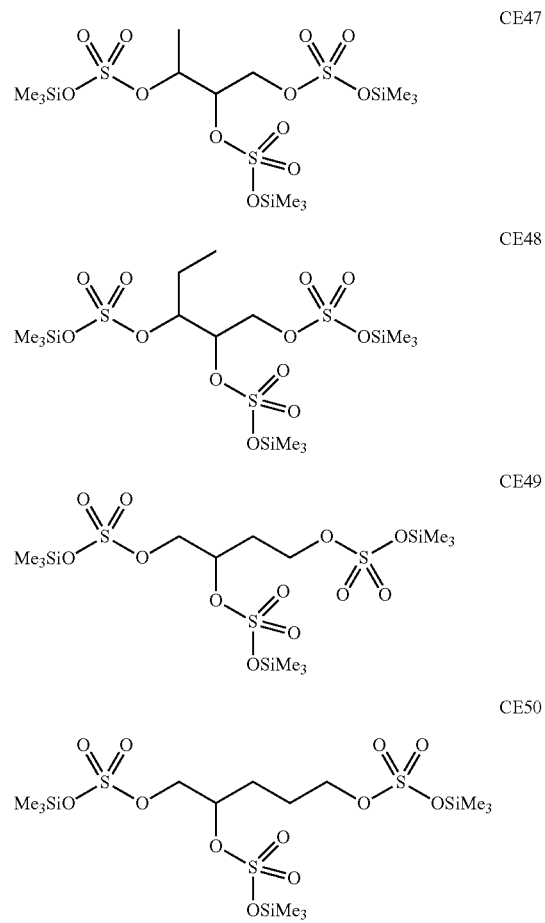

[c] The case of q=4:

[Chem. 50]

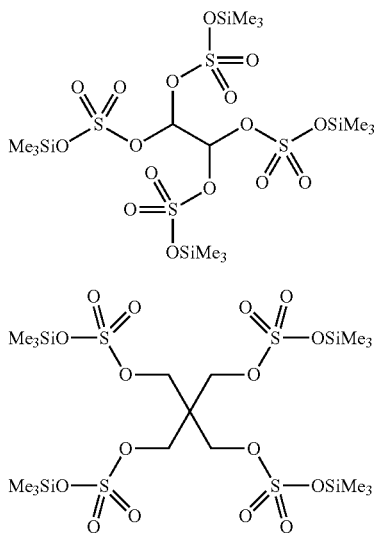

Among the compounds represented by the foregoing general formula (III-2), one or more selected from Compounds CE1 to CE8, CE10 to CE13, CE17, CE20, CE22, CE29, CE31 to CE34, CE39, and CE43 to CE46 are preferred; and one or more selected from ethane-1,2-diyl bis(trimethylsilyl)bis(sulfate) (Compound CE1), propane-1,3-diyl bis(trimethylsilyl)bis(sulfate) (Compound CE2), butane-1,4-diyl bis(trimethylsilyl)bis(sulfate) (Compound CE3), pentane-1,5-diyl bis(trimethylsilyl)bis(sulfate) (Compound CE4), hexane-1,6-diyl bis(trimethylsilyl)bis(sulfate) (Compound CE5), propane-1,2-diyl bis(trimethylsilyl)bis (sulfate) (Compound CE6), butane-1,3-diyl bis(trimethylsilyl)bis(sulfate) (Compound CE7), butane-2,3-diyl bis(trimethylsilyl)bis(sulfate) (Compound CE8), 2,2-difluoropropane-1,3-diyl bis(trimethylsilyl)bis(sulfate) (Compound CE11), 2,2,3,3-tetrafluorobutane-1,4-diyl bis(trimethylsilyl)bis(sulfate) (Compound CE12), 2-butene-1,4-diyl bis(trimethylsilyl)bis(sulfate) (Compound CE17), 2-butyne-1,4-diyl bis(trimethylsilyl)bis(sulfate) (Compound CE22), cyclohexane-1,4-diyl bis(trimethylsilyl)bis(sulfate) (Compound CE31), oxybis(ethane-2,1-diyl)bis(trimethylsilyl)bis(sulfate) (Compound CE33), and sulfonyl bis(ethane-2,1-diyl)bis(trimethylsilyl)bis(sulfate) (Compound CE39) are more preferred.

In the nonaqueous electrolytic solution of the present invention, a content of the compound represented by the foregoing general formula (III), (III-1), or (III-2), which is contained in the nonaqueous electrolytic solution, is preferably 0.001% to 5% by mass in the nonaqueous electrolytic solution. So long as the content is 5% by mass or less, there is less concern that a surface film is excessively formed on the electrode, thereby worsening the low-temperature properties, and so long as the content is 0.001% by mass or more, the formation of a surface film is satisfactory, and the effect for improving high-temperature storage properties is increased. Thus, the foregoing range is preferred. The content is more preferably 0.05% by mass or more, and still more preferably 0.1% by mass or more in the nonaqueous electrolytic solution. Its upper limit is more preferably 3% by mass or less, and still more preferably 1% by mass or less.

[SO$_4$ Group-Containing Compounds Represented by the General Formula (IV)]

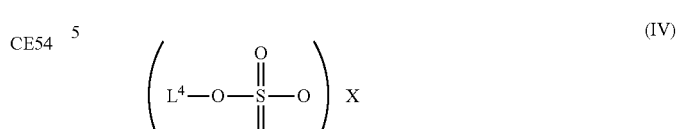

wherein $L^4$ represents an alkyl group having 1 to 12 carbon atoms, an alkenyl group having 2 to 6 carbon atoms, an alkynyl group having 3 to 6 carbon atoms, an alkoxyalkyl group having 2 to 12 carbon atoms, a —$CR^{41}R^{42}C(=O)OR^{43}$ group, or an aryl group having 6 to 12 carbon atoms, X represents an $SiR^{44}R^{45}$ group, a quaternary onium, an alkali metal belonging to the third or fourth period of the Periodic Table, or an alkaline earth metal belonging to the third or fourth period of the Periodic Table, and r is an integer of 1 or 2, provided that when X is a quaternary onium or an alkali metal belonging to the third or fourth period of the Periodic Table, then r is 1, and when X is an $SiR^{44}R^{45}$ group or an alkaline earth metal belonging to the third or fourth period of the Periodic Table, then r is 2, each of $R^{41}$ and $R^{42}$ independently represents a hydrogen atom, a halogen atom, or an alkyl group having 1 to 4 carbon atoms, $R^{43}$ represents an alkyl group having 1 to 8 carbon atoms, an alkenyl group having 2 to 6 carbon atoms, or an alkynyl group having 3 to 6 carbon atoms, and each of $R^{44}$ and $R^{45}$ independently represents an alkyl group having 1 to 12 carbon atoms, an alkenyl group having 2 to 3 carbon atoms, or an aryl group having 6 to 8 carbon atoms, and in each of the alkyl group and the aryl group, at least one hydrogen atom may be substituted with a halogen atom.

In the foregoing general formula (IV), $L^4$ is preferably an alkyl group having 1 to 8 carbon atoms, an alkenyl group having 3 to 4 carbon atoms, an alkynyl group having 3 to 4 carbon atoms, an alkoxyalkyl group having 2 to 8 carbon atoms, a —$CR^{41}R^{42}C(=O)OR^{43}$ group, or an aryl group having 6 to 10 carbon atoms, and more preferably an alkyl group having 1 to 4 carbon atoms, in which at least one hydrogen atom may be substituted with a halogen atom, an alkenyl group having 3 carbon atoms, an alkynyl group having 3 carbon atoms, an alkoxyalkyl group having 2 to 4 carbon atoms, a —$CR^{41}R^{42}C(=O)OR^{43}$ group, or an aryl group having 6 to 8 carbon atoms.

Specific examples and suitable examples in the case where $L^4$ is a group other than the —$CR^{41}R^{42}C(=O)OR^{43}$ group are basically the same as the specific examples and suitable examples in the case where $L^{31}$ is a group other than the —$CR^{34}R^{35}C(=O)OR^{36}$ group, and a fluorine atom is also preferred.

In addition, in the case where $L^4$ is a —$CR^{41}R^{42}C(=O)OR^{43}$ group, each of $R^{41}$ and $R^{42}$ is preferably a hydrogen atom or an alkyl group having 1 to 3 carbon atoms, in which at least one hydrogen atom may be substituted with a halogen atom, and more preferably a hydrogen atom or an alkyl group having 1 carbon atom.

Specific examples and suitable examples of $R^{41}$ and $R^{42}$ are the same as the specific examples and suitable examples of $R^{34}$ and $R^{35}$ as described above in the case where $L^{31}$ is the —$CR^{34}R^{35}C(=O)OR^{36}$ group.

In the —$CR^{44}R^{42}C(=O)OR^{43}$ group, $R^{43}$ is preferably an alkyl group having 1 to 3 carbon atoms, in which at least one hydrogen atom may be substituted with a halogen atom, an alkenyl group having 2 to 4 carbon atoms, or an alkynyl group having 3 to 4 carbon atoms.

Specific examples and suitable examples of $R^{43}$ are the same as the specific examples and suitable examples of $R^{36}$ in the case where $L^{31}$ is the —$CR^{34}R^{35}C(=O)OR^{36}$ group.

Specific examples and suitable examples in the case where $L^4$ is the —$CR^{41}R^{42}C(=O)OR^{43}$ group are the same as the specific examples and suitable examples in the case where $L^{31}$ is the —$CR^{34}R^{35}C(=O)OR^{36}$ group.

(The Case where X is an $SiR^{44}R^{45}$ Group)

In the general formula (IV), in the case where X is an $SiR^{44}R^{45}$ group, each of $R^{44}$ and $R^{45}$ independently represents an alkyl group having 1 to 12 carbon atoms, an alkenyl group having 2 to 3 carbon atoms, or an aryl group having 6 to 8 carbon atoms, preferably an alkyl group having 1 to 6 carbon atoms, and preferably 1 to 4 carbon atoms, an alkenyl group having 2 carbon atoms, or an aryl group having 6 to 7 carbon atoms, more preferably an alkyl group having 1 to 2 carbon atoms or an aryl group having 6 carbon atoms, and still more preferably an alkyl group having 1 carbon atom.

Specific examples and suitable examples of $R^{44}$ and $R^{45}$ are the same as the specific examples and suitable examples of $R^{31}$ to $R^{33}$ as described above. $R^{44}$ and $R^{45}$ may be bonded to each other to form a ring.

In the case where X is an $SiR^{44}R^{45}$ group, specifically, as the $SO_4$ group-containing compound represented by the foregoing general formula (IV), there are suitably exemplified the following compounds.

[Chem. 52]

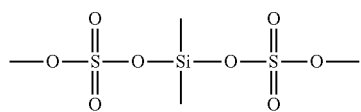
DA52

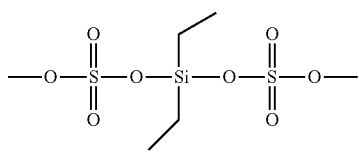
DA53

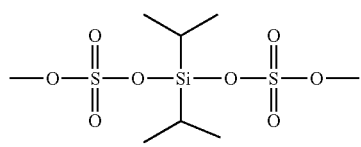
DA54

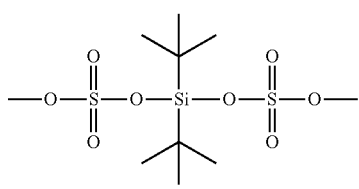
DA55

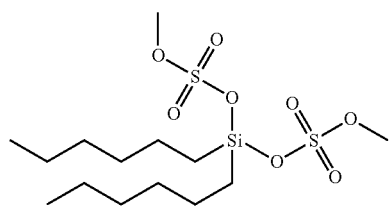
DA56

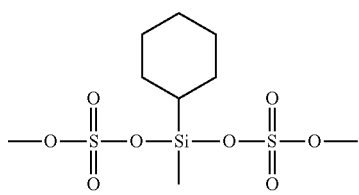
DA57

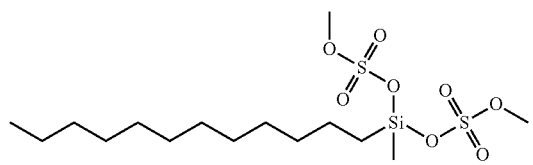
DA58

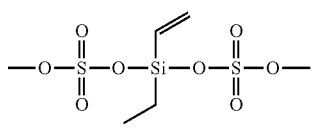
DA59

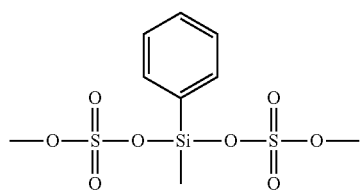
DA60

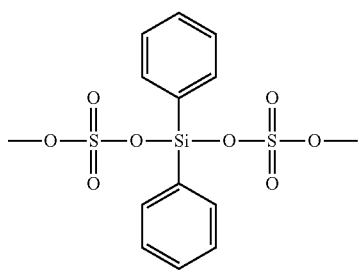
DA61

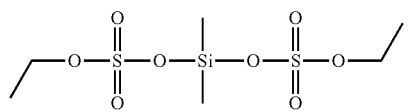
DA62

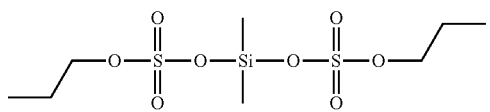
DA63

-continued
DA64
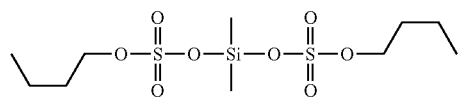
DA65
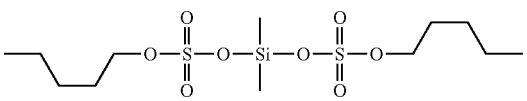
DA66
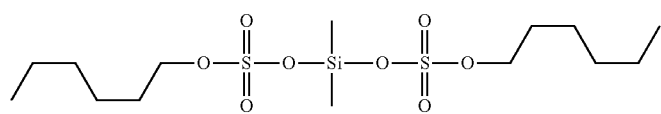
DA67
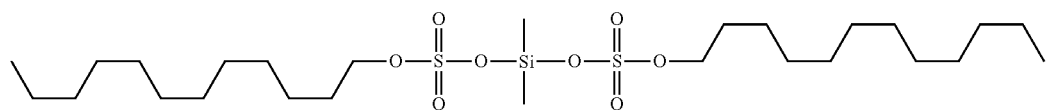
DA68
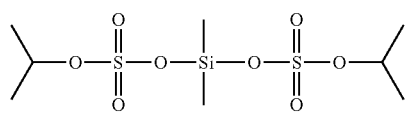
DA69
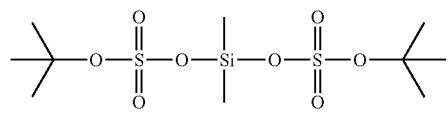
DA70
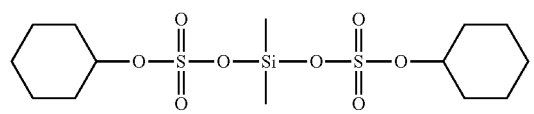
DA71
DA72
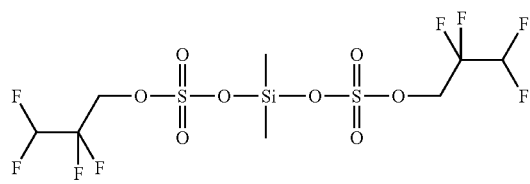
DA73
DA74
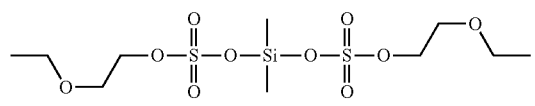
DA75
DA76
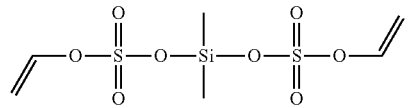
DA77
DA78
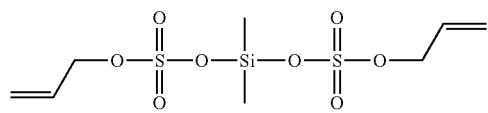
[Chem. 53]
DA79
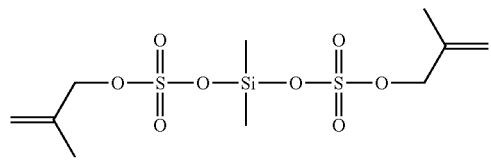
DA80
DA81
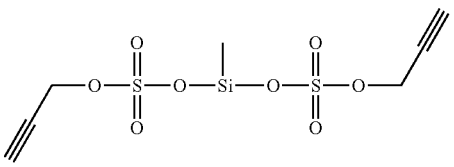
DA82

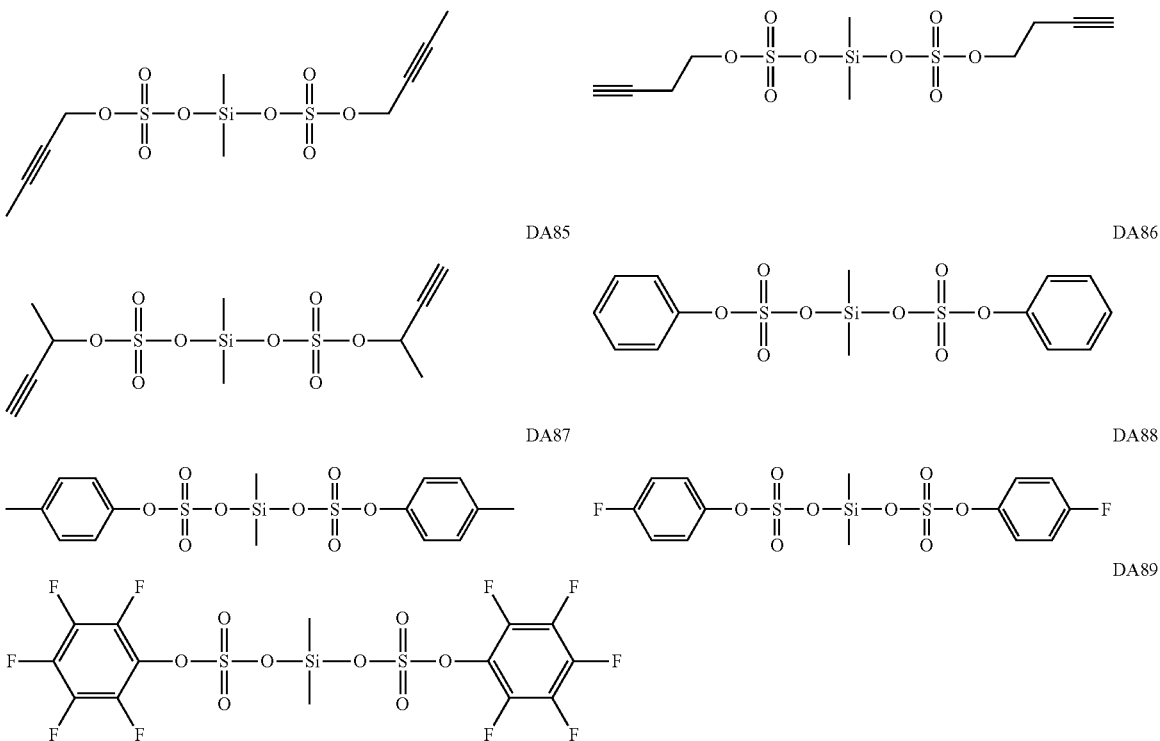

Among the aforementioned SO₄ group-containing compounds, Compounds DA52 to DA66, DA68 to DA70, and DA73 to DA89 are preferred; Compounds DA52, DA62 to DA66, and DA73 to DA89 are more preferred; and one or more selected from bis(methoxysulfonyloxy)dimethylsilane (Compound DA52), bis(ethoxysulfonyloxy)dimethylsilane (Compound DA62), bis(n-propyloxysulfonyloxy)dimethylsilane (Compound DA63), bis(n-butyloxysulfonyloxy)dimethylsilane (Compound DA64), bis(isopropyloxysulfonyloxy)dimethylsilane (Compound DA68), bis(2,2,2-trifluoroethyloxysulfonyloxy)dimethylsilane (Compound DA73), bis(2,2,3,3-tetrafluoropropyloxysulfonyloxy)dimethylsilane (Compound DA74), bis(methoxyethyloxysulfonyloxy)dimethylsilane (Compound DA75), bis(methoxypropyloxysulfonyloxy)dimethylsilane (Compound DA77), bis(allyloxysulfonyloxy)dimethylsilane (Compound DA79), bis(2-propynyloxysulfonyloxy)dimethylsilane (Compound DA82), bis(phenyloxysulfonyloxy)dimethylsilane (Compound DA86), bis(4-fluorophenyloxysulfonyloxy)dimethylsilane (Compound DA88), and bis(pentafluorophenyloxysulfonyloxy)dimethylsilane (Compound DA89) are still more preferred.

(The Case where X is a Quaternary Onium)

In the general formula (IV), as specific examples in the case where X is a quaternary onium, there are exemplified those represented by the following general formula (IV-1).

$$Q^+R^{51}R^{52}R^{53}R^{54} \quad \text{(Iv-1)}$$

In the general formula (IV-1), Q represents an atom belonging to the group 15 of the Periodic Table, and each of $R^{51}$ to $R^{54}$ independently represents a hydrocarbon group having 1 to 20 carbon atoms. Each of $R^{51}$ to $R^{54}$ may be either an aliphatic hydrocarbon group or an aromatic hydrocarbon group, and may be bonded to each other to form a ring.

Q is preferably a nitrogen atom or a phosphorus atom.

As the hydrocarbon group having 1 to 20 carbon atoms, which is represented by each of $R^{51}$ to $R^{54}$, there are suitably exemplified an alkyl group having 1 to 6 carbon atoms, a cycloalkyl group having 1 to 16 carbon atoms, an aryl group having 6 to 10 carbon atoms, an aralkyl group having 6 to 10 carbon atoms, and the like.

Specific examples of the alkyl group having 1 to 6 carbon atoms include a methyl group, an ethyl group, an n-propyl group, an isopropyl group, an n-butyl group, a sec-butyl group, an isobutyl group, a tert-butyl group, and the like. Of those, a methyl group, an ethyl group, an n-propyl group, an n-butyl group, and the like are preferred.

Specific examples of the cycloalkyl group having 1 to 16 carbon atoms include a cyclopentyl group, a 2-methylcyclopentyl group, a 3-methylcyclopentyl group, a 2-ethylcyclopentyl group, a 3-ethylcyclopentyl group, a cyclohexyl group, a 2-methylcyclohexyl group, a 3-methylcyclohexyl group, a 4-methylcyclohexyl group, a 2-ethylcyclohexyl group, a 3-ethylcyclohexyl group, a 4-ethylcyclohexyl group, a bicyclo[3,2,1]oct-1-yl group, a bicyclo[3,2,1]oct-2-yl group, and the like. Of those, a cyclopentyl group, a 2-methylcyclopentyl group, a 3-methylcyclopentyl group, a cyclohexyl group, a 2-methylcyclohexyl group, a 3-methylcyclohexyl group, a 4-methylcyclohexyl group, and the like are preferred.

Specific examples of the aryl group having 6 to 10 carbon atoms include a phenyl group, a 2-methylphenyl group, a 3-methylphenyl group, a 4-methylphenyl group, a 2,3-dimethylphenyl group, and the like. Of those, a phenyl group is preferred.

Specific examples of the aralkyl group having 6 to 10 carbon atoms include a phenylmethyl group, a 1-phenylethyl group, a 2-phenylethyl group, a diphenylmethyl group, a triphenylmethyl group, and the like. Of those, a phenylmethyl group and a 2-phenylethyl group are preferred.

In the light of the above, preferred examples of the quaternary onium represented by the foregoing general formula (IV-1) include an aliphatic linear quaternary salt, an aliphatic cyclic ammonium, an aliphatic cyclic phosphonium, a nitrogen-containing heterocyclic aromatic cation, and the like.

As the aliphatic linear quaternary salt, a tetraalkylammonium, a tetraalkylphosphonium, and the like are especially preferred.

Specific examples of the tetraalkylammonium include tetramethylammonium, ethyltrimethylammonium, diethyldimethylammonium, triethylmethylammonium, tetraethylammonium, tetra-n-butylammonium, and the like.

Specific examples of the tetraalkylphosphonium include tetramethylphosphonium, ethyltrimethylphosphonium, diethyldimethylphosphonium, triethylmethylphosphonium, tetraethylphosphonium, tetra-n-butylphosphonium, and the like.

As the aliphatic cyclic ammonium, a pyrrolidinium, a morpholinium, an imidazolinium, a tetrahydropyrimidinium, a piperadinium, a piperidinium, a pyridinium, and the like are especially preferred.

Specific examples of the pyrrolidinium include N,N-dimethylpyrrolidium, N-ethyl-N-methylpyrrolidium, N,N-diethylpyrrolidium, and the like.

Specific examples of the morpholinium include N,N-dimethylmorpholinium, N-ethyl-N-methylmorpholinium, N,N-diethylmorpholinium, and the like.

Specific examples of the imidazolinium include N,N'-dimethylimidazolinium, N-ethyl-N'-methylimidazolinium, N,N'-diethylimidazolinium, 1,2,3-trimethylimidazolinium, and the like.

Specific examples of the tetrahydropyrimidinium include N,N'-dimethyltetrahydropyrimidinium, N-ethyl-N'-methyltetrahydropyrimidinium, N,N'-diethyltetrahydropyrimidinium, 1,2,3-trimethyltetrahydropyrimidinium, and the like.

Specific examples of the piperadinium include N,N',N'-trimethylpiperadinium, N-ethyl-N',N'-dimethylpiperadinium, N,N-diethyl-N'-methylpiperadinium, N,N,N'-triethylpiperadinium, and the like.

Specific examples of the piperidinium include N,N-dimethylpiperidinium, N-ethyl-N-methylpiperidinium, N,N-diethylpiperidinium, and the like.

Specific examples of the pyridinium include N-methylpyridinium, N-ethylpyridinium, 1,2-dimethylpyrimidinium, 1,3-dimethylpyrimidinium, 1,4-dimethylpyrimidinium, 1-ethyl-2-methylpyrimidinium, and the like.

In the foregoing general formula (IV), in the case where X is a quaternary onium, specifically, there are suitably exemplified the following compounds.

[Chem. 55]

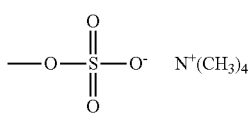
DB1

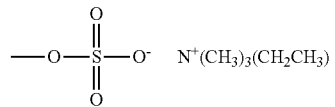
DB2

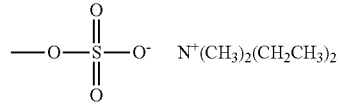
DB3

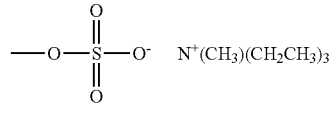
DB4

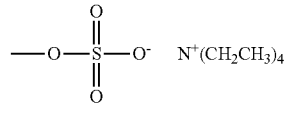
DB5

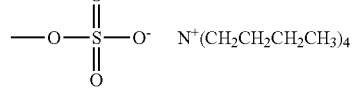
DB6

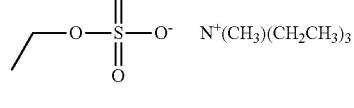
DB7

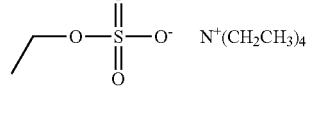
DB8

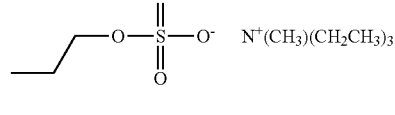
DB9

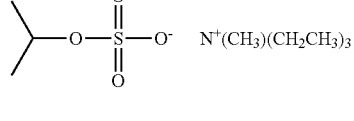
DB10

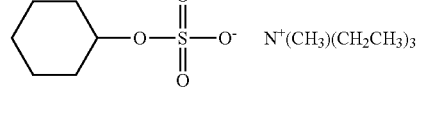
DB11

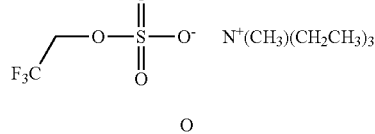
DB12

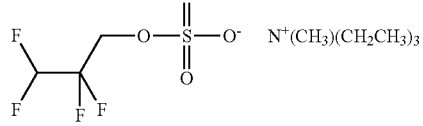
DB13

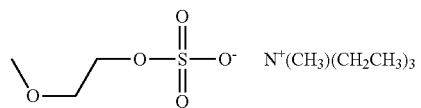
DB14

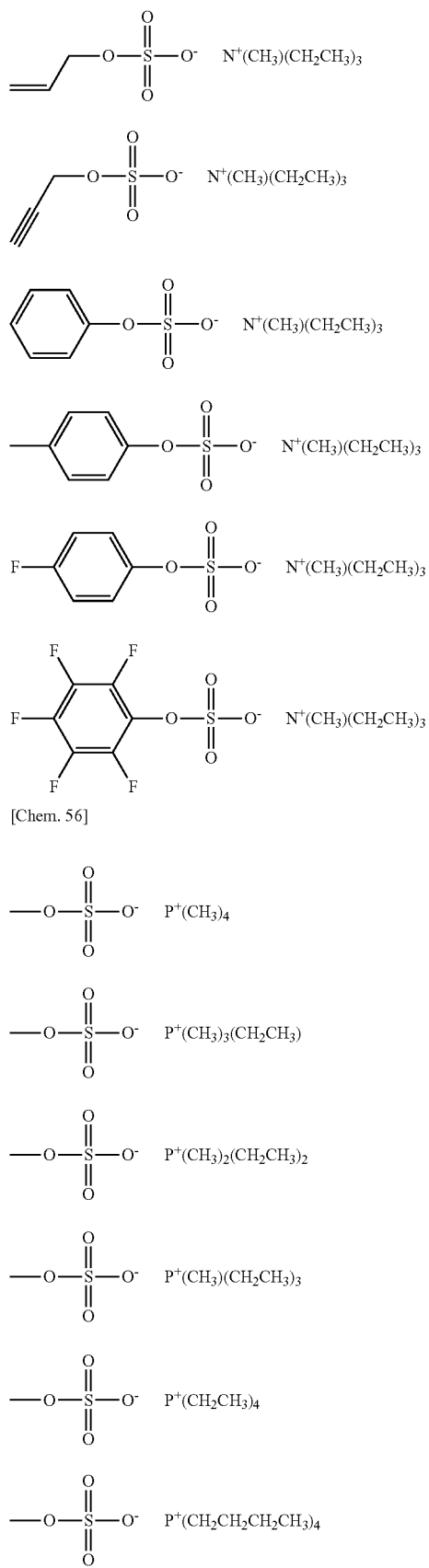
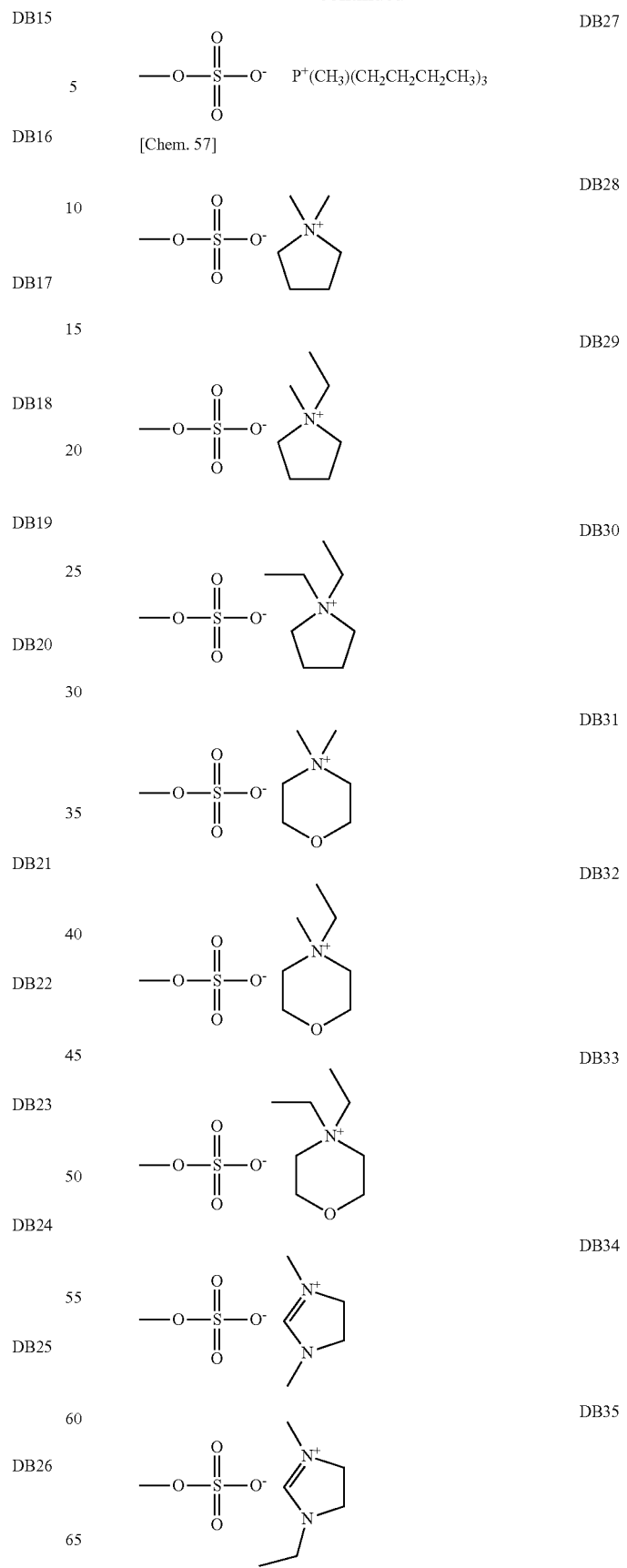

DB36 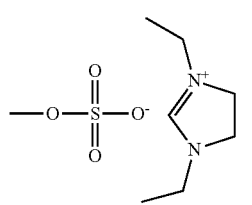
DB37 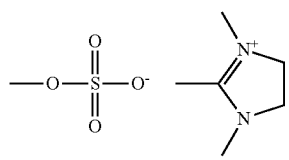
DB38 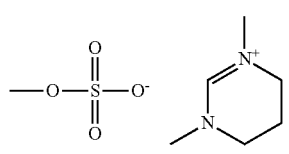
DB39 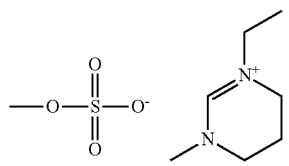
DB40 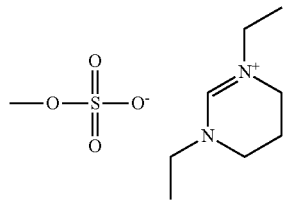
DB41 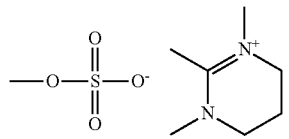
DB42 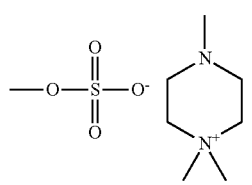
DB43 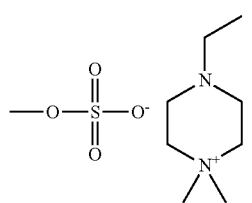
DB44 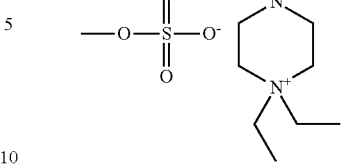
DB45 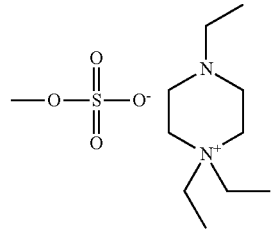
DB46 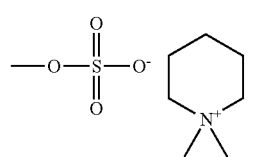
DB47 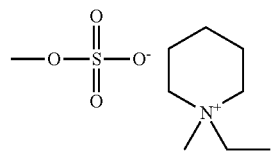
DB48 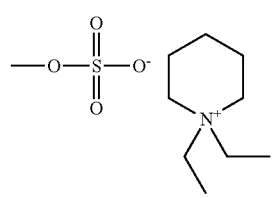
DB49 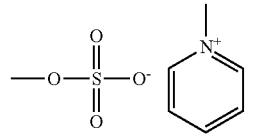
DB50 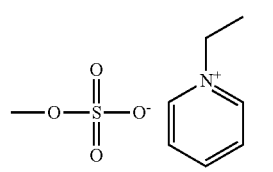
DB51 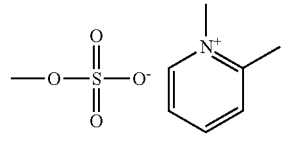
DB52

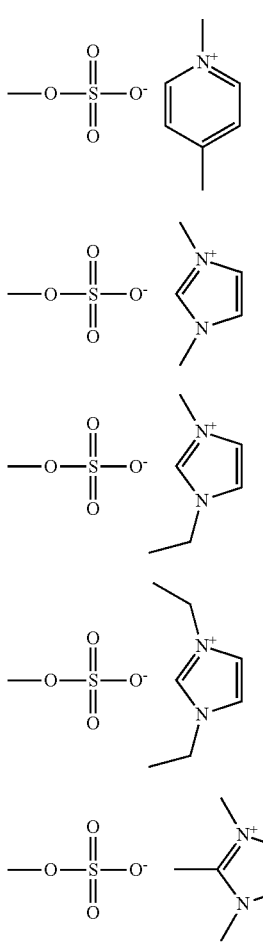

Among the aforementioned quaternary oniums, Compounds DB4, DB7, DB9 to DB20, DB26 to DB28, DB31, DB34, DB38, DB42, DB46, DB49, and DB54 are preferred; and one or more selected from triethylmethylammonium methyl sulfate (Compound DB4), triethylmethylammonium ethyl sulfate (Compound DB7), triethylmethylammonium isopropyl sulfate (Compound DB10), triethylmethylammonium 2,2,2-trifluoroethyl sulfate (Compound DB12), triethylmethylammonium 2,2,3,3-tetrapropyl sulfate (Compound DB13), triethylmethylammonium allyl sulfate (Compound DB15), triethylmethylammonium 2-propynyl sulfate (Compound DB16), triethylmethylammonium phenyl sulfate (Compound DB17), triethylmethylammonium fluorophenyl sulfate (Compound DB19), triethylmethylammonium pentafluorophenyl sulfate (Compound DB20), tetra-n-butylphosphonium methyl sulfate (Compound DB26), methyl tri-n-butylphosphonium methyl sulfate (Compound DB27), N-methylpyridinium methyl sulfate (Compound DB49), and N,N'-dimethylimidazolium methyl sulfate (Compound DB54) are more preferred.

(The Case where X is an Alkali Metal Belonging to the Third or Fourth Period of the Periodic Table)

In the case where X is an alkali metal belonging to the third or fourth period of the Periodic Table, the $SO_4$ group-containing compound represented by the foregoing general formula (IV) is preferably a sodium salt or a potassium salt, and more preferably a sodium salt. As specific examples thereof, there are suitably exemplified the following compounds.

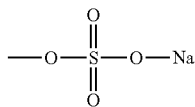

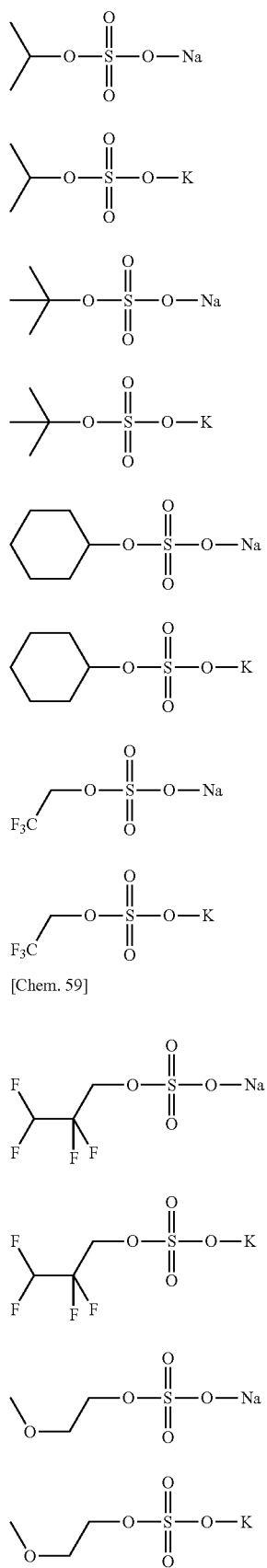
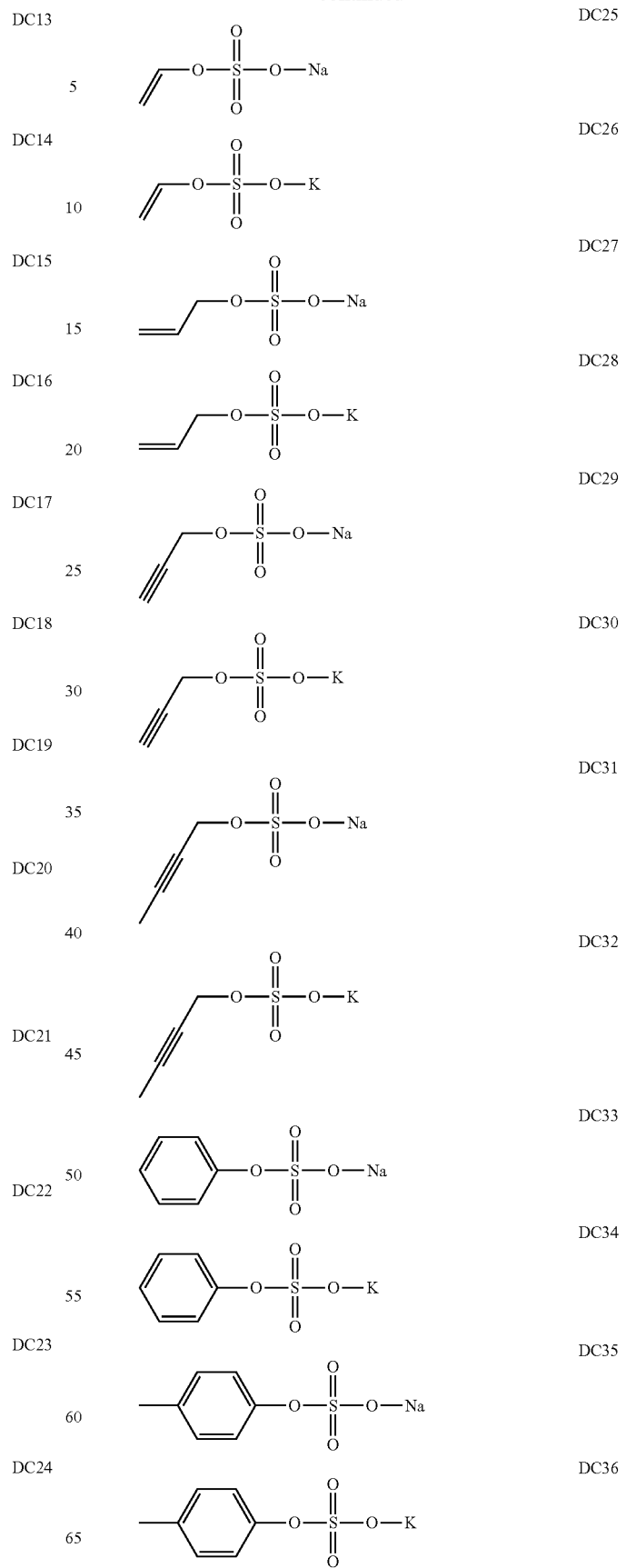

-continued

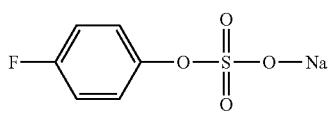
DC37

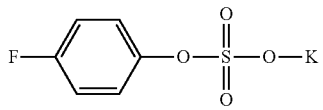
DC38

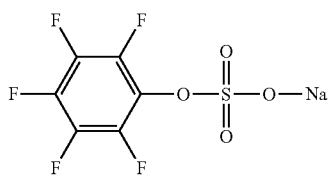
DC39

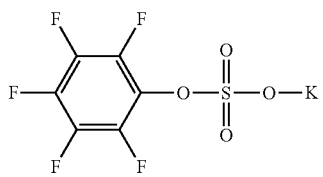
DC40

Among the aforementioned compounds, Compounds DC1 to DC8, DC13 to DC14, DC19 to DC24, DC27 to DC30, and DC33 to DC40 are preferred; and one or more selected from sodium methyl sulfate (Compound DC1), sodium ethyl sulfate (Compound DC3), sodium n-propyl sulfate (Compound DC5), sodium n-butyl sulfate (Compound DC7), sodium isopropyl sulfate (Compound DC13), sodium 2,2,2-trifluoroethyl sulfate (Compound DC19), sodium 2,2,3,3-tetrafluoropropyl sulfate (Compound DC21), sodium allyl sulfate (Compound DC27), sodium 2-propynyl sulfate (Compound DC29), sodium phenyl sulfate (Compound DC33), sodium 4-fluorophenyl sulfate (Compound DC37), and sodium pentafluorophenyl sulfate (Compound DC39) are more preferred.

(The Case where X is an Alkaline Earth Metal Belonging to the Third or Fourth Period of the Periodic Table)

In the case where X is an alkaline earth metal belonging to the third or fourth period of the Periodic Table, the $SO_4$ group-containing compound represented by the foregoing general formula (IV) is preferably a magnesium salt or a calcium salt, and more preferably a magnesium salt. As specific examples thereof, there are suitably exemplified the following compounds.

[Chem. 60]

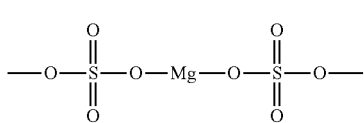 DD1
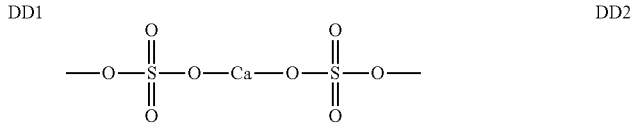 DD2
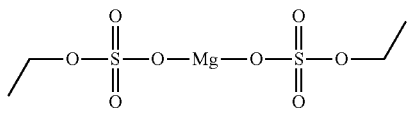 DD3
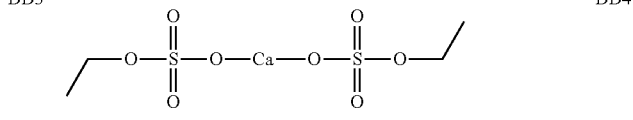 DD4
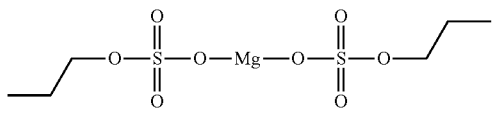 DD5
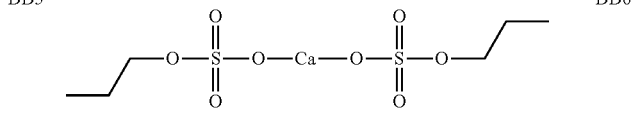 DD6
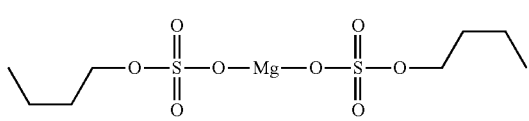 DD7
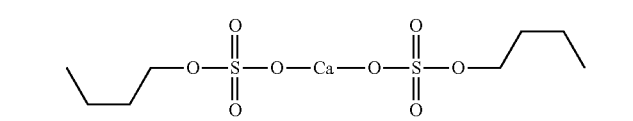 DD8
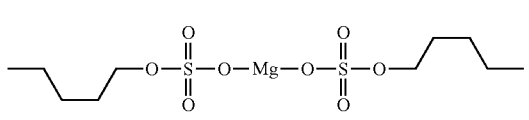 DD9
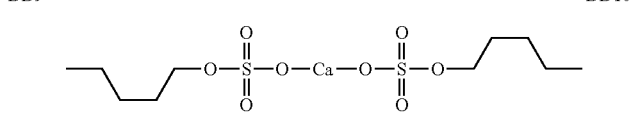 DD10
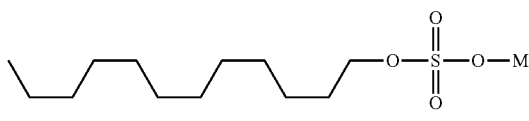 DD11
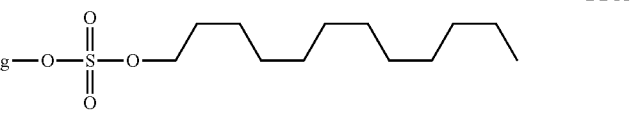 DD12

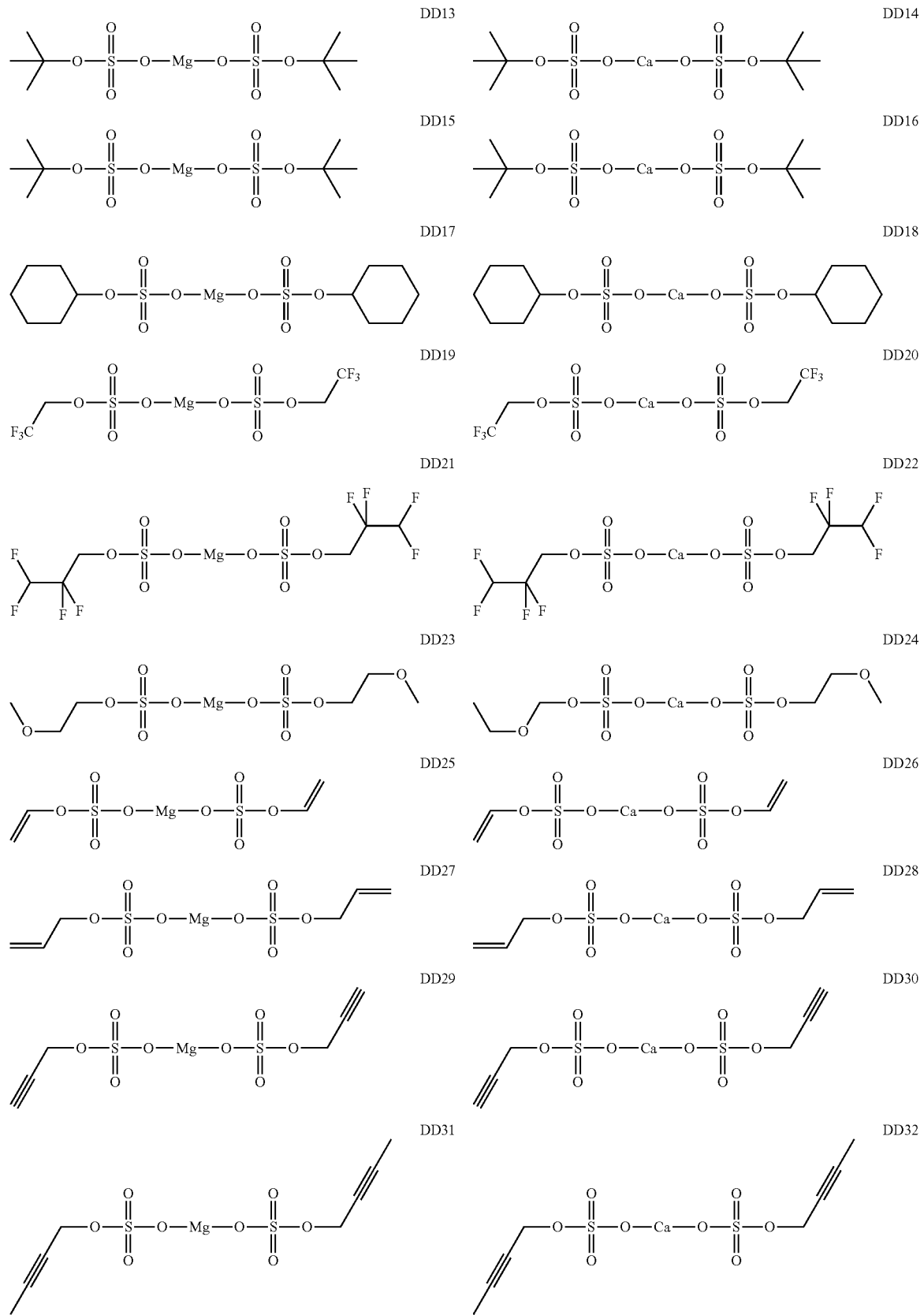

DD33

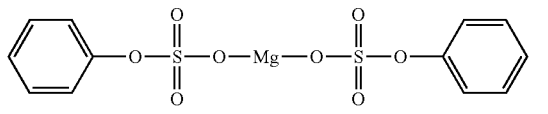

DD34

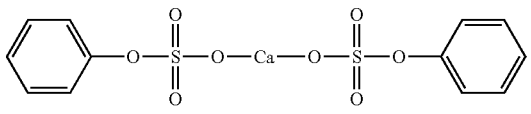

DD35

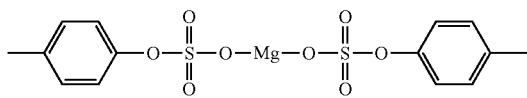

DD36

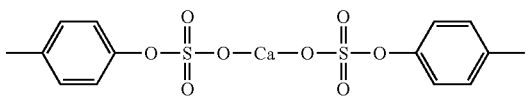

DD37

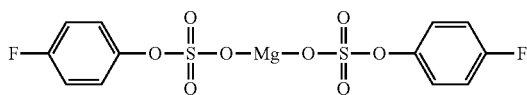

DD38

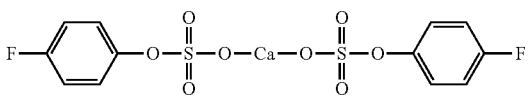

DD39

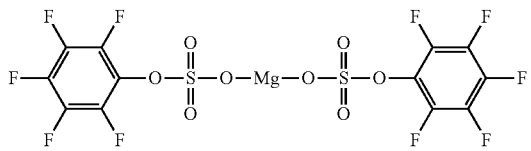

DD40

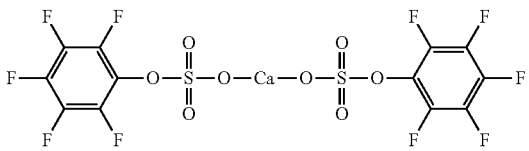

Among the aforementioned $SO_4$ group-containing compounds, Compounds DD1 to DD8, DD13 to DD16, DD19 to DD24, DD27 to DD30, and DD33 to DD40 are preferred; and one or more selected from magnesium methyl sulfate (Compound DD1), magnesium ethyl sulfate (Compound DD3), magnesium n-propyl sulfate (Compound DD5), magnesium n-butyl sulfate (Compound DD7), magnesium iso-propyl sulfate (Compound DD13), magnesium 2,2,2-trifluoroethyl sulfate (Compound DD19), magnesium 2,2,3,3-tetrafluoropropyl sulfate (Compound DD21), magnesium allyl sulfate (Compound DD27), magnesium 2-propynyl sulfate (Compound DD29), magnesium phenyl sulfate (Compound DD33), magnesium 4-fluorophenyl sulfate (Compound DD37), and magnesium pentafluorophenyl sulfate (Compound DD39) are more preferred.

Among the compounds represented by the foregoing general formula (IV), compounds wherein X is an $SiR^{44}R^{45}$ group, an alkali metal belonging to the third or fourth period of the Periodic Table, or an alkaline earth metal belonging to the third or fourth period of the Periodic Table are more preferred, and compounds wherein X is an $SiR^{44}R^{45}$ group are still more preferred.

In the nonaqueous electrolytic solution of the present invention, a content of the compound represented by the foregoing general formula (IV), which is contained in the nonaqueous electrolytic solution, is preferably 0.001% to 5% by mass in the nonaqueous electrolytic solution. So long as the content is 5% by mass or less, there is less concern that a surface film is excessively formed on the electrode, thereby worsening the low-temperature properties, and so long as the content is 0.001% by mass or more, the formation of a surface film is satisfactory, and the effect for improving high-temperature storage properties is increased. Thus, the foregoing range is preferred. The content is more preferably 0.05% by mass or more, and still more preferably 0.1% by mass or more in the nonaqueous electrolytic solution. Its upper limit is more preferably 3% by mass or less, and still more preferably 1% by mass or less. However, in the general formula (IV), in the case of a compound in which X has an $SiR^{44}R^{45}$ group, its upper limit is preferably 3% or less, and more preferably 2% or less.

In the nonaqueous electrolytic solution of the present invention, the use of a combination of at least two or more selected from the $SO_4$ group-containing compounds represented by any one of the foregoing general formulae (I) to (IV) is more preferred because the effect for improving electrochemical characteristics in a broad temperature range is increased, and a combination of at least one selected from the $SO_4$ group-containing compounds represented by the foregoing general formula (I) and at least one selected from the $SO_4$ group-containing compounds represented by any one of the foregoing general formulae (II) to (IV) is still more preferred.

In the nonaqueous electrolytic solution of the present invention, by combining at least one selected from the $SO_4$ group-containing compounds represented by any one of the foregoing general formulae (I) to (IV) with a nonaqueous solvent, an electrolyte salt, and other additive as described below, there is revealed a peculiar effect such that the electrochemical characteristics are synergistically improved in a broad temperature range.

[Nonaqueous Solvent]

Suitable examples of the nonaqueous solvent which is used for the nonaqueous electrolytic solution of the present invention include one or more selected from a cyclic carbonate, a linear ester, a lactone, an ether, and an amide. From the viewpoint of synergistically improving the electrochemical characteristics in a broad temperature range, it is preferred to contain a linear ester, it is more preferred to contain a linear carbonate, and it is the most preferred to contain both a cyclic carbonate and a linear carbonate.

The term "linear ester" is used as a concept including a linear carbonate and a linear carboxylic acid ester.

Examples of the cyclic carbonate include one or more selected from ethylene carbonate (EC), propylene carbonate (PC), 1,2-butylene carbonate, 2,3-butylene carbonate; a cyclic carbonate having a carbon-carbon unsaturated bond, such as vinylene carbonate (VC), vinyl ethylene carbonate (VEC), 4-ethynyl-1,3-dioxolan-2-one (EEC), etc.; and a cyclic carbonate having a fluorine atom, such as 4-fluoro-1,3-dioxolan-2-one (FEC), trans- or cis-4,5-difluoro-1,3-dioxolan-2-one (the both will be hereunder named generically as "DFEC"), etc. One or more selected from ethylene carbonate, propylene carbonate, 4-fluoro-1,3-dioxolan-2-one, vinylene carbonate, and 4-ethynyl-1,3-dioxolan-2-one (EEC) are more suitable.

Use of at least one of the aforementioned cyclic carbonates having a carbon-carbon unsaturated bond, such as a carbon-carbon double bond, a carbon-carbon triple bond, etc., or a fluorine atom is preferred because a low-temperature load characteristic after high-temperature charging storage is much more improved, and it is more preferred to contain both the aforementioned cyclic carbonate containing a carbon-carbon unsaturated bond and the aforementioned cyclic carbonate having a fluorine atom. As the cyclic carbonate having a carbon-carbon unsaturated bond, VC, VEC, and EEC are more preferred, and as the cyclic carbonate having a fluorine atom, FEC and DFEC are more preferred.

A content of the cyclic carbonate having a carbon-carbon unsaturated bond is preferably 0.07% by volume or more, more preferably 0.2% by volume or more, and still more preferably 0.7% by volume or more relative to a total volume of the nonaqueous solvent, and when an upper limit thereof is preferably 7% by volume or less, more preferably 4% by volume or less, and still more preferably 2.5% by volume or less, stability of a surface film at the time of high-temperature storage may be much more increased without impairing Li ion permeability at low temperatures, and hence, such is preferred.

A content of the cyclic carbonate having a fluorine atom is preferably 0.07% by volume or more, more preferably 4% by volume or more, and still more preferably 7% by volume or more relative to a total volume of the nonaqueous solvent, and when an upper limit thereof is preferably 35% by volume or less, more preferably 25% by volume or less, and still more preferably 15% by volume or less, stability of a surface film at the time of high-temperature storage may be much more increased without impairing Li ion permeability at low temperatures, and hence, such is preferred.

In the case where the nonaqueous solvent contains both the aforementioned cyclic carbonate having a carbon-carbon unsaturated bond and the aforementioned cyclic carbonate having a fluorine atom, a content of the cyclic carbonate having a carbon-carbon unsaturated bond is preferably 0.2% by volume or more, more preferably 3% by volume or more, and still more preferably 7% by volume or more relative to a content of the cyclic carbonate having a fluorine atom, and when an upper limit thereof is preferably 40% by volume or less, more preferably 30% by volume or less, and still more preferably 15% by volume or less, stability of a surface film at the time of high-temperature storage may be much more increased without impairing Li ion permeability at low temperatures, and hence, such is especially preferred.

When the nonaqueous solvent contains ethylene carbonate and/or propylene carbonate, resistance of a surface film formed on an electrode becomes small, and hence, such is preferred. A content of ethylene carbonate and/or propylene carbonate is preferably 3% by volume or more, more preferably 5% by volume or more, and still more preferably 7% by volume or more relative to a total volume of the nonaqueous solvent, and an upper limit thereof is preferably 45% by volume or less, more preferably 35% by volume or less, and still more preferably 25% by volume or less.

These solvents may be used solely, and in the case where a combination of two or more of the solvents is used, the electrochemical characteristics are more improved in a broad temperature range, and hence, such is preferred, and use of a combination of three or more thereof is especially preferred. As suitable combinations of these cyclic carbonates, EC and PC; EC and VC; PC and VC; VC and FEC; EC and FEC; PC and FEC; FEC and DFEC; EC and DFEC; PC and DFEC; VC and DFEC; VEC and DFEC; VC and EEC; EC and EEC; EC, PC and VC; EC, PC and FEC; EC, VC and FEC; EC, VC and VEC; EC, VC and EEC; EC, EEC and FEC; PC, VC and FEC; EC, VC and DFEC; PC, VC and DFEC; EC, PC, VC and FEC; EC, PC, VC and DFEC; and the like are preferred. Among the aforementioned combinations, combinations, such as EC and VC; EC and FEC; PC and FEC; EC, PC and VC; EC, PC and FEC; EC, VC and FEC; EC, VC and EEC; EC, EEC and FEC; PC, VC and FEC; EC, PC, VC and FEC; etc., are more preferred.

As the linear ester, there are suitably exemplified one or more asymmetric linear carbonates selected from methyl ethyl carbonate (MEC), methyl propyl carbonate (MPC), methyl isopropyl carbonate (MIPC), methyl butyl carbonate, and ethyl propyl carbonate; one or more symmetric linear carbonates selected from dimethyl carbonate (DMC), diethyl carbonate (DEC), dipropyl carbonate, and dibutyl carbonate; and one or more linear carboxylic acid esters selected from pivalic acid esters, such as methyl pivalate, ethyl pivalate, propyl pivalate, etc., methyl propionate, ethyl propionate, methyl acetate, and ethyl acetate.

Among the aforementioned linear esters, linear esters having a methyl group, which are selected from dimethyl carbonate, methyl ethyl carbonate, methyl propyl carbonate, methyl isopropyl carbonate, methyl butyl carbonate, methyl propionate, methyl acetate, and ethyl acetate, are preferred, and linear carbonates having a methyl group are especially preferred.

In the case of using a linear carbonate, it is preferred to use two or more kinds thereof. Furthermore, it is more preferred that both a symmetric linear carbonate and an asymmetric linear carbonate are contained, and it is still more preferred that a content of the symmetric linear carbonate is more than that of the asymmetric linear carbonate.

Although a content of the linear ester is not particularly limited, it is preferred to use the linear ester in an amount in the range of from 60 to 90% by volume relative to a total volume of the nonaqueous solvent. When the content is 60% by volume or more, the viscosity of the nonaqueous electrolytic solution does not become excessively high, whereas it is 90% by volume or less, there is less concern that an electroconductivity of the nonaqueous electrolytic solution decreases, thereby worsening the electrochemical characteristics in a broad temperature range, and therefore, it is preferred that the content of the linear ester falls within the foregoing range.

A proportion of the volume of the symmetric linear carbonate occupying in the linear carbonate is preferably 51% by volume or more, and more preferably 55% by volume or more. An upper limit thereof is more preferably 95% by volume or less, and still more preferably 85% by volume or less. It is especially preferred that dimethyl carbonate is contained as the symmetric linear carbonate. It is more preferred that the asymmetric linear carbonate has a methyl group, and methyl ethyl carbonate is especially preferred.

The aforementioned case is preferred because the electrochemical characteristics in a much broader temperature range are improved.

As for a proportion of the cyclic carbonate and the linear carbonate, from the viewpoint of improving the electrochemical characteristics in a broad temperature range, a ratio of the cyclic carbonate to the linear carbonate (volume ratio)

is preferably from 10/90 to 45/55, more preferably from 15/85 to 40/60, and especially preferably from 20/80 to 35/65.

As other nonaqueous solvents, there are suitably exemplified one or more selected from cyclic ethers, such as tetrahydrofuran, 2-methyltetrahydrofuran, 1,4-dioxane, etc.; linear ethers, such as 1,2-dimethoxyethane, 1,2-diethoxyethane, 1,2-dibutoxyethane, etc.; amides, such as dimethylformamide, etc.; sulfones, such as sulfolane, etc.; and lactones, such as γ-butyrolactone, γ-valerolactone, α-angelicalactone, etc.

As for the aforementioned nonaqueous solvent, in order to achieve appropriate physical properties, a mixture thereof is generally used. As a combination thereof, for example, there are suitably exemplified a combination of a cyclic carbonate and a linear carbonate, a combination of a cyclic carbonate and a linear carboxylic acid ester, a combination of a cyclic carbonate, a linear carbonate, and a lactone, a combination of a cyclic carbonate, a linear carbonate, and an ether, a combination of a cyclic carbonate, a linear carbonate, and a linear carboxylic acid ester, and the like.

For the purpose of improving the electrochemical characteristics in a much broader temperature range, it is preferred to further add other additive in the nonaqueous electrolytic solution.

As specific examples of other additive, there are suitably exemplified the following compounds (a) to (j).

(a) Nitrile

One or more nitriles selected from acetonitrile, propionitrile, succinonitrile, glutaronitrile, adiponitrile, pimelonitrile, suberonitrile, and sebaconitrile.

Above, one or more selected from succinonitrile, glutaronitrile, adiponitrile, and pimelonitrile are more preferred.

(b) Aromatic Compound:

Aromatic compounds having a branched alkyl group, such as cyclohexylbenzene, fluorocyclohexylbenzene compounds (e.g., 1-fluoro-2-cyclohexylbenzene, 1-fluoro-3-cyclohexylbenzene, or 1-fluoro-4-cyclohexylbenzene), tert-butylbenzene, tert-amylbenzene, 1-fluoro-4-tert-butylbenzene, etc.; and aromatic compounds, such as biphenyl, terphenyl (o-, m-, or p-form), diphenyl ether, fluorobenzene, difluorobenzene (o-, m-, or p-form), anisole, 2,4-difluoroanisole, partial hydrides of terphenyl (e.g., 1,2-dicyclohexylbenzene, 2-phenylbicyclohexyl, 1,2-diphenylcyclohexane, or o-cyclohexylbiphenyl), etc.

Above all, one or more selected from biphenyl, terphenyl (o-, m-, or p-form), fluorobenzene, cyclohexylbenzene, tert-butylbenzene, and tert-amylbenzene are more preferred, and one or more selected from biphenyl, o-terphenyl, fluorobenzene, cyclohexylbenzene, and tert-amylbenzene are especially preferred.

(c) Isocyanate Compound:

One or more isocyanate compounds selected from methyl isocyanate, ethyl isocyanate, butyl isocyanate, phenyl isocyanate, tetramethylene diisocyanate, hexamethylene diisocyanate, octamethylene diisocyanate, 1,4-phenylene diisocyanate, 2-isocyanatoethyl acrylate, and 2-isocyanatoethyl methacrylate.

Above all, one or more selected from hexamethylene diisocyanate, octamethylene diisocyanate, 2-isocyanatoethyl acrylate, and 2-isocyanatoethyl methacrylate are more preferred.

(d) Triple Bond-Containing Compound:

One or more triple bond-containing compounds selected from 2-propynyl methyl carbonate, 2-propynyl acetate, 2-propynyl formate, 2-propynyl methacrylate, 2-propynyl methanesulfonate, 2-propynyl vinylsulfonate, 2-propynyl 2-(methanesulfonyloxy)propionate, di(2-propynyl) oxalate, methyl 2-propynyl oxalate, ethyl 2-propynyl oxalate, di(2-propynyl) glutarate, 2-butyne-1,4-diyl dimethanesulfonate, 2-butyne-1,4-diyl diformate, and 2,4-hexadiyne-1,6-diyl dimethanesulfonate.

Above all, one or more selected from 2-propynyl methyl carbonate, 2-propynyl methacrylate, 2-propynyl methanesulfonate, 2-propynyl vinylsulfonate, 2-propynyl 2-(methanesulfonyloxy)propionate, di(2-propynyl) oxalate, methyl 2-propynyl oxalate, ethyl 2-propynyl oxalate, and 2-butyne-1,4-diyl dimethanesulfonate are preferred, and one or more selected from 2-propynyl methanesulfonate, 2-propynyl vinylsulfonate, 2-propynyl 2-(methanesulfonyloxy)propionate, di(2-propynyl) oxalate, and 2-butyne-1,4-diyl dimethanesulfonate are more preferred.

(e) S=O Group-Containing Compound:

One or more S=O group-containing compounds selected from sultones, such as 1,3-propanesultone, 1,3-butanesultone, 2,4-butanesultone, 1,4-butanesultone, 1,3-propenesultone, 2,2-dioxide-1,2-oxathiolane-4-yl acetate, 5,5-dimethyl-1,2-oxathiolane-4-one 2,2-dioxide, etc.; cyclic sulfite, such as ethylene sulfite, hexahydrobenzo[1,3,2]dioxathiolane-2-oxide (also called 1,2-cyclohexanediol cyclic sulfite), 5-vinyl-hexahydro-1,3,2-benzodioxathiol-2-oxide, etc.; sulfonic acid ester compounds, such as butane-2,3-diyl dimethanesulfonate, butane-1,4-diyl dimethanesulfonate, methylene methanedisulfonate, etc.; and vinylsulfone compounds, such as divinylsulfone, 1,2-bis(vinylsulfonyl) ethane, bis(2-vinylsulfonylethyl) ether, etc.

Above all, it is preferred to use a cyclic or linear S=O group-containing compound selected from sultones, cyclic sulfites, sulfonic acid esters, and vinylsulfones (however, the triple bond-containing compounds and the specified lithium salts represented by the foregoing general formula (I) are not included).

Suitable examples of the cyclic S=O group-containing compound include one or more selected from 1,3-propanesultone, 1,3-butanesultone, 1,4-butanesultone, 2,4-butanesultone, 1,3-propenesultone, 2,2-dioxide-1,2-oxathiolane-4-yl acetate, 5,5-dimethyl-1,2-oxathiolane-4-one, 2,2-dioxide, methylene methanedisulfonate, ethylene sulfite, and 4-(methylsulfonylmethyl)-1,3,2-dioxathiolane 2-oxide.

Suitable examples of the linear S=O group-containing compound include one or more selected from butane-2,3-diyl dimethanesulfonate, butane-1,4-diyl dimethanesulfonate, dimethyl methanedisulfonate, pentafluorophenyl methanesulfonate, divinylsulfone, and bis(2-vinylsulfonylethyl) ether.

Among the aforementioned cyclic or linear S=O group-containing compounds, one or more selected from 1,3-propanesultone, 1,4-butanesultone, 2,4-butanesultone, 2,2-dioxide-1,2-oxathiolane-4-yl acetate, 5,5-dimethyl-1,2-oxathiolane-4-one 2,2-dioxide, butane-2,3-diyl dimethanesulfonate, pentafluorophenyl methanesulfonate, and divinylsulfone.

(f) Cyclic Acetal Compound:

Cyclic acetal compounds, such as 1,3-dioxolane, 1,3-dioxane, 1,3,5-trioxane, etc. Above all, 1,3-dioxolane and 1,3-dioxane are preferred, and 1,3-dioxane is more preferred.

(g) Phosphorus-Containing Compound:

Examples thereof include one or more phosphorus-containing compounds selected from trimethyl phosphate, tributyl phosphate, trioctyl phosphate, tris(2,2,2-trifluoroethyl) phosphate, bis(2,2,2-trifluoroethyl)methyl phosphate, bis(2,2,2-trifluoroethyl)ethyl phosphate, bis(2,2,2-trifluoroethyl)

2,2-difluroethyl phosphate, bis(2,2,2-trifluoroethyl)2,2,3,3-tetrafluoropropyl phosphate, bis(2,2-difluoroethyl)2,2,2-trifluoroethyl phosphate, bis(2,2,3,3-tetrafluoropropyl)2,2,2-trifluoroethyl phosphate, (2,2,2-trifluroethyl)(2,2,3,3-tetrafluoropropyl)methyl phosphate, tris(1,1,1,3,3,3-hexafluoropropan-2-yl)phosphate, methyl methylenebisphosphonate, ethyl methylenebisphosphonate, methyl ethylenebisphosphonate, ethyl ethylenebisphosphonate, methyl butylenebisphosphonate, ethyl butylenebisphosphonate, methyl 2-(dimethylphosphoryl)acetate, ethyl 2-(dimethylphosphoryl)acetate, methyl 2-(diethylphosphoryl)acetate, ethyl 2-(diethylphosphoryl)acetate, 2-propynyl 2-(dimethylphosphoryl)acetate, 2-propynyl 2-(diethylphosphoryl)acetate, methyl 2-(dimethoxyphosphoryl)acetate, ethyl 2-(dimethoxyphosphoryl)acetate, methyl 2-(diethoxyphosphoryl)acetate, ethyl 2-(diethoxyphosphoryl)acetate, 2-propynyl 2-(dimethoxyphosphoryl)acetate, 2-propynyl 2-(diethoxyphosphoryl)acetate, methyl pyrophosphate, and ethyl pyrophosphate.

Above all, tris(2,2,2-trifluoroethyl)phosphate, tris(1,1,1,3,3,3-hexafluoropropan-2-yl)phosphate, methyl 2-(dimethylphosphoryl)acetate, ethyl 2-(dimethylphosphoryl)acetate, methyl 2-(diethylphosphoryl)acetate, ethyl 2-(diethylphosphoryl)acetate, 2-propynyl 2-(dimethylphosphoryl)acetate, 2-propynyl 2-(diethylphosphoryl)acetate, methyl 2-(dimethoxyphosphoryl)acetate, ethyl 2-(dimethoxyphosphoryl)acetate, methyl 2-(diethoxyphosphoryl)acetate, ethyl 2-(diethoxyphosphoryl)acetate, 2-propynyl 2-(dimethoxyphosphoryl)acetate, and 2-propynyl 2-(diethoxyphosphoryl)acetate are preferred, and tris(2,2,2-trifluoroethyl)phosphate, tris(1,1,1,3,3,3-hexafluoropropan-2-yl)phosphate, ethyl 2-(diethylphosphoryl)acetate, 2-propynyl 2-(dimethylphosphoryl)acetate, 2-propynyl 2-(diethylphosphoryl)acetate, ethyl 2-(diethoxyphosphoryl)acetate, 2-propynyl 2-(dimethoxyphosphoryl)acetate, and 2-propynyl 2-(diethoxyphosphoryl)acetate are more preferred.

(h) Cyclic Acid Anhydride:

Suitable examples thereof include linear carboxylic anhydrides, such as acetic anhydride, propionic anhydride, etc., and cyclic acid anhydrides, such as succinic anhydride, maleic anhydride, 2-allyl succinic anhydride, glutaric anhydride, itaconic anhydride, 3-sulfo-propionic anhydride, etc.

Above all, succinic anhydride, maleic anhydride, and 2-allyl succinic anhydride are preferred, and succinic anhydride and 2-allyl succinic anhydride are more preferred.

(i) Cyclic Phosphazene Compound:

Suitable examples thereof include cyclic phosphazene compounds, such as methoxypentafluorocyclotriphosphazene, ethoxypentafluorocyclotriphosphazene, phenoxypentafluorocyclotriphosphazene, ethoxyheptafluorocyclotetraphosphazene, etc.

Above all, cyclic phosphazene compounds, such as methoxypentafluorocyclotriphosphazene, ethoxypentafluorocyclotriphosphazene, phenoxypentafluorocyclotriphosphazene, etc., are preferred, and methoxypentafluorocyclotriphosphazene, and ethoxypentafluorocyclotriphosphazene are more preferred.

(j) Fluorine-Containing Compound:

Examples of the fluorine-containing compound include a compound represented by the following general formula (V):

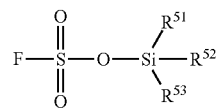

(V)

wherein each of $R^{51}$ to $R^{53}$ independently represents an alkyl group having 1 to 12 carbon atoms, an alkenyl group having 2 to 3 carbon atoms, an aryl group having 6 to 8 carbon atoms, or an $S(=O)_2F$ group.

Each of $R^{51}$ to $R^{53}$ is preferably an alkyl group having 1 to 4 carbon atoms, an alkenyl group having 2 carbon atoms, or an aryl group having 6 to 7 carbon atoms, more preferably an alkyl group having 1 to 2 carbon atoms or an aryl group having 6 carbon atoms, and still more preferably an alkyl group having 1 carbon atom.

$R^{51}$ to $R^{53}$ may be bonded to each other to form a ring.

As specific examples of $R^{51}$ to $R^{53}$, there are suitably exemplified a straight-chain alkyl group, such as a methyl group, an ethyl group, an n-propyl group, an n-butyl group, an n-pentyl group, an n-hexyl group, an n-heptyl group, an n-octyl group, an n-decyl group, an n-dodecyl group, etc.; a branched alkyl group, such as an isopropyl group, a sec-butyl group, a tert-butyl group, a tert-amyl group, a 2-ethylhexyl group, etc.; a cycloalkyl group, such as a cyclopentyl group, a cyclohexyl group, etc.; an alkenyl group, such as a vinyl group, a 2-propenyl group, etc.; an aryl group, such as a phenyl group, a 2-methylphenyl group, a 3-methylphenyl group, a 4-methylphenyl group, a 4-tert-butylphenyl group, a 2-fluorophenyl group, a 4-fluorophenyl group, a 4-trifluoromethylphenyl group, a 2,4-difluorophenyl group, a perfluorophenyl group, etc.; and an $S(=O)_2F$ group.

Above all, a methyl group, an ethyl group, an n-propyl group, an n-butyl group, an isopropyl group, a sec-butyl group, a tert-butyl group, a vinyl group, a phenyl group, a 4-methylphenyl group, a 4-fluorophenyl group, and a perfluorophenyl group are more preferred, and a methyl group is still more preferred.

As the fluorine-containing compound represented by the foregoing general formula (V), in addition to bis(fluorosulfonyloxy)dimethylsilane, specifically, there are suitably exemplified the following compounds.

[Chem. 63]

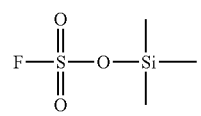

A41

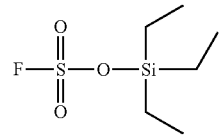

A42

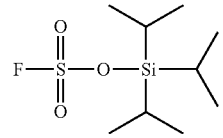

A43

A44

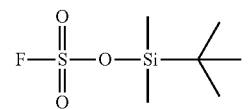

A45

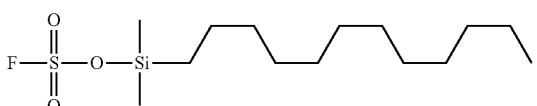

A46

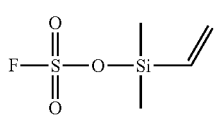

A47

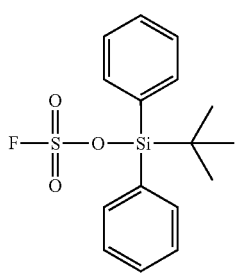

A48

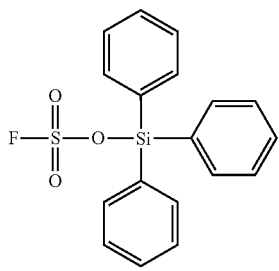

A49

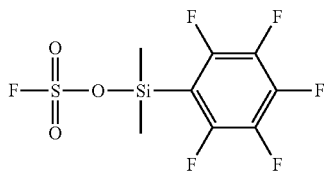

Among the aforementioned compounds, trimethylsilyl fluorosulfonate (Compound A41), triethylsilyl fluorosulfonate (Compound A42), triisopropylsilyl fluorosulfonate (Compound A43), tert-butyldimethylsilyl fluorosulfonate (Compound A44), and tert-butyldiphenylsilyl fluorosulfonate (Compound A47) are preferred, trimethylsilyl fluorosulfonate (Compound A41), triethylsilyl fluorosulfonate (Compound A42), and triisopropylsilyl fluorosulfonate (Compound A43) are more preferred, and trimethylsilyl fluorosulfonate (Compound A41) is still more preferred.

Among the foregoing, when at least one selected from the nitrile (a), the aromatic compound (b), and the isocyanate compound (c) is contained, the electrochemical characteristics in a much broader temperature range are improved, and hence, such is preferred.

A content of each of the compounds (a) to (c) is preferably 0.01 to 7% by mass in the nonaqueous electrolytic solution. In this range, a surface film is thoroughly formed without becoming excessively thick, and the effect for improving electrochemical characteristics in a broad temperature range is increased. The content is more preferably 0.05% by mass or more, and still more preferably 0.1% by mass or more in the nonaqueous electrolytic solution. Its upper limit is more preferably 5% by mass or less, and still more preferably 3% by mass or less.

When the triple bond-containing compound (d), the cyclic or linear S=O group-containing compound (e) selected from a sultone compound, a cyclic sulfite, a sulfonic acid ester, and a vinylsulfone, the cyclic acetal compound (f), the phosphorus-containing compound (g), the cyclic acid anhydride (h), the cyclic phosphazene compound (i), or the fluorine-containing compound (j) is contained, the electrochemical characteristics in a much broader temperature range are improved, and hence, such is preferred.

A content of each of the compounds (d) to (j) is preferably 0.001 to 5% by mass in the nonaqueous electrolytic solution. In this range, a surface film is thoroughly formed without becoming excessively thick, and the effect for improving electrochemical characteristics in a broad temperature range is increased. The content is more preferably 0.01% by mass or more, and still more preferably 0.1% by mass or more in the nonaqueous electrolytic solution. Its upper limit is more preferably 3% by mass or less, and still more preferably 2% by mass or less.

[Electrolyte Salt]

As the electrolyte salt which is used in the present invention, there are suitably exemplified the following lithium salts.

[Li Salt—Class 1]

One or more "complex salts of a Lewis acid and LiF" selected from $LiPF_6$, $LiBF_4$, $LiAsF_6$, $LiSbF_6$, $LiPF_4(CF_3)_2$, $LiPF_3(C_2F_5)_3$, $LiPF_3(CF_3)_3$, $LiPF_3(iso-C_3F_7)_3$, and $LiPF_5(iso-C_3F_7)$ are suitably exemplified. Above all, $LiPF_6$, $LiBF_4$, and $LiAsF_6$ are preferred, and $LiPF_6$ and $LiBF_4$ are more preferred.

[Li Salt—Class 2]

One or more "imide or methide lithium salts" selected from $LiN(SO_2O_2)$, $LiN(SO_2CFO_2)$, $LiN(SO_2C_2F_5)_2$, $(CF_2)_2(SO_2)_2NLi$ (cyclic), $(CF_2)_3(SO_2)_2NLi$ (cyclic), and $LiC(SO_2CFO_3$ are suitably exemplified. Above all, $LiN(SO_2O_2$, $LiN(SO_2CF_3)_2$, and $LiN(SO_2C_2F_5)_2$ are preferred, and $LiN(SO_2O_2$ and $LiN(SO_2CFO_2$ are more preferred.

[Li Salt—Class 3]

One or more "$S(=O)_2O$ structure-containing lithium salts" selected from $LiSO_3F$, $LiCF_3SO_3$, $CH_3SO_4Li$, $C_2H_5SO_4Li$, $C_3H_7SO_4Li$, lithium trifluoro((methanesulfonyl)oxy)borate (LiTFMSB), and lithium pentafluoro((methanesulfonyl)oxy)phosphate (LiPFMSP) are suitably exemplified. Above all, $LiSO_3F$, $CH_3SO_4Li$, $C_2H_5SO_4Li$, and LiTFMSB are more preferred.

[Li Salt—Class 4]

One or more "P=O or Cl=O structure-containing lithium salts" selected from $LiPO_2F_2$, $Li_2PO_3F$, and $LiClO_4$ are suitably exemplified. Above all, $LiPO_2F_2$ and $Li_2PO_3F$ are preferred.

[Li Salt—Class 5]

One or more "lithium salts containing an oxalate complex as an anion" selected from lithium bis[oxalate-O,O']borate (LiBOB), lithium difluoro[oxalate-O,O']borate, lithium difluorobis[oxalate-O,O']phosphate (LiPFO), and lithium tetrafluoro[oxalate-O,O']phosphate are suitably exemplified. Above all, LiBOB and LiPFO are more preferred.

These compounds may be used solely or in admixture of two or more kinds thereof.

Of those, one or more selected from $LiPF_6$, $LiPO_2F_2$, $Li_2PO_3F$, $LiBF_4$, $LiSO_3F$, lithium trifluoro((methanesulfonyl)oxy)borate (LiTFMSB), $LiN(SO_2F)_2$, $LiN(SO_2CF_3)_2$, $LiN(SO_2C_2F_5)_2$, lithium bis[oxalate-O,O']borate (LiBOB), lithium difluorobis[oxalate-O,O']phosphate (LiPFO), and lithium tetrafluoro[oxalate-O,O']phosphate are preferred, one or more selected from $LiPF_6$, $LiBF_4$, $LiSO_3F$, lithium trifluoro((methanesulfonyl)oxy)borate (LiTFMSB), $LiPO_2F_2$, $LiN(SO_2CF_3)_2$, $LiN(SO_2F)_2$, lithium bis[oxalate-O,O']borate (LiBOB), and lithium difluorobis[oxalate-O,O']phosphate (LiPFO) are more preferred, and $LiPF_6$ is most preferably used.

In general, a concentration of the lithium salt is preferably 0.3 M or more, more preferably 0.7 M or more, and still more preferably 1.1 M or more relative to the nonaqueous solvent. Its upper limit is preferably 2.5 M or less, more preferably 2.0 M or less, and still more preferably 1.6 M or less.

As a suitable combination of these lithium salts (excluding at least one selected from the $SO_4$ group-containing compounds represented by any one of the foregoing general formulae (I) to (IV)), a combination including $LiPF_6$ and one or more selected from $LiSO_3F$, $LiPO_2F_2$, $LiN(SO_2F)_2$, $LiN(SO_2CF_3)_2$, lithium bis[oxalate-O,O']borate (LiBOB), and lithium difluorobis[oxalate-O,O']phosphate (LiPFO) is more preferred. When a proportion of the lithium salt other than $LiPF_6$ occupying in the nonaqueous solvent is 0.001 M or more, the effect for improving electrochemical characteristics at high temperatures is liable to be exhibited, whereas when it is 0.8 M or less, there is less concern that the effect for improving electrochemical characteristics at high temperature is worsened, and hence, such is preferred. The proportion of the lithium salt other than $LiPF_6$ is preferably 0.01 M or more, especially preferably 0.03 M or more, and most preferably 0.04 M or more. Its upper limit is preferably 0.6 M or less, more preferably 0.4 M or less, and especially preferably 0.2 M or less.

In the case where $LiPF_6$ is contained in the nonaqueous electrolytic solution, when a ratio of at least one selected from the $SO_4$ group-containing compounds represented by any one of the foregoing general formulae (I) to (IV) of the invention of the present application to $LiPF_6$ in terms of a molar concentration is 0.0005 or more, the effect for improving electrochemical characteristics at high temperatures is liable to be exhibited, whereas when it is 0.3 or less, there is less concern that the effect for improving electrochemical characteristics at high temperatures is worsened, and hence, such is preferred. Its lower limit is more preferably 0.001 or more, and still more preferably 0.005 or more. Its upper limit is more preferably 0.2 or less, and still more preferably 0.1 or less.

As for the lithium salt which is combined with the $SO_4$ group-containing compound represented by the foregoing general formula (I-3), when a combination of lithium salts of plural groups among the Li salt—Classes 1 to 5 is used, the effect for improving electrochemical characteristics in a broad temperature range is increased, and hence, such is more preferred. A combination of the Class 1 with at least one of the Classes 2 to 5 is still more preferred. Above all, a combination of the Class 1 with at least one of the Classes 3 to 5 is especially preferred.

In the case where the Class 1 is combined with at least one of the Classes 2 to 5, a proportion of a total mass of the lithium salts of the Classes 2 to 5 relative to a total mass of the lithium salts of the Classes 1 to 5 is preferably 0.1% or more, and more preferably 1% or more. Its upper limit is preferably 49% or less, and more preferably 45% or less.

A lower limit of a proportion of the $SO_4$ group-containing compound represented by the general formula (I-3) in the whole of the electrolyte salts is preferably 25% or more, and more preferably 30% or more relative to a total mass of the whole of the electrolyte salts. An upper limit of the proportion is 100%, more preferably 80% or less, and especially preferably 60% or less.

In general, a molar concentration of the whole of the electrolyte salts contained in the nonaqueous electrolytic solution containing the $SO_4$ group-containing compound represented by the general formula (I-3) is preferably 0.3 M or more, more preferably 0.7 M or more, and still more preferably 1.1 M or more relative to the nonaqueous solvent. Its upper limit is preferably 2.5 M or less, more preferably 2.0 M or less, and still more preferably 1.6 M or less.

In general, a concentration of the whole of the electrolyte salts contained in the nonaqueous electrolytic solution containing the $SO_4$ group-containing compound represented by the general formula (I-3) is preferably 4% by mass or more, more preferably 9% by mass or more, and still more preferably 13% by mass or more. Its upper limit is preferably 30% by mass or less, more preferably 25% by mass or less, and still more preferably 20% by mass or less.

[Production of Nonaqueous Electrolytic Solution]

The nonaqueous electrolytic solution of the present invention may be, for example, obtained by mixing the aforementioned nonaqueous solvent and adding at least one selected from the $SO_4$ group-containing compounds represented by any one of the foregoing general formulae (I) to (IV) to the aforementioned electrolyte salt and the nonaqueous electrolytic solution.

At this time, the nonaqueous solvent used and the compounds added to the nonaqueous electrolytic solution are preferably purified previously to reduce as much as possible the content of impurities, in such an extent that does not extremely deteriorate the productivity.

The nonaqueous electrolytic solution of the present invention may be used in first to fourth energy storage devices shown below, in which the nonaqueous electrolyte may be used not only in the form of a liquid but also in the form of gel. Furthermore, the nonaqueous electrolytic solution of the present invention may also be used for a solid polymer electrolyte. Among those, the nonaqueous electrolytic solution is preferably used in the first energy storage device using a lithium salt as the electrolyte salt (i.e., for a lithium battery) or in the fourth energy storage device (i.e., for a lithium ion capacitor), more preferably used in a lithium battery, and still more preferably used in a lithium secondary battery.

[First Energy Storage Device (Lithium Battery)]

The lithium battery as referred to in the present specification is a generic name for a lithium primary battery and a lithium secondary battery. In the present specification, the term, lithium secondary battery, is used as a concept that includes a so-called lithium ion secondary battery. The lithium battery of the present invention contains a positive electrode, a negative electrode, and the aforementioned nonaqueous electrolytic solution having an electrolyte salt dissolved in a nonaqueous solvent. Other constitutional members used than the nonaqueous electrolytic solution, such as the positive electrode, the negative electrode, etc., are not particularly limited.

For example, as the positive electrode active material for lithium secondary batteries, usable is a complex metal oxide containing lithium and one or more selected from cobalt, manganese, and nickel. These positive electrode active materials may be used solely or in combination of two or more kinds thereof.

As the lithium complex metal oxides, for example, one or more selected from $LiCoO_2$, $LiMn_2O_4$, $LiNiO_2$, $LiCo_{1-x}$ $Ni_xO_2$ (0.01<x<1), $LiCo_{1/3}Ni_{1/3}Mn_{1/3}O_2$, $LiNi_{1/2}Mn_{3/2}O_4$, and $LiCo_{0.98}Mg_{0.02}O_2$ are exemplified. These materials may be used as a combination, such as a combination of $LiCoO_2$ and $LiMn_2O_4$, a combination of $LiCoO_2$ and $LiNiO_2$, and a combination of $LiMn_2O_4$ and $LiNiO_2$.

For improving the safety on overcharging and the cycle properties, and for enabling the use at a charge potential of 4.3 V or more, a part of the lithium complex metal oxide may be substituted with other elements. For example, a part of cobalt, manganese, or nickel may be substituted with at least one or more elements of Sn, Mg, Fe, Ti, Al, Zr, Cr, V, Ga, Zn, Cu, Bi, Mo, La, etc.; or a part of O may be substituted with S or F; or the oxide may be coated with a compound containing any of such other elements.

Of the aforementioned positive electrode active materials, preferred are lithium complex metal oxides, such as $LiCoO_2$, $LiMn_2O_4$, and $LiNiO_2$, with which the charge potential of the positive electrode in a fully-charged state may be used at 4.3 V or more based on Li; and more preferred are lithium complex metal oxides, such as $LiCo_{1-x}M_xO_2$ (wherein M is one or more elements selected from Sn, Mg, Fe, Ti, Al, Zr, Cr, V, Ga, Zn, and Cu; and $0.001 \le x \le 0.05$), $LiCo_{1/3}Ni_{1/3}Mn_{1/3}O_2$, $LiNi_{1/2}Mn_{3/2}O_4$, and a solid solution of $Li_2MnO_3$ and $LiMO_2$ (wherein M is a transition metal, such as Co, Ni, Mn, Fe, etc.), that may be used at 4.4 V or more. The use of the lithium complex metal oxide capable of acting at a high charge voltage may worsen the electrochemical characteristics particularly on using in a broad temperature range due to the reaction with the electrolytic solution on charging, but in the lithium secondary battery according to the present invention, the electrochemical characteristics may be prevented from worsening.

In particular, in the case of a positive electrode containing Mn, there is a tendency that the resistance of the battery is liable to increase with elution of an Mn ion from the positive electrode, so that there is a tendency that when used in a broad temperature range, the electrochemical characteristics are liable to be worsened. However, in the lithium secondary battery according to the present invention, the worsening of these electrochemical characteristics may be suppressed, and hence, such is preferred.

Furthermore, a lithium-containing olivine-type phosphate may also be used as the positive electrode active material. Especially preferred are lithium-containing olivine-type phosphates containing one or more selected from iron, cobalt, nickel, and manganese. Specific examples thereof include one or more selected from $LiFePO_4$, $LiCoPO_4$, $LiNiPO_4$, and $LiMnPO_4$.

These lithium-containing olivine-type phosphates may be partly substituted with any other element; and for example, a part of iron, cobalt, nickel, or manganese therein may be substituted with one or more elements selected from Co, Mn, Ni, Mg, Al, B, Ti, V, Nb, Cu, Zn, Mo, Ca, Sr, W, and Zr; or the phosphates may also be coated with a compound containing any of these other elements or with a carbon material. Among those, $LiFePO_4$ or $LiMnPO_4$ is preferred.

The lithium-containing olivine-type phosphate may be used, for example, in combination with the aforementioned positive electrode active material.

For the positive electrode for lithium primary batteries, there are suitably exemplified oxides or chalcogen compounds of one or more metal elements, such as CuO, $Cu_2O$, $Ag_2O$, $Ag_2CrO_4$, CuS, $Cu_5O_4$, $TiO_2$, $TiS_2$, $SiO_2$, SnO, $V_2O_5$, $V_6O_{12}$, $VO_x$, $Nb_2O_5$, $Bi_2O_3$, $Bi_2Pb_2O_5$, $Sb_2O_3$, $CrO_3$, $Cr_2O_3$, $MoO_3$, $WO_3$, $SeO_2$, $MnO_2$, $Mn_2O_3$, $Fe_2O_3$, FeO, $Fe_3O_4$, $Ni_{2O3}$, NiO, $CoO_3$, CoO, etc.; sulfur compounds, such as $SO_2$, $SOCl_2$, etc.; and carbon fluorides (graphite fluoride) represented by a general formula $(CF_x)_n$. Of those, $MnO_2$, $V_2O_5$, graphite fluoride, and the like are preferred.

In the case where a pH of a supernatant at the time of dispersing 10 g of the aforementioned positive electrode active material in 100 mL of distilled water is 10.0 to 12.5, the effect for improving electrochemical characteristics in a much broader temperature range is liable to be obtained, and hence, such is preferred. The case where the pH is 10.5 to 12.0 is more preferred.

In the case where Ni is contained as the element in the positive electrode, since there is a tendency that impurities, such as LiOH, etc., in the positive electrode active material increase, the effect for improving electrochemical characteristics in a much broader temperature range is liable to be obtained, and hence, such is preferred. The case where an atomic concentration of Ni in the positive electrode material is 5 to 25 atomic % is more preferred, and the case where it is 8 to 21 atomic % is especially preferred.

An electroconductive agent of the positive electrode is not particularly limited so long as it is an electron-conductive material that does not undergo a chemical change. Examples thereof include graphites, such as natural graphite (e.g., flaky graphite, etc.), artificial graphite, etc.; one or more carbon blacks selected from acetylene black, Ketjen black, channel black, furnace black, lamp black, and thermal black; and the like. Graphite and carbon black may be properly mixed and used. An addition amount of the electroconductive agent to the positive electrode mixture is preferably from 1 to 10% by mass, and especially preferably from 2 to 5% by mass.

The positive electrode may be produced by mixing the aforementioned positive electrode active material with an electroconductive agent, such as acetylene black, carbon black, etc., and a binder, such as polytetrafluoroethylene (PTFE), polyvinylidene fluoride (PVDF), a copolymer of styrene and butadiene (SBR), a copolymer of acrylonitrile and butadiene (NBR), carboxymethyl cellulose (CMC), an ethylene-propylene-diene terpolymer, etc., adding a high-boiling point solvent, such as 1-methyl-2-pyrrolidone, etc., thereto, followed by kneading to prepare a positive electrode mixture, applying this positive electrode mixture onto a collector, such as an aluminum foil, a stainless steel-made lath plate, etc., and drying and shaping the resultant under pressure, followed by a heat treatment in vacuum at a temperature of from about 50° C. to 250° C. for about 2 hours.

A density of a portion of the positive electrode except for the collector is generally 1.5 g/cm³ or more, and for the purpose of further increasing the capacity of the battery, the density is preferably 2 g/cm³ or more, more preferably 3 g/cm³ or more, and still more preferably 3.6 g/cm³ or more. An upper limit thereof is preferably 4 g/cm³ or less.

As the negative electrode active material for lithium secondary batteries, one or more selected from a lithium metal, lithium alloys, or carbon materials capable of absorbing and releasing lithium [e.g., graphitizable carbon, non-graphitizable carbon having a spacing of the (002) plane of 0.37 nm or more, graphite having a spacing of the (002) plane of 0.34 nm or less, etc.], tin (elemental substance), tin compounds, silicon (elemental substance), silicon compounds, lithium titanate compounds, such as $Li_4Ti_5O_{12}$, etc., or the like may be used in combination.

Of those, in absorbing and releasing ability of a lithium ion, it is more preferred to use a high-crystalline carbon material, such as artificial graphite, natural graphite, etc.; and it is still more preferred to use a carbon material having a graphite-type crystal structure in which a lattice (002) spacing ($d_{002}$) is 0.340 nm (nanometers) or less, especially from 0.335 to 0.337 nm.

In particular, it is preferred to use an artificial graphite particle having a bulky structure in which plural flat graphite fine particles are mutually gathered or bound in non-parallel, or a graphite particle prepared by subjecting a flaky natural graphite particle to a spheroidizing treatment by repeatedly giving a mechanical action, such as compression force, frictional force, shear force, etc.

When a ratio [I(110)/I(004)] of a peak intensity I(110) of the (110) plane to a peak intensity I(004) of the (004) plane of the graphite crystal, which is obtained from the X-ray diffraction measurement of a negative electrode sheet at the time of shaping under pressure of a portion of the negative electrode except for the collector in a density of 1.5 g/cm$^3$ or more, is 0.01 or more, the electrochemical characteristics in a much broader temperature range are improved, and hence, such is preferred. The peak intensity ratio [I(110)/I(004)] is more preferably 0.05 or more, and still more preferably 0.1 or more. When excessively treated, there may be the case where the crystallinity is worsened, and the discharge capacity of the battery is worsened, and therefore, an upper limit of the peak intensity ratio [I(110)/I(004)] is preferably 0.5 or less, and more preferably 0.3 or less.

When the high-crystalline carbon material (core material) is coated with a carbon material that is more low-crystalline than the core material, the electrochemical characteristics in a broad temperature range become much more favorable, and hence, such is preferred. The crystallinity of the carbon material of the coating may be confirmed by TEM.

When the high-crystalline carbon material is used, there is a tendency that it reacts with the nonaqueous electrolytic solution on charging, thereby worsening the electrochemical characteristics at low temperatures or high temperatures due to an increase of the interfacial resistance; however, in the lithium secondary battery according to the present invention, the electrochemical characteristics in a broad temperature range become favorable.

As the metal compound capable of absorbing and releasing lithium, serving as a negative electrode active material, there are exemplified compounds containing at least one metal element, such as Si, Ge, Sn, Pb, P, Sb, Bi, Al, Ga, In, Ti, Mn, Fe, Co, Ni, Cu, Zn, Ag, Mg, Sr, Ba, etc. These metal compounds may be in any form including an elemental substance, an alloy, an oxide, a nitride, a sulfide, a boride, and an alloy with lithium, and any of an elemental substance, an alloy, an oxide, and an alloy with lithium is preferred because the battery capacity may be increased. Above all, more preferred are those containing at least one element selected from Si, Ge, and Sn, and still more preferred are those containing at least one element selected from Si and Sn, as capable of increasing the battery capacity.

The negative electrode may be produced in such a manner that the same electroconductive agent, binder, and high-boiling point solvent as in the production of the aforementioned positive electrode are used and kneaded to provide a negative electrode mixture, and this negative electrode mixture is then applied onto a collector, such as a copper foil, etc., dried, shaped under pressure, and then heat-treated in vacuum at a temperature of from about 50 to 250° C. for about 2 hours.

A density of a portion of the negative electrode except for the collector is generally 1.1 g/cm$^3$ or more, and for the purpose of further increasing the capacity of the battery, the density is preferably 1.5 g/cm$^3$ or more, and more preferably 1.7 g/cm$^3$ or more. Its upper limit is preferably 2 g/cm$^3$ or less.

Examples of the negative electrode active material for a lithium primary battery include a lithium metal and a lithium alloy.

The structure of the lithium battery is not particularly limited, and may be a coin-type battery, a cylinder-type battery, a prismatic battery, a laminate-type battery, or the like, each having a single-layered or multi-layered separator.

Although the separator for the battery is not particularly limited, a single-layered or laminated micro-porous film of a polyolefin, such as polypropylene, polyethylene, etc., as well as a woven fabric, a nonwoven fabric, etc., may be used.

The lithium secondary battery of the present invention has excellent electrochemical characteristics in a broad temperature range even when the final charging voltage is 4.2 V or more, and particularly 4.3 V or more, and furthermore, the characteristics thereof are still good even at 4.4 V or more. Although the final discharging voltage may be generally 2.8 V or more, and further 2.5 V or more, the final discharging voltage of the lithium secondary battery of the present invention may be 2.0 V or more. Although a current value is not specifically limited, in general, the battery is used within the range of from 0.1 to 30 C. The lithium battery of the present invention may be charged/discharged at from −40 to 100° C., and preferably at from −10 to 80° C.

In the present invention, as a countermeasure against an increase in the internal pressure of the lithium battery, such a method may be adopted that a safety valve is provided in the battery cap, and a cutout is provided in the battery component, such as a battery can, a gasket, etc. As a safety countermeasure for preventing overcharging, a current cut-off mechanism capable of detecting an internal pressure of the battery to cut off the current may be provided in a battery cap.

[Secondary Energy Storage Device (Electric Double Layer Capacitor)]

The secondary energy storage device is an energy storage device that stores energy by utilizing the electric double layer capacitance in the interface between the electrolytic solution and the electrode therein. One example of the present invention is an electric double layer capacitor. The most typical electrode active material to be used in this energy storage device is active carbon. The double-layer capacitance increases almost in proportion to the surface area.

[Third Energy Storage Device]

The third energy storage device is an energy storage device that stores energy by utilizing the doping/dedoping reaction of the electrode therein. As the electrode active material for use in this energy storage device, there may be mentioned metal oxides, such as ruthenium oxide, iridium oxide, tungsten oxide, molybdenum oxide, copper oxide, etc.; and π-conjugated polymers, such as polyacene, polythiophene derivatives, etc. The capacitor that uses such an electrode active material enables energy storage along with the doping/dedoping reaction at the electrode therein.

[Fourth Energy Storage Device (Lithium Ion Capacitor)]

The fourth energy storage device is an energy storage device that stores energy by utilizing intercalation of a lithium ion into a carbon material, such as graphite, etc., servicing as the negative electrode. This energy storage device may also be referred to as a lithium ion capacitor (LIC). Examples of the positive electrode include one utilizing an electric double layer between an active carbon electrode and an electrolytic solution therein, one utilizing doping/dedoping reaction of a π-conjugated polymer electrode. The electrolytic solution contains at least a lithium salt, such as LiPF$_6$, etc.

In the aforementioned constitutional examples of energy storage devices, an example (first embodiment) containing at least one selected from the SO$_4$ group-containing compounds represented by any one of the general formulae (I) to (IV) in an electrolytic solution has been explained; however, the compound may also be contained in other energy storage device constitutional element than the electrolytic solution.

In second to fourth embodiments as explained below, examples of energy storage devices in which at least one selected from the SO$_4$ group-containing compounds represented by any one of the general formulae (I) to (IV) (hereinafter also referred to as "additive of the present invention") is previously added to other constitutional element than the electrolytic solution are explained.

Second Embodiment: Example in which the Additive of the Present Invention is Added to a Positive Electrode The positive electrode may be produced by mixing the additive of the present invention with the aforementioned positive electrode active material, an electroconductive agent and a binder, adding a high-boiling point solvent, such as 1-methyl-2-pyrrolidone, etc., thereto, followed by kneading to prepare a positive electrode mixture, applying this positive electrode mixture onto a collector, such as an aluminum foil, a stainless steel-made lath plate, etc., and drying and shaping the resultant under pressure, followed by a heat treatment in vacuum at a temperature of from about 50° C. to 250° C. for about 2 hours.

An addition amount of the additive of the present invention is preferably 0.001 to 5% by mass relative to the positive electrode active material. The addition amount is more preferably 0.05% by mass or more, and still more preferably 0.1% by mass or more relative to the positive electrode active material. Its upper limit is more preferably 3% by mass or less, and still more preferably 1% by mass or less.

Third Embodiment: Example in which the Additive of the Present Invention is Added to a Negative Electrode The negative electrode may be produced in such a manner that the additive of the present invention with the same electroconductive agent, binder, and high-boiling point solvent as in the production of the aforementioned positive electrode are used and kneaded to provide a negative electrode mixture, and this negative electrode mixture is then applied onto a collector, such as a copper foil, etc., dried, shaped under pressure, and then heat-treated in vacuum at a temperature of from about 50 to 250° C. for about 2 hours.

An addition amount of the additive of the present invention is preferably 0.001 to 5% by mass relative to the negative electrode active material. The addition amount is more preferably 0.05% by mass or more, and still more preferably 0.1% by mass or more relative to the negative electrode active material. Its upper limit is more preferably 3% by mass or less, and still more preferably 1% by mass or less.

Fourth Embodiment: Example in which the Additive of the Present Invention is Added to a Separator The separator in which the additive of the present invention is contained in a surface or pores thereof may be produced by a method of immersing and impregnating a separator in a solution having the additive of the present invention dissolved in an organic solvent or water, followed by drying. The separator may also be produced by preparing a coating solution having the additive of the present invention dispersed in an organic solvent or water and applying the coating solution onto the entire surface of the separator.

[Novel Compounds]

One of the SO$_4$ group-containing compounds that are a novel compound in the present invention is represented by the following general formula (I-4):

(I-4)

wherein R$^{21}$ is a straight-chain or branched alkenyl group having 3 to 7 carbon atoms, a straight-chain or branched alkynyl group having 3 to 8 carbon atoms, a linear or cyclic ester group having 3 to 18 carbon atoms, a linear or cyclic carbonate group having 3 to 18 carbon atoms, a sulfur atom-containing organic group having 1 to 6 carbon atoms, a silicon atom-containing organic group having 4 to 10 carbon atoms, a cyano group-containing organic group having 2 to 7 carbon atoms, a phosphorus atom-containing organic group having 2 to 12 carbon atoms, a —P(=O)F$_2$ group, an alkylcarbonyl group having 2 to 7 carbon atoms, or an arylcarbonyl group having 7 to 13 carbon atoms.

Specific examples of R$^{21}$ are the same as the specific examples of L$^{12}$ in the foregoing general formula (I-2), except that a vinyl group is not included.

Specifically, with respect to the compound represented by the general formula (I-4), there are suitably exemplified the same compounds as those represented by the foregoing general formula (I-2), except that Compound AA1 described in [Chem. 16] is not included.

The compound represented by the general formula (I-4) may be synthesized by the following (P1) or (P2) method, but the synthesis method is not limited to these methods.

(P1) A method in which an alcohol compound and chlorosulfonic acid are allowed to react with each other, followed by performing a reaction with a lithium salt, such as lithium chloride, lithium acetate, etc.

(P2) A method in which lithium chlorosulfonate which has been previously synthesized from chlorosulfonic acid and lithium chloride is allowed to react with a corresponding alcohol compound.

Other SO$_4$ group-containing compounds that are a novel compound are represented by the following general formula (II-1):

(II-1)

wherein R$^{21}$ represents a p-valent hydrocarbon connecting group which may contain a thioether bond or an —S(=O)$_2$— bond; and p is an integer of 2 to 4, provided that in R$^{21}$, at least one hydrogen atom which R$^{21}$ has may be substituted with a halogen atom.

Specific examples of $R^{21}$ are the same as the specific examples of $L^2$ in the foregoing general formula (II), except that an ether bond is not included.

In the foregoing general formula (II-1), p is preferably 2 or 3, and more preferably 2.

Specifically, with respect to the compound represented by the general formula (II-1), there are suitably exemplified the same compounds as those represented by the foregoing general formula (II), except that Compounds BA33 to 36 described in [Chem. 32] are not included.

The lithium compound of the present invention may be synthesized by the aforementioned (P1) or (P2) method, but the synthesis method is not limited to these methods.

Other $SO_4$ group-containing compounds that are a novel compound are represented by the following general formula (III-3) or (IV-2);

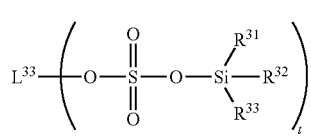

(III-3)

wherein $L^{33}$ represents a t-valent hydrocarbon connecting group which may contain a thioether bond or an $-S(=O)_2-$ bond, t is an integer of 2 to 4, provided that in $L^{33}$, at least one hydrogen atom may be substituted with a halogen atom, and $L^{33}$ represents a group other than a 2,2,3,3-tetrafluorobutane-1,4-diyl group, and each of $R^{31}$ to $R^{33}$ independently represents an alkyl group having 1 to 12 carbon atoms, an alkenyl group having 2 to 3 carbon atoms, or an aryl group having 6 to 8 carbon atoms.

Specific examples of $L^{33}$ in the general formula (III-3) are the same as the specific examples of $L^2$ in the general formula (II) within the range of the aforementioned definition, and specific examples of $R^{31}$ to $R^{33}$ in the general formula (III-3) are the same as the specific examples of $R^{31}$ to $R^{33}$ in the general formula (III-1) within the range of the aforementioned definition.

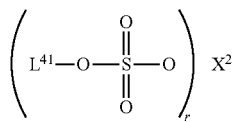

(IV-2)

wherein $L^{41}$ represents an alkyl group having 1 to 12 carbon atoms, an alkenyl group having 2 to 6 carbon atoms, an alkynyl group having 3 to 6 carbon atoms, an alkoxyalkyl group having 2 to 12 carbon atoms, a $-CR^{41}R^{42}C(=O)OR^{43}$ group, or an aryl group having 6 to 12 carbon atoms, $X^2$ represents an $SiR^{31}R^{32}R^{33}$ group or an $SiR^{44}R^{45}$ group, and r is an integer of 1 or 2, provided that when $X^2$ is an $SiR^{31}R^{32}R^{33}$ group, then r is 1, and $L^{41}$ is an alkyl group having 2 to 8 carbon atoms, a 2,2,3,3-tetrafluoropropyl group, an alkenyl group having 2 to 6 carbon atoms, an alkoxyalkyl group having 2 to 12 carbon atoms, a $-CR^{41}R^{42}C(=O)OR^{43}$ group, or an aryl group having 6 to 12 carbon atoms, and when $X^2$ is an $SiR^{44}R^{45}$ group, then r is 2, each of $R^{41}$ and $R^{42}$ independently represents a hydrogen atom or an alkyl group having 1 to 4 carbon atoms, $R^{43}$ represents an alkyl group having 1 to 8 carbon atoms, an alkenyl group having 2 to 6 carbon atoms, or an alkynyl group having 3 to 6 carbon atoms, and each of $R^{31}$ to $R^{33}$, $R^{44}$, and $R^{45}$ independently represents an alkyl group having 1 to 12 carbon atoms, an alkenyl group having 2 to 3 carbon atoms, or an aryl group having 6 to 8 carbon atoms, and is not bonded to each other to form a ring, and in the alkyl group and the aryl group, at least one hydrogen atom may be substituted with a halogen atom.

In the general formula (IV-2), specific examples of $L^{41}$, $R^{41}$ to $R^{43}$, $X^2$, $R^{44}$, and $R^{45}$ are the same as the specific examples of $L^4$, $R^{41}$ to $R^{43}$, X, $R^{44}$, and $R^{45}$ in the general formula (IV).

In the general formula (IV-2), specific examples of $R^{31}$ to $R^{33}$ are the same as the specific examples of $R^{31}$ to $R^{33}$ in the general formula (III-2) within the range of the aforementioned definition.

The compounds represented by the general formula (III-3) or (IV-2) may be, for example, synthesized by allowing chlorosulfonic acid, an alcohol, and a halogenated silyl compound to react with each other, but the synthesis method is not limited to such a method. For example, reference may be made to a method described in *Bull. Chem. Soc. Jpn.*, 74, 181-182 (2001).

In the aforementioned method, there are exemplified a method in which chlorosulfonic acid and an alcohol are allowed to react with each other in the presence or absence of a solvent, followed by performing a reaction with a halogenated silyl compound; and a method in which chlorosulfonic acid and a halogenated silyl compound are allowed to react with each other in the presence or absence of a solvent, followed by performing a reaction with an alcohol. However, the order of these reactions is not limited at all.

As for use amounts of the raw materials to be used for the reaction, a molar number of the halogenated silyl compound is preferably 1 to 2 times, and more preferably 1.2 to 1.7 times a molar number of chlorosulfonic acid or the alcohol, whichever is larger. This is because if the halogenated silyl compound is insufficient, and a sulfonic acid group remains in the system, a side reaction is liable to proceed during the purification.

In the case of using a solvent, an alkyl halide solvent, such as dichloromethane, 1,2-dichloroethane, etc., is preferred. An amount of the solvent is preferably 1 to 10 parts by mass, and more preferably 2 to 5 parts by mass based on 1 part by mass of the chlorosulfonic acid.

Although a reaction temperature varies depending upon a boiling point or melting point of the solvent, it is preferably −10° C. to 85° C., and more preferably 0° C. to 60° C.

Although a reaction time also varies depending upon the reaction temperature and an amount of the produced HCl gas, it is preferably 30 minutes to 5 hours, and more preferably 1 hour to 3 hours.

EXAMPLES

Synthesis Examples of the compounds to be used in the present invention and Examples of an electrolytic solution using the $SO_4$ group-containing compound of the present invention are hereunder described, but it should not be construed that the present invention is limited to these Examples.

<$SO_4$ Group-Containing Compound Represented by the General Formula (I-1)>

Examples I-1 to I-37 and Comparative Examples I-1 to I-3

Production of Lithium Ion Secondary Battery

94% by mass of $LiCoO_2$ and 3% by mass of acetylene black (electroconductive agent) were mixed and then added to and mixed with a solution which had been prepared by dissolving 3% by mass of polyvinylidene fluoride (binder) in 1-methyl-2-pyrrolidone in advance, thereby preparing a positive electrode mixture paste. This positive electrode mixture paste was applied onto one surface of an aluminum foil (collector), dried, and treated under pressure, followed by cutting into a predetermined size, thereby producing a positive electrode sheet. A density of a portion of the positive electrode except for the collector was 3.6 g/cm³.

95% by mass of artificial graphite ($d_{002}$=0.335 nm, negative electrode active material) was added to and mixed with a solution which had been prepared by dissolving 5% by mass of polyvinylidene fluoride (binder) in 1-methyl-2-pyrrolidone in advance, thereby preparing a negative electrode mixture paste. This negative electrode mixture paste was applied onto one surface of a copper foil (collector), dried, and treated under pressure, followed by cutting into a predetermined size, thereby producing a negative electrode sheet. A density of a portion of the negative electrode except for the collector was 1.5 g/cm³.

This electrode sheet was analyzed by means of X-ray diffraction, and as a result, a ratio [I(110)/I(004)] of a peak intensity I(110) of the (110) plane to a peak intensity I(004) of the (004) plane of the graphite crystal was found to be 0.1.

The above-obtained positive electrode sheet, a microporous polyethylene film-made separator, and the above-obtained negative electrode sheet were laminated in this order, and a nonaqueous electrolytic solution having each of compositions shown in Tables 1 to 3 was added thereto, thereby producing 2032 coin-type batteries.

[Evaluation of Low-Temperature Properties after High-Temperature Charging Storage]

<Initial Discharge Capacity>

In a thermostatic chamber at 25° C., each of the coin-type batteries produced by the aforementioned method was charged up to a final voltage of 4.2 V with a constant current of 1 C and under a constant voltage for 3 hours; the temperature of the thermostatic chamber was then decreased to −10° C.; and the battery was discharged down to a final voltage of 2.75 V with a constant current of 1 C, thereby determining an initial discharge capacity at −10° C.

<High-Temperature Charging Storage Test>

Subsequently, in a thermostatic chamber at 85° C., this coin-type battery was charged up to a final voltage of 4.2 V with a constant current of 1 C and under a constant voltage for 3 hours and then stored for 3 days in a state of keeping at 4.2 V. Thereafter, the resultant was put in a thermostatic chamber at 25° C. and then once discharged down to a final voltage of 2.75 V with a constant current of 1 C.

<Discharge Capacity after High-Temperature Charging Storage>

Furthermore, a discharge capacity at −10° C. after the high-temperature charging storage was then determined in the same manner as the measurement of the initial discharge capacity.

<Low-Temperature Properties after High-Temperature Charging Storage>

The low-temperature properties after the high-temperature charging storage were determined from the following discharge capacity retention rate at −10° C.

Discharge capacity retention rate (%) at −10° C. after high-temperature charging storage=(Discharge capacity at −10° C. after high-temperature charging storage)/(Initial discharge capacity at −10° C.)×100

<High-Temperature Cycle Properties>

In a thermostatic chamber at 55° C., each of the batteries produced by the aforementioned method was treated by repeating a cycle of charging up to a final voltage of 4.2 V with a constant current of 1 C and under a constant voltage for 3 hours and subsequently discharging down to a discharge voltage of 3.0 V with a constant current of 1 C, until it reached 300 cycles. Then, a discharge capacity retention rate after the cycles was determined according to the following equation.

Discharge capacity retention rate (%)=(Discharge capacity after 300 cycles)/(Discharge capacity after 1st cycle)×100

The results are shown in Tables 1 to 3.

TABLE 1

| | Composition of electrolyte salt Composition of nonaqueous electrolytic solution (Volume ratio of solvent) | $SO_4$ group-containing compound (I) Compound | Content in nonaqueous electrolytic solution (% by mass) | Discharge capacity retention rate at −10° C. after high-temperature charging storage at 85° C. (%) |
|---|---|---|---|---|
| Example I-1 | 1.15M $LiPF_6$ EC/DMC/MEC (30/45/25) | $LiO-\overset{\overset{O}{\|}}{\underset{\underset{O}{\|}}{S}}-OCH_3$ | 0.3 | 75 |
| Example I-2 | 1.15M $LiPF_6$ EC/MEC (30/70) | | 0.3 | 70 |
| Example I-3 | 1.15M $LiPF_6$ EC/VC/DMC/MEC (29/1/40/30) | | 0.005 | 71 |

TABLE 1-continued

| | Composition of electrolyte salt Composition of nonaqueous electrolytic solution (Volume ratio of solvent) | SO₄ group-containing compound (I) Compound | Content in nonaqueous electrolytic solution (% by mass) | Discharge capacity retention rate at −10° C. after high-temperature charging storage at 85° C. (%) |
|---|---|---|---|---|
| Example I-4 | 1.15M LiPF₆ EC/VC/DMC/MEC (29/1/40/30) | | 0.1 | 78 |
| Example I-5 | 1.15M LiPF₆ EC/VC/DMC/MEC (29/1/40/30) | | 0.3 | 80 |
| Example I-6 | 1.15M LiPF₆ EC/VC/DMC/MEC (29/1/40/30) | | 0.5 | 76 |
| Example I-7 | 1.15M LiPF₆ EC/VC/DMC/MEC (29/1/40/30) | | 1 | 73 |
| Example I-8 | 1.15M LiPF₆ EC/VC/DMC/MEC (29/1/40/30) | | 3 | 71 |

TABLE 2

| | Composition of electrolyte salt Composition of nonaqueous electrolytic solution (Volume ratio of solvent) | SO₄ group-containing compound (I) Kind | Content in nonaqueous electrolytic solution (% by mass) | Discharge capacity retention rate at −10° C. after high-temperature charging storage at 85° C. (%) | Discharge capacity retention rate after 300 cycles at 55° C. (%) |
|---|---|---|---|---|---|
| Example I-9 | 1.1M LiPF₆ EC/VC/DMC/MEC (29/1/45/25) | 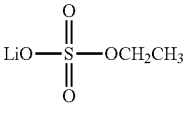 | 0.3 | 79 | 76 |
| Example I-10 | 1.1M LiPF₆ EC/VC/DMC/MEC (29/1/45/25) | 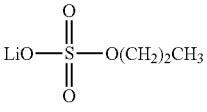 | 0.3 | 78 | 75 |
| Example I-11 | 1.1M LiPF₆ EC/VC/DMC/MEC (29/1/45/25) | 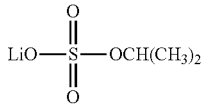 | 0.3 | 78 | 75 |
| Example I-12 | 1.1M LiPF₆ EC/VC/DMC/MEC (29/1/45/25) | 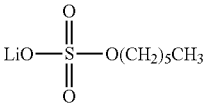 | 0.3 | 75 | 72 |
| Example I-13 | 1.1M LiPF₆ EC/VC/DMC/MEC (29/1/45/25) | 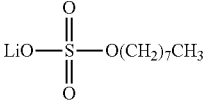 | 0.3 | 74 | 68 |
| Example I-14 | 1.1M LiPF₆ EC/VC/DMC/MEC (29/1/45/25) | 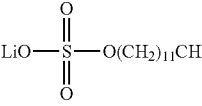 | 0.3 | 73 | 68 |
| Example I-15 | 1.1M LiPF₆ EC/VC/DMC/MEC (29/1/45/25) | 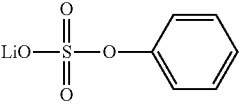 | 0.3 | 75 | 70 |

TABLE 2-continued

| | Composition of electrolyte salt Composition of nonaqueous electrolytic solution (Volume ratio of solvent) | SO$_4$ group-containing compound (I) Kind | Content in nonaqueous electrolytic solution (% by mass) | Discharge capacity retention rate at −10° C. after high-temperature charging storage at 85° C. (%) | Discharge capacity retention rate after 300 cycles at 55° C. (%) |
|---|---|---|---|---|---|
| Example I-16 | 1.1M LiPF$_6$ EC/VC/DMC/MEC (29/1/45/25) | LiO—S(=O)$_2$—OCH$_2$CF$_3$ | 0.3 | 79 | 75 |
| Example I-17 | 1.1M LiPF$_6$ EC/VC/DMC/MEC (29/1/45/25) | LiO—S(=O)$_2$—CH$_2$CF$_2$CF$_2$H | 0.3 | 79 | 75 |
| Example I-18 | 1.1M LiPF$_6$ EC/VC/DMC/MEC (29/1/45/25) | LiO—S(=O)$_2$—O—C$_6$H$_4$—F | 0.3 | 77 | 72 |
| Example I-19 | 1.1M LiPF$_6$ EC/VC/DMC/MEC (29/1/45/25) | LiO—S(=O)$_2$—O(CH$_2$)$_2$OCH$_3$ | 0.3 | 78 | 71 |
| Example I-20 | 1.1M LiPF$_6$ EC/VC/DMC/MEC (29/1/45/25) | LiO—S(=O)$_2$—OCH$_3$ | 0.3 | 82 | 79 |
| Example I-21 | 1.1M LiPF$_6$ + 0.05M LiBOB EC/FEC/VC/DMC/MEC (19/10/1/45/25) | LiO—S(=O)$_2$—OCH$_3$ | 0.3 | 85 | 80 |
| Example I-22 | 1.1M LiPF$_6$ + 0.05M LiPO$_2$F$_2$ EC/FEC/VC/DMC/MEC (19/10/1/45/25) | LiO—S(=O)$_2$—OCH$_3$ | 0.3 | 84 | 78 |
| Example I-23 | 1.1M LiPF$_6$ + 0.05M LiPFO EC/FEC/VC/DMC/MEC (19/10/1/45/25) | LiO—S(=O)$_2$—OCH$_3$ | 0.3 | 85 | 81 |
| Example I-24 | 0.7M LiPF$_6$ + 0.45M LiFSI EC/VC/DMC/MEC (29/1/45/25) | LiO—S(=O)$_2$—OCH$_3$ | 0.3 | 86 | 80 |

TABLE 3

| | Composition of electrolyte salt / Composition of nonaqueous electrolytic solution (Volume ratio of solvent) | SO$_4$ group-containing compound (I) Compound | Content in nonaqueous electrolytic solution (% by mass) | Other additive group | Other additive (content in nonaqueous electrolytic solution (% by mass)) | Discharge capacity retention rate at −10° C. after high-temperature charging storage at 85° C. (%) | Discharge capacity retention rate after 300 cycles at 55° C. (%) |
|---|---|---|---|---|---|---|---|
| Example I-25 | 1.1M LiPF$_6$ EC/VC/DMC/MEC (29/1/45/25) |  | 0.3 | A | Adiponitrile (1) | 83 | 75 |
| Example I-26 | | | | B | Cyclohexylbenzene (2) + o-terphenyl (1) | 82 | 72 |
| Example I-27 | | | | C | 1,6-Hexamethylene diisocycnate (0.5) | 84 | 77 |
| Example I-28 | | | | C | 1,6-Hexamethylene diisocycnate (0.5) | 82 | 75 |
| Example I-29 | | | | D | 2-Butyne-1,4-diyl dimethanesulfonate (0.5) | 85 | 79 |
| Example I-30 | | | | D | 2-Butyne-1,4-diyl dimethanesulfonate (1) | 82 | 78 |
| Example I-31 | | | | E | 2,4-Butanesultone (1) | 84 | 76 |
| Example I-32 | | | | E | 5,5-Dimethyl-1,2-oxathiolane-4-one 2,2-dioxide (0.5) | 85 | 75 |
| Example I-33 | | | | F | 1,3-Dioxane (1) | 81 | 73 |
| Example I-34 | | | | G | Tris(2,2,2-trifluoroethyl) phosphate (1.5) | 83 | 77 |
| Example I-35 | | | | H | Succinic anhydride (1) | 83 | 78 |
| Example I-36 | | | | I | Ethoxypentafluoro-cyclotriphosphazene (1) | 82 | 73 |
| Example I-37 | | | | J | Trimethylsilyl fluorosulfonate (1) | 85 | 76 |
| Comparative Example I-1 | | None | — | — | — | 62 | 67 |
| Comparative Example I-2 | | 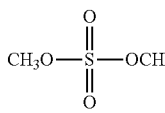 | 0.3 | — | — | 61 | 68 |
| Comparative Example I-3 | 1.1M LiPF$_6$ EC/VC/DMC/MEC (29/1/45/25) | 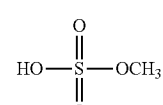 | 0.3 | — | — | 55 | 62 |

Examples I-38 to I-39 and Comparative Example I-4

A negative electrode sheet was produced by using silicon (elemental substance) (negative electrode active material) in place of the negative electrode active material used in Example I-1. 80% by mass of silicon (elemental substance) and 15% by mass of acetylene black (electroconductive agent) were mixed and then added to and mixed with a solution which had been prepared by dissolving 5% by mass of polyvinylidene fluoride (binder) in 1-methyl-2-pyrrolidone in advance, thereby preparing a negative electrode mixture paste. Coin-type batteries were produced in the same manner as in Example I-1, except that this negative electrode mixture paste was applied onto the surface of a copper foil (collector), dried, and treated under pressure, followed by cutting into a predetermined size, thereby producing a negative electrode sheet, and that the composition of the nonaqueous electrolytic solution was changed to a predetermined composition, and the batteries were evaluated. The results are shown in Table 4.

TABLE 4

| | Composition of electrolyte salt | SO₄ group-containing compound (I) | | | | Discharge capacity |
|---|---|---|---|---|---|---|
| | Composition of nonaqueous electrolytic solution (Volume ratio of solvent) | Kind | Content in nonaqueous electrolytic solution (% by mass) | Other additive group | Other additive (content in nonaqueous electrolytic solution (% by mass)) | retention rate at −10° C. after high-temperature charging storage at 85° C. (%) |
| Example I-33 | 1.2M LiPF₆ PC/FEC/DMC/MEC (15/15/45/25) | 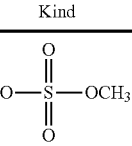 | 0.3 | — | — | 70 |
| Example I-39 | | | | C | 1,6-Hexamethylene diisocyanate (0.5) | 75 |
| Comparative Example I-4 | | None | — | — | — | 47 |

Examples I-40 to I-41 and Comparative Example I-5

A negative electrode sheet was produced by using lithium titanate $Li_4Ti_5O_{12}$ (negative electrode active material) in place of the negative electrode active material used in Example I-1. 80% by mass of lithium titanate $Li_4Ti_5O_{12}$ and 15% by mass of acetylene black (electroconductive agent) were mixed and then added to and mixed with a solution which had been prepared by dissolving 5% by mass of polyvinylidene fluoride (binder) in 1-methyl-2-pyrrolidone in advance, thereby preparing a negative electrode mixture paste. Coin-type batteries were produced in the same manner as in Example I-1, except that this negative electrode mixture paste was applied onto a copper foil (collector), dried, and treated under pressure, followed by cutting into a predetermined size, thereby producing a negative electrode sheet; that in evaluating the battery, the final charging voltage and the final discharging voltage were set to 2.8 V and 1.2 V, respectively; and that the composition of the nonaqueous electrolytic solution was changed to a predetermined composition, and the batteries were evaluated. The results are shown in Table 5.

Example I-42 and Comparative Example I-6

A positive electrode sheet was produced by using $LiFePO_4$ (positive electrode active material) coated with amorphous carbon in place of the positive electrode active material used in Example I-1. 90% by mass of $LiFePO_4$ coated with amorphous carbon and 5% by mass of acetylene black (electroconductive agent) were mixed and then added to and mixed with a solution which had been prepared by dissolving 5% by mass of polyvinylidene fluoride (binder) in 1-methyl-2-pyrrolidone in advance, thereby preparing a positive electrode mixture paste. Coin-type batteries were produced in the same manner as in Example I-1, except that this positive electrode mixture paste was applied onto an aluminum foil (collector), dried, and treated under pressure, followed by cutting into a predetermined size, thereby producing a positive electrode sheet; that in evaluating the battery, the final charging voltage and the final discharging voltage were set to 3.6 V and 2.0 V, respectively; and that the composition of the nonaqueous electrolytic solution was changed to a predetermined composition, and the batteries were evaluated. The results are shown in Table 6.

TABLE 5

| | Composition of electrolyte salt | SO₄ group-containing compound (I) | | | | Discharge capacity |
|---|---|---|---|---|---|---|
| | Composition of nonaqueous electrolytic solution (Volume ratio of solvent) | Kind | Content in nonaqueous electrolytic solution (% by mass) | Other additive group | Other additive (content in nonaqueous electrolytic solution (% by mass)) | retention rate at −10° C. after high-temperature charging storage at 85° C. (%) |
| Example I-40 | 1.2M LiPF₆ PC/DEC (30/70) | 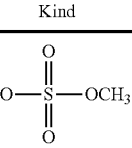 | 0.3 | — | — | 85 |
| Example I-41 | | | | D | Di(2-propynyl) oxalate (0.5) | 88 |
| Comparative Example I-5 | | None | — | — | — | 64 |

TABLE 6

| | Composition of electrolyte salt / Composition of nonaqueous electrolytic solution (Volume ratio of solvent) | SO₄ group-containing compound (I) Kind | SO₄ group-containing compound (I) Content in nonaqueous electrolytic solution (% by mass) | Other additive group | Other additive (content in nonaqueous electrolytic solution (% by mass)) | Discharge capacity retention rate at −10° C. after high-temperature charging storage at 85° C. (%) |
|---|---|---|---|---|---|---|
| Example I-42 | 1.2M LiPF₆ EC/VC/DMC/MEC (29/1/45/25) | LiO—S(=O)₂—OCH₃ | 0.3 | — | — | 82 |
| Comparative Example I-6 | | None | — | — | — | 59 |

Example I-43 and Comparative Examples I-7 and I-8

Positive electrode sheets were produced by using LiNi$_{1/2}$Mn$_{3/2}$O$_4$ (positive electrode active material) in place of the positive electrode active materials used in Examples I-1, Comparative Example I-1, and Comparative Example I-3, respectively. 94% by mass of LiNi$_{1/2}$Mn$_{3/2}$O$_4$ and 3% by mass of acetylene black (electroconductive agent) were mixed and then added to and mixed with a solution which had been prepared by dissolving 3% by mass of polyvinylidene fluoride (binder) in 1-methyl-2-pyrrolidone in advance, thereby preparing a positive electrode mixture paste. Coin-type batteries were produced in the same manner as in Example I-1 and Comparative Example I-1, respectively, except that this positive electrode mixture paste was applied onto one surface of an aluminum foil (collector), dried, and treated under pressure, followed by cutting into a predetermined size, thereby producing a positive electrode sheet; and that in evaluating the battery, the final charging voltage and the final discharging voltage were set to 4.9 V and 2.7 V, respectively, and the batteries were evaluated.

An elution amount of Mn after the high-temperature charging storage was determined by quantitatively determining an amount of manganese (Mn) electrodeposited on the negative electrode by the inductively coupled plasma atomic emission spectrophotometry. As for the elution amount of Mn, a relative elution amount of Mn was examined on the basis of defining the elution amount of Mn of Comparative Example I-1 as 100%. The results are shown in Table 7.

TABLE 7

| | Composition of electrolyte salt / Composition of nonaqueous electrolytic solution (Volume ratio of solvent) | SO₄ group-containing compound (I) Kind | Content in nonaqueous electrolytic solution (% by mass) | Discharge capacity retention rate at −10° C. after high-temperature charging storage at 85° C. (%) | Relative elution amount of Mn after high-temperature charging storage at 85° C. (%) |
|---|---|---|---|---|---|
| Example I-43 | 1.15M LiPF₆ EC/FEC/MEC/DEC (20/10/45/25) | LiO—S(=O)₂—OCH₃ | 0.3 | 67 | 99 |
| Comparative Example I-7 | | None | — | 48 | 100 |
| Comparative Example I-8 | | LiO—S(=O)₂—OCH₃ | 0.3 | 33 | 250 |

Example I-44

A lithium secondary battery was produced in the same manner as in Comparative Example I-1, except that a positive electrode produced by adding a predetermined amount of the SO₄ group-containing compound represented by the general formula (I-1) relative to 100% of the positive electrode active material was used. The results are shown in Table 8.

Example I-45

A lithium secondary battery was produced in the same manner as in Example I-44, except that the SO₄ group-containing compound represented by the general formula (I-1) was not added to the positive electrode but added to the negative electrode. The results are shown in Table 8.

TABLE 8

| | Composition of electrolyte salt Composition of nonaqueous electrolytic solution (Volume ratio of solvent) | SO$_4$ group-containing compound (I) | | | Discharge capacity retention rate at −10° C. after high-temperature charging storage at 85° C. (%) |
|---|---|---|---|---|---|
| | | Kind | Addition site | Content relative to the active material (% by mass) | |
| Example I-44 | 1.2M LiPF$_6$ EC/VC/DMC/MEC (29/1/45/25) | 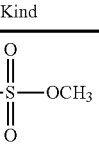 | Positive electrode | 0.3 | 77 |
| Example I-45 | | | Negative electrode | 0.3 | 79 |

In all of the lithium secondary batteries of Examples I-1 to I-37, the electrochemical characteristics in a broad temperature range are remarkably improved as compared with the lithium secondary batteries of Comparative Example I-1 in the case of not adding the SO$_4$ group-containing compound represented by the general formula (I), especially the general formula (I-1), Comparative Example I-2 in the case of adding dimethyl sulfate, and Comparative Example I-3 in the case of adding monomethyl sulfate, in the nonaqueous electrolytic solution of the present invention. In the light of the above, it has been clarified that the effect of the present invention is a peculiar effect to the case where the SO$_4$ group-containing compound specified in the present invention is contained in the nonaqueous electrolytic solution having an electrolyte salt dissolved in a nonaqueous solvent. In addition, the discharge capacity retention rate of the lithium secondary battery produced under the same conditions as those in Example I-5 exhibited after 300 cycles at 55° C. is 70%, that is, as well as in Examples I-25 to I-37, the discharge capacity retention rate after 300 cycles at 55° C. was remarkably improved as compared with Comparative Examples I-1 to I-3.

From comparison of Examples I-38 to I-39 with Comparative Example I-4, comparison of Examples I-40 to I-41 with Comparative Example I-5, comparison of Example I-42 with Comparative Example I-6, and comparison of Example I-43 with Comparative Example I-7, the same effect is also seen even in the case of using silicon (elemental substance) Si or lithium titanate for the negative electrode, or the case of using a lithium-containing olivine-type iron phosphate or a lithium complex metal oxide capable of being used at 4.4 V or more for the positive electrode, and therefore, it is evident that the effect of the present invention is not an effect relying on a specified positive electrode or negative electrode.

Furthermore, from comparison of Example I-43 with Comparative Example I-8, it is understood that in the case of adding monomethyl sulfate, the elution of Mn is accelerated, so that the electrochemical characteristics in a broad temperature range are remarkably worsened.

From comparison of Examples I-44 and I-45 with Comparative Example I-1, even in the case of containing the SO$_4$ group-containing compound represented by the general formula (I), especially the general formula (I-1) in a site other than the electrolytic solution, the effect is brought.

Moreover, the nonaqueous electrolytic solution of the present invention also has an effect for improving discharging properties of a lithium primary battery in a broad temperature range.

<SO$_4$ Group-Containing Compound Represented by the General Formula (I-2)>

Synthesis Example II-1

Synthesis of Lithium 2-Cyanoethyl Sulfate (Compound AG2)

To a slurry mixed liquid of 4.24 g (100 mmoles) of lithium chloride and 100 g of dimethyl carbonate, 11.65 g (100 mmoles) of chlorosulfonic acid was added dropwise at 10° C. or lower over 15 minutes. After stirring at room temperature for 60 minutes, 7.11 g (100 mmoles) of cyanoethanol was added dropwise. After stirring this solution at room temperature for 3 hours, a crystal was separated by filtration from a reaction solution being a slurry form and dried, thereby obtaining 13.35 g of lithium 2-cyanoethyl sulfate as a white crystal (yield: 85%).

The obtained lithium 2-cyanoethyl sulfate was subjected to $^1$H-NMR measurement to confirm its structure. The results are shown below.

$^1$H-NMR (400 MHz, DMSO-d6): δ (ppm)=3.90 (t, J=6.08 Hz, 2H), 2.79 (t, J=6.08 Hz, 2H)

Synthesis Example II-2

Synthesis of Lithium Propargyl Sulfate (Compound AB1)

The same operations as those in Synthesis Example II-1 were followed, except for using propargyl alcohol in place of the cyanoethanol, thereby obtaining lithium propargyl sulfate as a white crystal (yield: 83%).

The obtained lithium propargyl sulfate was subjected to $^1$H-NMR measurement to confirm its structure. The results are shown below.

$^1$H-NMR (400 MHz, DMSO-d6): δ (ppm)=4.33 (d, J=2.52 Hz, 2H), 3.37 (t, J=2.52 Hz, 1H)

Synthesis Example II-3

Synthesis of Lithium 1-Oxo-1-(2-propynyloxy)propan-2-yl Sulfate (Compound AC11)

The same operations as those in Synthesis Example II-1 were followed, except for using propargyl lactate in place of the cyanoethanol, thereby obtaining lithium 1-oxo-1-(2-propynyloxy)propan-2-yl sulfate as a white crystal (yield: 82%).

The obtained lithium 1-oxo-1-(2-propynyloxy)propan-2-yl sulfate was subjected to $^1$H-NMR measurement to confirm its structure. The results are shown below.

$^1$H-NMR (400 MHz, DMSO-d6); δ (ppm)=4.70 (m, 2H), 4.57 (q, J=6.88 Hz, 1H), 3.55 (t, J=2.44 Hz, 1H), 1.30 (d, J=6.88 Hz, 3H)

Synthesis Example II-4

Synthesis of Lithium Difluorophosphoryl Sulfate
(Compound AH15)

To a slurry mixed liquid of 8.90 g (82 mmoles) of lithium difluorophosphate and 100 g of dimethyl carbonate, 9.15 g (78 mmoles) of chlorosulfonic acid was added dropwise at 10° C. or lower over 15 minutes. This solution was stirred at room temperature for 3 hours and concentrated with an evaporator until the amount reached 60 g, and a crystal was separated by filtration. The obtained filtrate was concentrated and dried to obtain 9.00 g of lithium difluorophosphoryl sulfate as a white crystal (yield: 61%).

The obtained lithium difluorophosphoryl sulfate was subjected to $^{19}$F-NMR measurement to confirm its structure. The results are shown below.

$^{19}$F-NMR (400 MHz, DMSO-d6): δ (ppm)=−80.83 (d, J=944 Hz, 2F)

Synthesis Example II-5

Synthesis of Lithium Dibutoxyphosphoryl Sulfate
(Compound AH10)

The same operations as those in Synthesis Example II-4 were followed, except for using lithium dibutylphosphate in place of the lithium difluorophosphate, thereby obtaining lithium dibutoxyphosphoryl sulfate as a white crystal (yield: 72%).

The obtained lithium dibutoxyphosphoryl sulfate was subjected to $^1$H-NMR measurement to confirm its structure. The results are shown below.

$^1$H-NMR (400 MHz, DMSO-d6): δ (ppm)=3.86 (q, J=6.52 Hz, 2H), 1.59 to 1.52 (m, 2H), 1.38 to 1.13 (m, 2H), 0.88 (t, J=7.40 Hz, 3H)

Examples II-1 to II-21 and Comparative Examples II-1 and II-2

Production of Lithium Ion Secondary Battery

94% by mass of LiCoO$_2$ and 3% by mass of acetylene black (electroconductive agent) were mixed and then added to and mixed with a solution which had been prepared by dissolving 3% by mass of polyvinylidene fluoride (binder) in 1-methyl-2-pyrrolidone in advance, thereby preparing a positive electrode mixture paste. This positive electrode mixture paste was applied onto one surface of an aluminum foil (collector), dried, and treated under pressure, followed by cutting into a predetermined size, thereby producing a positive electrode sheet. A density of a portion of the positive electrode except for the collector was 3.6 g/cm$^3$.

95% by mass of artificial graphite (d$_{002}$=0.335 nm, negative electrode active material) was added to and mixed with a solution which had been prepared by dissolving 5% by mass of polyvinylidene fluoride (binder) in 1-methyl-2-pyrrolidone in advance, thereby preparing a negative electrode mixture paste. This negative electrode mixture paste was applied onto one surface of a copper foil (collector), dried, and treated under pressure, followed by cutting into a predetermined size, thereby producing a negative electrode sheet. A density of a portion of the negative electrode except for the collector was 1.5 g/cm$^3$.

This electrode sheet was analyzed by means of X-ray diffraction, and as a result, a ratio [I(110)/I(004)] of a peak intensity I(110) of the (110) plane to a peak intensity I(004) of the (004) plane of the graphite crystal was found to be 0.1.

The above-obtained positive electrode sheet, a microporous polyethylene film-made separator, and the above-obtained negative electrode sheet were laminated in this order, and a nonaqueous electrolytic solution having each of compositions shown in Tables 9 to 10 was added thereto, thereby producing 2032 coin-type batteries.

[Evaluation of Low-Temperature Properties after High-Temperature Charging Storage]

<Initial Discharge Capacity>

In a thermostatic chamber at 25° C., each of the coin-type batteries produced by the aforementioned method was charged up to a final voltage of 4.2 V with a constant current of 1 C and under a constant voltage for 3 hours; the temperature of the thermostatic chamber was then decreased to −10° C.; and the battery was discharged down to a final voltage of 2.75 V with a constant current of 1 C, thereby determining an initial discharge capacity at −10° C.

<High-Temperature Charging Storage Test>

Subsequently, in a thermostatic chamber at 85° C., this coin-type battery was charged up to a final voltage of 4.2 V with a constant current of 1 C and under a constant voltage for 3 hours and then stored for 3 days in a state of keeping at 4.2 V. Thereafter, the resultant was put in a thermostatic chamber at 25° C. and then once discharged down to a final voltage of 2.75 V with a constant current of 1 C.

<Discharge Capacity after High-Temperature Charging Storage>

Furthermore, a discharge capacity at −10° C. after the high-temperature charging storage was then determined in the same manner as the measurement of the initial discharge capacity.

<Low-Temperature Properties after High-Temperature Charging Storage>

The low-temperature properties after the high-temperature charging storage was determined from the following discharge capacity retention rate at −10° C.

Discharge capacity retention rate (%) at −10° C. after high-temperature charging storage=(Discharge capacity at −10° C. after high-temperature charging storage)/(Initial discharge capacity at −10° C.)×100

<High-Temperature Cycle Properties>

In a thermostatic chamber at 55° C., each of the batteries produced by the aforementioned method was treated by repeating a cycle of charging up to a final voltage of 4.2 V with a constant current of 1 C and under a constant voltage for 3 hours and subsequently discharging down to a discharge voltage of 3.0 V with a constant current of 1 C, until it reached 300 cycles. Then, a discharge capacity retention-rate after the cycles was determined according to the following equation.

Discharge capacity retention rate (%)=(Discharge capacity after 300 cycles)/(Discharge capacity after 1st cycle)×100

The results are shown in Tables 9 to 10.

TABLE 9

| | Composition of electrolyte salt Composition of nonaqueous electrolytic solution (Volume ratio of solvent) | SO$_4$ group-containing compound (I) | | | Discharge capacity retention rate at −10° C. after high-temperature charging storage at 85° C. (%) |
|---|---|---|---|---|---|
| | | Type of substituent L$^{12}$ | Kind | Content in nonaqueous electrolytic solution (% by mass) | |
| Example II-1 | 1.2M LiPF$_6$ EC/DEC (30/70) | (ii) | LiO—S(=O)(=O)—O—CH$_2$—C≡CH | 0.3 | 69 |
| Example II-2 | 1.2M LiPF$_6$ EC/DEC/MEC (30/45/25) | | | 0.3 | 73 |
| Example II-3 | 1.2M LiPF$_6$ EC/FEC/DEC/MEC (25/5/45/25) | | | 0.1 | 75 |
| Example II-4 | 1.2M LiPF$_6$ EC/FEC/DEC/MEC (25/5/45/25) | | | 0.3 | 78 |
| Example II-5 | 1.2M LiPF$_6$ EC/FEC/DEC/MEC (25/5/45/25) | | | 3 | 70 |
| Comparative Example II-1 | 1.2M LiPF$_6$ EC/FEC/DEC/MEC (25/5/45/25) | — | None | — | 58 |
| Comparative Example II-2 | 1.2M LiPF$_6$ EC/FEC/DEC/MEC (25/5/45/25) | — | CH$_3$O—S(=O)(=O)—OCH$_3$ | 0.3 | 57 |

TABLE 10

| | Composition of electrolyte salt Composition of nonaqueous electrolytic solution (Volume ratio of solvent) | SO$_4$ group-containing compound (I) | | | Discharge capacity retention rate at −10° C. after high-temperature charging storage at 85° C. (%) |
|---|---|---|---|---|---|
| | | Type of substituent L$^{12}$ | Kind | Content in nonaqueous electrolytic solution (% by mass) | |
| Example II-6 | 1.2M LiPF$_6$ EC/FEC/DEC/MEC (25/5/45/25) | (i) | LiO—S(=O)(=O)—O—CH$_2$—CH=CH$_2$ | 0.3 | 80 |
| Example II-7 | 1.2M LiPF$_6$ EC/FEC/DEC/MEC (25/5/45/25) | (vii) | LiO—S(=O)(=O)—O—CH$_2$CH$_2$—CN | 0.3 | 81 |

TABLE 10-continued

| | Composition of electrolyte salt Composition of nonaqueous electrolytic solution (Volume ratio of solvent) | SO₄ group-containing compound (I) | | Discharge capacity | |
|---|---|---|---|---|---|
| | | Type of substituent $L^{12}$ | Kind | Content in nonaqueous electrolytic solution (% by mass) | retention rate at −10° C. after high-temperature charging storage at 85° C. (%) |
| Example II-8 | 1.2M LiPF₆ EC/FEC/DEC/MEC (25/5/45/25) | (iv) | | 0.3 | 75 |
| Example II-9 | 1.2M LiPF₆ EC/FEC/DEC/MEC (25/5/45/25) | (ii) | | 0.3 | 82 |
| Example II-10 | 1.2M LiPF₆ EC/FEC/DEC/MEC (25/5/45/25) | (iii) | | 0.3 | 79 |
| Example II-11 | 1.2M LiPF₆ EC/FEC/DEC/MEC (25/5/45/25) | (v) | | 0.3 | 71 |
| Example II-12 | 1.2M LiPF₆ EC/FEC/DEC/MEC (25/5/45/25) | (viii) | | 0.3 | 70 |
| Example II-13 | 1.2M LiPF₆ EC/FEC/DEC/MEC (25/5/45/25) | (vi) | | 0.3 | 72 |
| Example II-14 | 1.2M LiPF₆ EC/FEC/DEC/MEC (25/5/45/25) | (ix) | | 0.3 | 71 |
| Example II-15 | 1.2M LiPF₆ EC/FEC/DEC/MEC (25/5/45/25) | (vi) | | 0.3 | 70 |
| Example II-16 | 1.2M LiPF₆ EC/FEC/DEC/MEC (25/5/45/25) | (viii) | | 0.3 | 73 |
| Example II-17 | 1.2M LiPF₆ EC/FEC/DEC/MEC (25/5/45/25) | (viii) | | 0.3 | 75 |

TABLE 10-continued

| | Composition of electrolyte salt Composition of nonaqueous electrolytic solution (Volume ratio of solvent) | Type of substituent $L^{12}$ | SO$_4$ group-containing compound (I) Kind | Content in nonaqueous electrolytic solution (% by mass) | Discharge capacity retention rate at −10° C. after high-temperature charging storage at 85° C. (%) |
|---|---|---|---|---|---|
| Example II-18 | 1.1M LiPF$_6$ + 0.05M LiSO$_3$F EC/FEC/VC/DEC/MEC (19/10/1/45/25) | (ii) | LiO—S(=O)(=O)—O—CH$_2$—C≡CH | 0.3 | 85 |
| Example II-19 | 1.1M LiPF$_6$ + 0.05M LiPFO$_2$F$_2$ EC/FEC/VC/DEC/MEC (19/10/1/45/25) | (ii) | LiO—S(=O)(=O)—O—CH$_2$—C≡CH | 0.3 | 84 |
| Example II-20 | 1.1M LiPF$_6$ + 0.05M LiPFO EC/FEC/VC/DEC/MEC (19/10/1/45/25) | (ii) | LiO—S(=O)(=O)—O—CH$_2$—C≡CH | 0.3 | 86 |
| Example II-21 | 0.7M LiPF$_6$ + 0.45M LiTFSI EC/FEC/VC/DEC/MEC (19/10/1/45/25) | (ii) | LiO—S(=O)(=O)—O—CH$_2$—C≡CH | 0.3 | 85 |

Example II-22 and Comparative Example II-3

A negative electrode sheet was produced by using silicon (elemental substance) (negative electrode active material) in place of the negative electrode active material used in cutting into a predetermined size, thereby producing a negative electrode sheet, and that the composition of the nonaqueous electrolytic solution was changed to a predetermined composition, and the batteries were evaluated. The results are shown in Table 11.

TABLE 11

| | Composition electrolyte salt Composition of nonaqueous electrolytic solution (Volume ratio of solvent) | SO$_4$ group-containing compound (I) Kind | Content in nonaqueous electrolytic solution (% by mass) | Discharge capacity retention rate at −10° C. after high-temperature charging storage at 85° C. (%) |
|---|---|---|---|---|
| Example II-22 | 1.2M LiPF$_6$ PC/FEC/DEC/MEC (10/20/45/25) | LiO—S(=O)(=O)—O—CH$_2$—C≡CH | 0.3 | 72 |
| Comparative Example II-3 | | None | — | 52 |

Example II-1. 80% by mass of silicon (elemental substance) and 15% by mass of acetylene black (electroconductive agent) were mixed and then added to and mixed with a solution which had been prepared by dissolving 5% by mass of polyvinylidene fluoride (binder) in 1-methyl-2-pyrrolidone in advance, thereby preparing a negative electrode mixture paste. Coin-type batteries were produced in the same manner as in Example II-1, except that this negative electrode mixture paste was applied onto a copper foil (collector), dried, and treated under pressure, followed by cutting into a predetermined size, thereby producing a

Example II-23 and Comparative Example II-4

90% by mass of LiMn$_{1.5}$Ni$_{0.5}$O$_4$ and 6% by mass of acetylene black (electroconductive agent) were mixed and then added to and mixed with a solution which had been prepared by dissolving 4% by mass of polyvinylidene fluoride (binder) in 1-methyl-2-pyrrolidone in advance, thereby preparing a positive electrode mixture paste. This positive electrode mixture paste was applied onto one surface of an aluminum foil (collector), dried, and treated under pressure, followed by cutting into a predetermined size, thereby producing a positive electrode sheet. 80% by mass of $Li_4Ti_5O_{12}$ (negative electrode active material) and 15% by mass of acetylene black (electroconductive agent) were mixed and then added to and mixed with a solution which had been prepared by dissolving 5% by mass of polyvinylidene fluoride (binder) in 1-methyl-2-pyrrolidone in advance, thereby preparing a negative electrode mixture paste. This negative electrode mixture paste was applied onto one surface of a copper foil (collector), dried, and treated under pressure, followed by cutting into a predetermined size, thereby producing a negative electrode sheet. Then, the positive electrode sheet, a micro-porous polyethylene film-made separator, and the negative electrode sheet were laminated in this order, and a nonaqueous electrolytic solution having the composition shown in Table 11 was added thereto, thereby producing 2032 coin-type batteries.

The batteries were evaluated in the same manner as in Example II-1, except that in evaluating the battery, the final charging voltage and the final discharging voltage were set to 3.5 V and 2.5 V, respectively; and that the composition of the nonaqueous electrolytic solution was changed to a predetermined composition. The results are shown in Table 12.

TABLE 12

| | Composition of electrolyte salt Composition of nonaqueous electrolytic solution (Volume ratio of solvent) | $SO_4$ group-containing compound (I) | | Discharge capacity retention rate at −10° C. after high-temperature charging storage at 85° C. (%) |
|---|---|---|---|---|
| | | Kind | Content in nonaqueous electrolytic solution (% by mass) | |
| Example II-23 | 1.1M $LiPF_6$ EC/DCM/MEC (30/40/30) | 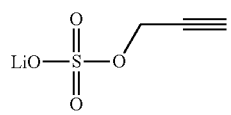 | 0.3 | 64 |
| Comparative Example II-4 | | None | — | 45 |

Example II-24

A lithium secondary battery was produced in the same manner as in Comparative Example II-1, except that a positive electrode produced by adding a predetermined amount of the $SO_4$ group-containing compound represented by the general formula (I-2) relative to 100% of the positive electrode active material was used. The results are shown in Table 13.

Example II-25

A lithium secondary battery was produced in the same manner as in Example II-24, except that the $SO_4$ group-containing compound represented by the general formula (I-2) was not added to the positive electrode but added to the negative electrode. The results are shown in Table 13.

TABLE 13

| | Composition of electrolyte salt Composition of nonaqueous electrolytic solution (Volume ratio of solvent) | $SO_4$ group-containing compound (I) | | | Discharge capacity retention rate at −10° C. after high-temperature charging storage at 85° C. (%) |
|---|---|---|---|---|---|
| | | Kind | Addition site | Content relative to the active material (% by mass) | |
| Example II-24 | 1.2M $LiPF_6$ EC/FEC/DEC/MEC (25/5/45/25) | 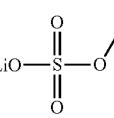 | Positive electrode | 0.2 | 71 |
| Example II-25 | | | Negative electrode | 0.2 | 73 |

In all of the lithium secondary batteries of Examples II-1 to II-21, the electrochemical characteristics in a broad temperature range are remarkably improved as compared with the lithium secondary batteries of Comparative Example II-1 in the case of not adding the $SO_4$ group-containing compound represented by the general formula (I), especially the general formula (I-2) and Comparative Example II-2 in the case of adding dimethyl sulfate, in the nonaqueous electrolytic solution of the present invention. In the light of the above, it has been clarified that the effect of the present invention is a peculiar effect to the case where the $SO_4$ group-containing compound specified in the present invention is contained in the nonaqueous electrolytic solution having an electrolyte salt dissolved in a nonaqueous solvent. In addition, the discharge capacity retention rate of the lithium secondary battery produced under the same conditions as those in Example II-4 after 300 cycles at 55° C. is 68%, and the discharge capacity retention rates of the lithium secondary batteries produced under the same conditions as those in Comparative Example II-1 and Comparative Example II-2 after 300 cycles at 55° C. are 64% and 65%, respectively. Thus, the discharge capacity retention rate after 300 cycles at 55° C. was remarkably improved.

From comparison of Example II-22 with Comparative Example II-3 and comparison of Example II-23 with Comparative Example II-4, the same effect is also seen even in the case of using silicon (elemental substance) Si or lithium titanate for the negative electrode, or the case of using $LiMn_{4.5}Ni_{0.5}O_4$ for the positive electrode, and therefore, it is evident that the effect of the present invention is not an effect relying on a specified positive electrode or negative electrode.

From comparison of Examples II-24 and II-25 with Comparative Example II-1, even in the case of containing the $SO_4$ group-containing compound represented by the general formula (I), especially the general formula (I-2) in a site other than the electrolytic solution, the effect is brought.

Furthermore, the nonaqueous electrolytic solution of the present invention also has an effect for improving discharging properties of a lithium primary battery in a broad temperature range.

<$SO_4$ Group-Containing Compound Represented by the General Formula (I-3)>

Examples III-1 to III-15 and Comparative Examples III-1 to III-2

Production of Lithium Ion Secondary Battery

94% by mass of $LiCo_{1/3}Ni_{1/3}Mn_{1/3}O_2$ and 3% by mass of acetylene black (electroconductive agent) were mixed and then added to and mixed with a solution which had been prepared by dissolving 3% by mass of polyvinylidene fluoride (binder) in 1-methyl-2-pyrrolidone in advance, thereby preparing a positive electrode mixture paste. This positive electrode mixture paste was applied onto one surface of an aluminum foil (collector), dried, and treated under pressure, followed by cutting into a predetermined size, thereby producing a positive electrode sheet. A density of a portion of the positive electrode except for the collector was 3.6 $g/cm^3$.

95% by mass of artificial graphite ($d_{002}$=0.335 nm, negative electrode active material) was added to and mixed with a solution which had been prepared by dissolving 5% by mass of polyvinylidene fluoride (binder) in 1-methyl-2-pyrrolidone in advance, thereby preparing a negative electrode mixture paste. This negative electrode mixture paste was applied onto one surface of a copper foil (collector), dried, and treated under pressure, followed by cutting into a predetermined size, thereby producing a negative electrode sheet. A density of a portion of the negative electrode except for the collector was 1.5 $g/cm^3$.

This electrode sheet was analyzed by means of X-ray diffraction, and as a result, a ratio [I(110)/I(004)] of a peak intensity I(110) of the (110) plane to a peak intensity I(004) of the (004) plane of the graphite crystal was found to be 0.1.

The above-obtained positive electrode sheet, a microporous polyethylene film-made separator, and the above-obtained negative electrode sheet were laminated in this order, and a nonaqueous electrolytic solution having each of compositions shown in Tables 14 to 15 was added thereto, thereby producing laminate-type batteries.

[High-Temperature Storage Test]
<Evaluation of Gas Generation Amount after High-Temperature Storage>

In a thermostatic chamber at 25° C., each of the laminate-type batteries produced by the aforementioned method was charged up to a final voltage of 4.35 V with a constant current of 1 C and under a constant voltage and then charged at a final voltage of 4.35 V under a constant voltage for 7 hours in total. Subsequently, the battery was discharged down to a final voltage of 2.8 V with a constant current of 0.2 C. After repeating this charge/discharge operation for 3 cycles, the battery was charged up to 4.35 V with a constant current of 0.2 C at a high temperature (60° C.) and then stored at a constant voltage of 4.35 V for 3 days. A gas generation amount after storing for 3 days was measured by the Archimedean method. As for the gas generation amount, a relative gas generation amount was examined on the basis of defining the gas generation amount of Comparative Example III-1 as 100%.

The results are shown in Tables 14 to 15.

TABLE 14

| | Composition of nonaqueous electrolytic solution (Volume ratio of solvent) | $SO_4$ group-containing compound (I) Kind | Content in nonaqueous electrolytic solution (% by mass) | Other lithium salt Kind | Content in nonaqueous electrolytic solution (% by mass) | Proportion of compound (I) relative to total mass of the whole of electrolyte salts (%) | Gas generation amount (%) |
|---|---|---|---|---|---|---|---|
| Example III-1 | EC/DEC/MEC (30/45/25) | LiO—S(=O)(=O)—OCH$_2$CF$_3$ | 6 | LiPF$_6$ | 10 | 37.5 | 83 |

TABLE 14-continued

| Composition of nonaqueous electrolytic solution (Volume ratio of solvent) | SO₄ group-containing compound (I) Kind | Content in nonaqueous electrolytic solution (% by mass) | Other lithium salt Kind | Content in nonaqueous electrolytic solution (% by mass) | Proportion of compound (I) relative to total mass of the whole of electrolyte salts (%) | Gas generation amount (%) |
|---|---|---|---|---|---|---|
| Example III-2  EC/MEC (30/70) | | 6 | | 10 | 37.5 | 85 |
| Example III-3  EC/VC/DEC/MEC (29/1/40/30) | | 5 | | 11 | 31.3 | 83 |
| Example III-4  EC/VC/DEC/MEC (29/1/40/30) | | 6 | | 10 | 37.5 | 81 |
| Example III-5  EC/VC/DEC/MEC (29/1/40/30) | | 8 | | 8 | 50 | 83 |
| Example III-6  EC/VC/DEC/MEC (29/1/40/30) | | 10 | | 6 | 62.5 | 86 |
| Example III-7  EC/VC/DEC/MEC (29/1/40/30) | | 16 | | 0 | 100 | 88 |

TABLE 15

| | Composition of nonaqueous electrolytic solution (Volume ratio of solvent) | SO₄ group-containing compound (I) Kind | Content in nonaqueous electrolytic solution (% by mass) | Other lithium salt Kind | Content in nonaqueous electrolytic solution (% by mass) | Proportion of compound (I) relative to total mass of the whole of electrolyte salts (%) | Gas generation amount (%) |
|---|---|---|---|---|---|---|---|
| Example III-8 | EC/VC/DEC/MEC (29/1/40/30) | 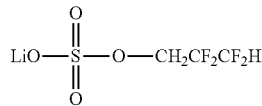 | 6 | LiPF₆ (Class 1) | 10 | 37.5 | 81 |
| Example III-9 | EC/VC/DEC/MEC (29/1/40/30) | 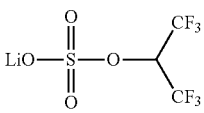 | 6 | | | 37.5 | 82 |
| Example III-10 | EC/VC/DEC/MEC (29/1/40/30) | 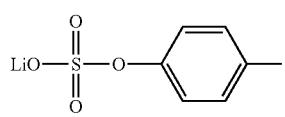 | 6 | | | 37.5 | 84 |
| Example III-11 | EC/FEC/VC/DEC/MEC (19/10/1/45/25) | 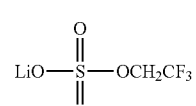 | 6 | LiPF₆ (Class 1) LiBF₆ (Class 1) | 9.5 0.5 | 37.5 | 80 |
| Example III-12 | EC/FEC/VC/DEC/MEC (19/10/1/45/25) | 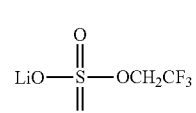 | 6 | LiPF₆ (Class 1) LiN(SO₂F)₂ (Class 2) | 9.5 0.5 | 37.5 | 78 |
| Example III-13 | EC/FEC/VC/DEC/MEC (19/10/1/45/25) | 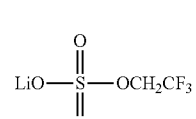 | 6 | LiPF₆ (Class 1) LiSO₃F (Class 3) | 9.5 0.5 | 37.5 | 75 |

TABLE 15-continued

| | Composition of nonaqueous electrolytic solution (Volume ratio of solvent) | SO₄ group-containing compound (I) | | Other lithium salt | | Proportion of compound (I) relative to total mass of the whole of electrolyte salts (%) | Gas generation amount (%) |
|---|---|---|---|---|---|---|---|
| | | Kind | Content in nonaqueous electrolytic solution (% by mass) | Kind | Content in nonaqueous electrolytic solution (% by mass) | | |
| Example III-14 | EC/FEC/VC/DEC/MEC (19/10/1/45/25) | LiO—S(=O)(=O)—OCH₂CF₃ | 6 | LiPF₆ (Class 1) LiPO₂F₂ (Class 4) | 9.5 0.5 | 37.5 | 76 |
| Example III-15 | EC/FEC/VC/DEC/MEC (19/10/1/45/25) | LiO—S(=O)(=O)—OCH₂CF₃ | 6 | LiPF₆ (Class 1) LiPFO (Class 5) | 9.5 0.5 | 37.5 | 77 |
| Comparative Example III-1 | EC/VC/DEC/MEC (29/1/40/30) | None | — | LiPF₆ (Class 1) | 16 | 0 | 100 |
| Comparative Example III-2 | EC/VC/DEC/MEC (29/1/40/30) | LiO—S(=O)(=O)—CF₃ | 6 | LiPF₆ (Class 1) | 10 | 37.5 | 102 |

In all of the lithium secondary batteries of Examples III-1 to III-15, the effect for suppressing the gas generation after the high-temperature storage is remarkably improved as compared with the lithium secondary batteries of Comparative Example III-1 in the case of not adding the SO₄ group-containing compound represented by the general formula (I-3) and Comparative Example III-2 in the case of adding lithium triflate as the lithium salt, in the nonaqueous electrolytic solution of the present invention. In the light of the above, it has been clarified that the effect of the present invention is a peculiar effect to the case where the SO₄ group-containing compound specified in the present invention is contained in the nonaqueous electrolytic solution having an electrolyte salt dissolved in a nonaqueous solvent.

Furthermore, the nonaqueous electrolytic solution of the present invention also has an effect for improving discharging properties of a lithium primary battery in a broad temperature range.

<SO₄ Group-Containing Compound Represented by the General Formula (II)>

Synthesis Example IV-1

Synthesis of Lithium 2,2,3,3-Tetrafluorobutane-1,4-diyl Bis(sulfate) (Compound BA12)

To a slurry mixed liquid of 4.24 g (100 mmoles) of lithium chloride and 100 g of dimethyl carbonate, 11.65 g (100 mmoles) of chlorosulfonic acid was added dropwise at 10° C. or lower over 15 minutes. After stirring at room temperature for 60 minutes, 8.10 g (50 mmoles) of 2,2,3,3-tetrafluorobutane-1,4-diol was added dropwise over 15 minutes. After stirring this solution at room temperature for 3 hours, a crystal was separated by filtration from a reaction solution being a slurry form and dried, thereby obtaining 13.36 g of lithium 2,2,3,3-tetrafluorobutane-1,4-diylbis(sulfate) as a white crystal (yield: 80%).

The obtained lithium 2,2,3,3-tetrafluorobutane-1,4-diyl bis(sulfate) was subjected to ¹H-NMR measurement to confirm its structure. The results are shown below.

¹H-NMR (400 MHz, DMSO-d6): δ (ppm)=4.16 (t, J=14.52 Hz, 4H)

Examples IV-1 to IV-12 and Comparative Examples IV-1 and IV-2

Production of Lithium Ion Secondary Battery

94% by mass of LiCoO₂ and 3% by mass of acetylene black (electroconductive agent) were mixed and then added to and mixed with a solution which had been prepared by dissolving 3% by mass of polyvinylidene fluoride (binder) in 1-methyl-2-pyrrolidone in advance, thereby preparing a positive electrode mixture paste. This positive electrode mixture paste was applied onto one surface of an aluminum foil (collector), dried, and treated under pressure, followed by cutting into a predetermined size, thereby producing a positive electrode sheet. A density of a portion of the positive electrode except for the collector was 3.6 g/cm³.

95% by mass of artificial graphite (d₀₀₂=0.335 nm, negative electrode active material) was added to and mixed with a solution which had been prepared by dissolving 5% by mass of polyvinylidene fluoride (binder) in 1-methyl-2-pyrrolidone in advance, thereby preparing a negative electrode mixture paste. This negative electrode mixture paste was applied onto one surface of a copper foil (collector), dried, and treated under pressure, followed by cutting into a predetermined size, thereby producing a negative electrode sheet. A density of a portion of the negative electrode except for the collector was 1.5 g/cm³.

This electrode sheet was analyzed by means of X-ray diffraction, and as a result, a ratio [I(110)/I(004)] of a peak intensity I(110) of the (110) plane to a peak intensity I(004) of the (004) plane of the graphite crystal was found to be 0.1.

The above-obtained positive electrode sheet, a microporous polyethylene film-made separator, and the above-obtained negative electrode sheet were laminated in this order, and a nonaqueous electrolytic solution having each of compositions shown in Table 16 was added thereto, thereby producing 2032 coin-type batteries.

[Evaluation of Low-Temperature Properties after High-Temperature Charging Storage]

<Initial Discharge Capacity>

In a thermostatic chamber at 25° C., each of the coin-type batteries produced by the aforementioned method was charged up to a final voltage of 4.2 V with a constant current of 1 C and under a constant voltage for 3 hours; the temperature of the thermostatic chamber was then decreased to −10° C.; and the battery was discharged down to a final voltage of 2.75 V with a constant current of 1 C, thereby determining an initial discharge capacity at −10° C.

<High-Temperature Charging Storage Test>

Subsequently, in a thermostatic chamber at 85° C., this coin-type battery was charged up to a final voltage of 4.2 V with a constant current of 1 C and under a constant voltage for 3 hours and then stored for 3 days in a state of keeping at 4.2 V. Thereafter, the resultant was put in a thermostatic chamber at 25° C. and then once discharged down to a final voltage of 2.75 V with a constant current of 1 C.

<Discharge Capacity after High-Temperature Charging Storage>

Furthermore, a discharge capacity at −10° C. after the high-temperature charging storage was then determined in the same manner as the measurement of the initial discharge capacity.

<Low-Temperature Properties after High-Temperature Charging Storage>

The low-temperature properties after the high-temperature charging storage was determined from the following discharge capacity retention rate at −10° C.

Discharge capacity retention rate (%) at −10° C. after high-temperature charging storage=(Discharge capacity at −10° C. after high-temperature charging storage)/(Initial discharge capacity at −10° C.)×100

The results are shown in Table 16.

TABLE 16

| | Composition of electrolyte salt Composition of nonaqueous electrolytic solution (Volume ratio of solvent) | SO$_4$ group-containing compound (II) Kind | Content in nonaqueous electrolytic solution (% by mass) | Discharge capacity retention rate at −10° C. after high-temperature charging storage at 85° C. (%) |
|---|---|---|---|---|
| Example IV-1 | 1.1M LiPF$_6$ EC/DEC (30/70) | LiO-S(=O)$_2$-O-CH$_2$CH$_2$-O-S(=O)$_2$-OLi | 0.3 | 68 |
| Example IV-2 | 1.1M LiPF$_6$ EC/VC/DEC/MEC (29/1/40/30) | | 0.01 | 70 |
| Example IV-3 | 1.1M LiPF$_6$ EC/VC/DEC/MEC (29/1/40/30) | | 0.3 | 76 |
| Example IV-4 | 1.1M LiPF$_6$ EC/VC/DEC/MEC (29/1/40/30) | | 3 | 74 |
| Example IV-5 | 1.1M LiPF$_6$ EC/VC/DEC/MEC (29/1/40/30) | LiO-S(=O)$_2$-O-(CH$_2$)$_4$-O-S(=O)$_2$-OLi | 0.3 | 77 |
| Example IV-6 | 1.1M LiPF$_6$ EC/VC/DEC/MEC (29/1/40/30) | LiO-S(=O)$_2$-O-CH$_2$CH(CH$_3$)-O-S(=O)$_2$-OLi | 0.3 | 74 |
| Example IV-7 | 1.1M LiPF$_6$ EC/VC/DEC/MEC- (29/1/40/30) | LiO-S(=O)$_2$-O-CH$_2$-CH=CH-CH$_2$-O-S(=O)$_2$-OLi | 0.3 | 72 |

TABLE 16-continued

| | Composition of electrolyte salt Composition of nonaqueous electrolytic solution (Volume ratio of solvent) | SO₄ group-containing compound (II) Kind | Content in nonaqueous electrolytic solution (% by mass) | Discharge capacity retention rate at −10° C. after high-temperature charging storage at 85° C. (%) |
|---|---|---|---|---|
| Example IV-8 | 1.1M LiPF₆ EC/VC/DEC/MEC (29/1/40/30) | LiO-S(=O)₂-O-CH₂-C≡C-CH₂-O-S(=O)₂-OLi | 0.3 | 71 |
| Example IV-9 | 1.1M LiPF₆ EC/VC/DEC/MEC (29/1/40/30) | LiO-S(=O)₂-O-CH₂-C(CF₂)(CF₂)-CH₂-O-S(=O)₂-OLi | 0.3 | 78 |
| Example IV-10 | 1.1M LiPF₆ EC/VC/DEC/MEC (29/1/40/30) | LiO-S(=O)₂-O-CH₂-CH(O-S(=O)₂-OLi)-CH₂-O-S(=O)₂-OLi | 0.3 | 69 |
| Example IV-11 | 1.1M LiPF₆ EC/VC/DEC/MEC (29/1/40/30) | LiO-S(=O)₂-O-CH₂CH₂-O-CH₂CH₂-O-S(=O)₂-OLi | 0.3 | 71 |
| Example IV-12 | 1.1M LiPF₆ EC/VC/DEC/MEC (29/1/40/30) | LiO-S(=O)₂-O-CH₂CH₂-S(=O)₂-CH₂CH₂-O-S(=O)₂-OLi | 0.3 | 72 |
| Comparative Example IV-1 | 1.1M LiPF₆ EC/VC/DEC/MEC (29/1/40/30) | None | — | 65 |
| Comparative Example IV-2 | 1.1M LiPF₆ EC/VC/DEC/MEC (29/1/40/30) | CH₃O-S(=O)₂-OCH₃ | 0.3 | 63 |

Example IV-13 and Comparative Example IV-3

A negative electrode sheet was produced by using silicon (elemental substance) (negative electrode active material) in place of the negative electrode active material used in Example IV-1. 80% by mass of silicon (elemental substance) and 15% by mass of acetylene black (electroconductive agent) were mixed and then added to and mixed with a solution which had been prepared by dissolving 5% by mass of polyvinylidene fluoride (binder) in 1-methyl-2-pyrrolidone in advance, thereby preparing a negative electrode mixture paste. Coin-type batteries were produced in the same manner as in Example IV-1, except that this negative electrode mixture paste was applied onto a copper foil (collector), dried, and treated under pressure, followed by cutting into a predetermined size, thereby producing a negative electrode sheet, and that the composition of the nonaqueous electrolytic solution was changed to a predetermined composition, and the batteries were evaluated. The results are shown in Table 17.

TABLE 17

| | Composition of electrolyte salt Composition of nonaqueous electrolytic solution (Volume ratio of solvent) | SO$_4$ group-containing compound (II) Kind | Content in nonaqueous electrolytic solution (% by mass) | Discharge capacity retention rate at −10° C. after high-temperature charging storage at 85° C. (%) |
|---|---|---|---|---|
| Example IV-13 | 1.1M LiPF$_6$ PC/FEC/DEC/MEC (15/15/40/30) | 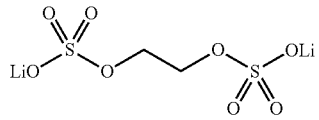 | 0.3 | 68 |
| Comparative Example IV-3 | | None | — | 49 |

Example IV-14 and Comparative Example IV-4

90% by mass of LiMn$_{1.5}$Ni$_{0.5}$O$_4$ and 6% by mass of acetylene black (electroconductive agent) were mixed and then added to and mixed with a solution which had been prepared by dissolving 4% by mass of polyvinylidene fluoride (binder) in 1-methyl-2-pyrrolidone in advance, thereby preparing a positive electrode mixture paste. This positive electrode mixture paste was applied onto one surface of an aluminum foil (collector), dried, and treated under pressure, followed by cutting into a predetermined size, thereby producing a positive electrode sheet. 80% by mass of Li$_4$Ti$_5$O$_{12}$ (negative electrode active material) and 15% by mass of acetylene black (electroconductive agent) were mixed and then added to and mixed with a solution which had been prepared by dissolving 5% by mass of polyvinylidene fluoride (binder) in 1-methyl-2-pyrrolidone in advance, thereby preparing a negative electrode mixture paste. This negative electrode mixture paste was applied onto one surface of a copper foil (collector), dried, and treated under pressure, followed by cutting into a predetermined size, thereby producing a negative electrode sheet. Then, the positive electrode sheet, a micro-porous polyethylene film-made separator, and the negative electrode sheet were laminated in this order, and a nonaqueous electrolytic solution having the composition shown in Table 18 was added thereto, thereby producing 2032 coin-type batteries. The batteries were evaluated in the same manner as in Example IV-1, except that in evaluating the battery, the final charging voltage and the final discharging voltage were set to 3.5 V and 2.5 V, respectively; and that the composition of the nonaqueous electrolytic solution was changed to a predetermined composition. The results are shown in Table 18.

TABLE 18

| | Composition of electrolyte salt Composition of nonaqueous electrolytic solution (Volume ratio of solvent) | SO$_4$ group-containing compound (II) Kind | Content in nonaqueous electrolytic solution (% by mass) | Discharge capacity retention rate at −10° C. after high-temperature charging storage at 85° C. (%) |
|---|---|---|---|---|
| Example IV-14 | 1.2M LiPF$_6$ EC/DEC/MEC (30/40/30) | 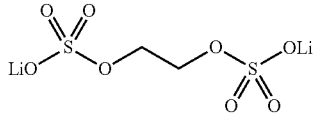 | 0.3 | 59 |
| Comparative Example IV-4 | | None | — | 43 |

Example IV-15

A lithium secondary battery was produced in the same manner as in Comparative Example IV-1, except that a positive electrode produced by adding a predetermined amount of the SO$_4$ group-containing compound represented by the general formula (II) relative to 100% of the positive electrode active material was used. The results are shown in Table 19.

Example IV-16

A lithium secondary battery was produced in the same manner as in Example IV-15, except that the SO$_4$ group-containing compound represented by the general formula (II) was not added to the positive electrode but added to the negative electrode. The results are shown in Table 19.

TABLE 19

| Composition of electrolyte salt Composition of nonaqueous electrolytic solution (Volume ratio of solvent) | SO₄ group-containing compound (II) Kind | Addition site | Content relative to the active material (% by mass) | Discharge capacity retention rate at −10° C. after high-temperature charging storage at 85° C. (%) |
|---|---|---|---|---|
| Example IV-15: 1.1M LiPF$_6$ EC/VC/DEC/MEC (29/1/40/30) | LiO–S(=O)₂–O–CH₂CH₂–O–S(=O)₂–OLi | Positive electrode | 0.1 | 72 |
| Example IV-16 | | Negative electrode | 0.1 | 74 |

In all of the lithium secondary batteries of Examples IV-1 to IV-12, the electrochemical characteristics in a broad temperature range are remarkably improved as compared with the lithium secondary batteries of Comparative Example IV-1 in the case of not adding the SO₄ group-containing compound represented by the general formula (II) and Comparative Example IV-2 in the case of adding dimethyl sulfate, in the nonaqueous electrolytic solution of the present invention. In the light of the above, it has been clarified that the effect of the present invention is a peculiar effect to the case where the lithium salt specified in the present invention is contained in the nonaqueous electrolytic solution having an electrolyte salt dissolved in a nonaqueous solvent.

From comparison of Example IV-13 with Comparative Example IV-3 and comparison of Example IV-14 with Comparative Example IV-4, the same effect is also seen even in the case of using silicon (elemental substance) Si or lithium titanate for the negative electrode, or the case of using LiMn$_{4.5}$Ni$_{0.5}$O$_4$ for the positive electrode, and therefore, it is evident that the effect of the present invention is not an effect relying on a specified positive electrode or negative electrode.

From comparison of Examples IV-15 and IV-16 with Comparative Example IV-1, even in the case of containing the SO₄ group-containing compound represented by the general formula (II) in a site other than the electrolytic solution, the effect is brought.

Furthermore, the nonaqueous electrolytic solution of the present invention also has an effect for improving discharging properties of a lithium primary battery in a broad temperature range.

<SO₄ Group-Containing Compound Represented by the General Formula (III) or (IV)>

Synthesis Example V-1

Synthesis of Ethyl Trimethylsilyl Sulfate (Compound CA10)

To a mixed liquid of 6.00 g (130 mmoles) of ethanol and 50 g of dichloromethane, 16.69 g (143 mmoles) of chlorosulfonic acid was added dropwise at 10° C. or lower over 15 minutes. After stirring at room temperature for 30 minutes, the resultant was again cooled, and 21.21 g (195 mmoles) of chlorotrimethylsilane was added dropwise at 10° C. or lower over 15 minutes. After refluxing this solution for 30 minutes, the resultant was distilled under reduced pressure, thereby obtaining 22.61 g of ethyl trimethylsilyl sulfate from a main fraction distilled at 76.5° C./3 torr (yield: 86%).

The obtained ethyl trimethylsilyl sulfate was subjected to $^1$H-NMR measurement to confirm its structure. The results are shown below.

$^1$H-NMR (400 MHz, CDCl$_3$): δ (ppm)=4.32 (q, J=7.12 Hz, 2H), 1.41 (t, J=7.12 Hz, 3H), 0.43 (s, 9H)

Examples V-1 to V-25 and Comparative Examples V-1 and V-2

Production of Lithium Ion Secondary Battery

94% by mass of LiCoO$_2$ and 3% by mass of acetylene black (electroconductive agent) were mixed and then added to and mixed with a solution which had been prepared by dissolving 3% by mass of polyvinylidene fluoride (binder) in 1-methyl-2-pyrrolidone in advance, thereby preparing a positive electrode mixture paste. This positive electrode mixture paste was applied onto one surface of an aluminum foil (collector), dried, and treated under pressure, followed by cutting into a predetermined size, thereby producing a positive electrode sheet. A density of a portion of the positive electrode except for the collector was 3.6 g/cm³.

95% by mass of artificial graphite (d$_{002}$=0.335 nm, negative electrode active material) was added to and mixed with a solution which had been prepared by dissolving 5% by mass of polyvinylidene fluoride (binder) in 1-methyl-2-pyrrolidone in advance, thereby preparing a negative electrode mixture paste. This negative electrode mixture paste was applied onto one surface of a copper foil (collector), dried, and treated under pressure, followed by cutting into a predetermined size, thereby producing a negative electrode sheet. A density of a portion of the negative electrode except for the collector was 1.5 g/cm³.

This electrode sheet was analyzed by means of X-ray diffraction, and as a result, a ratio [I(110)/I(004)] of a peak intensity I(110) of the (110) plane to a peak intensity I(004) of the (004) plane of the graphite crystal was found to be 0.1.

The above-obtained positive electrode sheet, a microporous polyethylene film-made separator, and the above-obtained negative electrode sheet were laminated in this order, and a nonaqueous electrolytic solution having each of compositions shown in Tables 20 to 22 was added thereto, thereby producing 2032 coin-type batteries.

[Evaluation of Low-Temperature Properties after High-Temperature Charging Storage]

<Initial Discharge Capacity>

In a thermostatic chamber at 25° C., each of the coin-type batteries produced by the aforementioned method was charged up to a final voltage of 4.2 V with a constant current of 1 C and under a constant voltage for 3 hours; the temperature of the thermostatic chamber was then decreased to −10° C.; and the battery was discharged down to a final voltage of 2.75 V with a constant current of 1 C, thereby determining an initial discharge capacity at −10° C.

<High-Temperature Charging Storage Test>

Subsequently, in a thermostatic chamber at 65° C., this coin-type battery was charged up to a final voltage of 4.2 V with a constant current of 1 C and under a constant voltage for 3 hours and then stored for 5 days in a state of keeping at 4.2 V. Thereafter, the resultant was put in a thermostatic chamber at 25° C. and then once discharged down to a final voltage of 2.75 V with a constant current of 1 C.

<Discharge Capacity after High-Temperature Charging Storage>

Furthermore, a discharge capacity at −10° C. after the high-temperature charging storage was then determined in the same manner as the measurement of the initial discharge capacity.

<Low-Temperature Properties after High-Temperature Charging Storage>

The low-temperature properties after the high-temperature charging storage were determined from the following discharge capacity retention rate at −10° C.

Discharge capacity retention rate (%) at −10° C. after high-temperature charging storage=(Discharge capacity at −10° C. after high-temperature charging storage)/(Initial discharge capacity at −10° C.)×100

<High-Temperature Cycle Properties>

In a thermostatic chamber at 65° C., each of the batteries produced by the aforementioned method was treated by repeating a cycle of charging up to a final voltage of 4.2 V with a constant current of 1 C and under a constant voltage for 3 hours and subsequently discharging down to a discharge voltage of 3.0 V with a constant current of 1 C, until it reached 200 cycles. Then, a discharge capacity retention rate after the cycles was determined according to the following equation.

Discharge capacity retention rate (%)=(Discharge capacity after 200 cycles)/(Discharge capacity after 1st cycle)×100

The results are shown in Tables 20 to 22.

TABLE 20

| | Composition of electrolyte salt Composition of nonaqueous electrolytic solution (Volume ratio of solvent) | $SO_4$ group-containing compound (III) Kind | Content in nonaqueous electrolytic solution (% by mass) | Discharge capacity retention rate at −10° C. after high-temperature charging storage at 65° C. (%) |
|---|---|---|---|---|
| Example V-1 | 1.15M $LiPF_6$ EC/DMC/MEC (30/45/25) | —O—S(=O)(=O)—O—Si— | 1 | 74 |
| Example V-2 | 1.15M $LiPF_6$ EC/MEC (30/70) | | 1 | 70 |
| Example V-3 | 1.15M $LiPF_6$ EC/VC/DMC/MEC (29/1/40/30) | | 0.08 | 76 |
| Example V-4 | 1.15M $LiPF_6$ EC/VC/DMC/MEC (29/1/40/30) | | 1 | 80 |
| Example V-5 | 1.15M $LiPF_6$ EC/VC/DMC/MEC (29/1/40/30) | | 3 | 78 |

TABLE 21

| | Composition of electrolyte salt Composition of nonaqueous electrolytic solution (Volume ratio of solvent) | $SO_4$ group-containing compound (III) or (IV) Kind | Content in nonaqueous electrolytic solution (% by mass) | Discharge capacity retention rate at −10° C. after high-temperature charging storage at 65° C. (%) |
|---|---|---|---|---|
| Example V-6 | 1.1M $LiPF_6$ EC/VC/DMC/MEC (29/1/45/25) | \—O—S(=O)(=O)—O—Si— | 1 | 80 |

TABLE 21-continued

| | Composition of electrolyte salt Composition of nonaqueous electrolytic solution (Volume ratio of solvent) | SO₄ group-containing compound (III) or (IV) Kind | Content in nonaqueous electrolytic solution (% by mass) | Discharge capacity retention rate at −10° C. after high-temperature charging storage at 65° C. (%) |
|---|---|---|---|---|
| Example V-7 | 1.1M LiPF$_6$ EC/VC/DMC/MEC (29/1/45/25) | iPrO–S(=O)$_2$–O–Si≡ | 1 | 78 |
| Example V-8 | 1.1M LiPF$_6$ EC/VC/DMC/MEC (29/1/45/25) | 4-F-C$_6$H$_4$–O–S(=O)$_2$–O–Si≡ | 1 | 77 |
| Example V-9 | 1.1M LiPF$_6$ EC/VC/DMC/MEC (29/1/45/25) | F$_3$C–CH$_2$–O–S(=O)$_2$–O–Si≡ | 1 | 79 |
| Example V-10 | 1.1M LiPF$_6$ EC/VC/DMC/MEC (29/1/45/25) | CH$_2$=CH–CH$_2$–O–S(=O)$_2$–O–Si≡ | 1 | 78 |
| Example V-11 | 1.1M LiPF$_6$ EC/VC/DMC/MEC (29/1/45/25) | HC≡C–CH$_2$–O–S(=O)$_2$–O–Si≡ | 1 | 79 |
| Example V-12 | 1.1M LiPF$_6$ EC/VC/DMC/MEC (29/1/45/25) | F–S(=O)$_2$–O–Si≡ | 1 | 79 |
| Example V-13 | 1.1M LiPF$_6$ EC/VC/DMC/MEC (29/1/45/25) | CH$_3$O–CH$_2$CH$_2$–O–S(=O)$_2$–O–Si≡ | 1 | 77 |
| Example V-14 | 1.1M LiPF$_6$ + 0.05M LiPO$_2$F$_2$ EC/VC/DMC/MEC (29/1/45/25) | ≡Si–O–S(=O)$_2$–O–Si≡ | 1 | 85 |
| Example V-15 | 0.7M LiPF$_6$ + 0.45M LiTFSI EC/VC/DMC/MEC (29/1/45/25) | ≡Si–O–S(=O)$_2$–O–Si≡ | 1 | 86 |
| Example V-16 | 1.1M LiPF$_6$ + 0.05M LiBOB EC/FEC/VC/DMC/MEC (19/10/1/45/25) | ≡Si–O–S(=O)$_2$–O–Si≡ | 1 | 84 |

TABLE 22

| | Composition of electrolyte salt Composition of nonaqueous electrolytic solution (Volume ratio of solvent) | SO$_4$ group-containing compound (III) or (IV) Kind | Content in nonaqueous electrolytic solution (% by mass) | Discharge capacity retention rate at −10° C. after high-temperature charging storage at 65° C. (%) |
|---|---|---|---|---|
| Example V-17 | 1.1M LiPF$_6$ EC/VC/DMC/MEC (29/1/45/25) | —O—S(=O)$_2$—O—Si(CH$_3$)$_2$—CH=CH$_2$ | 1 | 77 |
| Example V-18 | 1.1M LiPF$_6$ EC/VC/DMC/MEC (29/1/45/25) | —O—S(=O)$_2$—O—Si(Ph)$_2$—tBu | 1 | 78 |
| Example V-19 | 1.1M LiPF$_6$ EC/VC/DMC/MEC (29/1/45/25) | Me$_3$Si—O—S(=O)$_2$—O—CH(CH$_3$)—C(=O)—O—CH$_2$—C≡CH | 1 | 81 |
| Example V-20 | 1.1M LiPF$_6$ EC/VC/DMC/MEC (29/1/45/25) | —O—S(=O)$_2$—O—Si(CH$_3$)$_2$—O—S(=O)$_2$—O— | 1 | 81 |
| Example V-21 | 1.1M LiPF$_6$ EC/VC/DMC/MEC (29/1/45/25) | —O—S(=O)$_2$—O$^-$ N$^+$(CH$_3$)(CH$_2$CH$_3$)$_3$ | 1 | 73 |
| Example V-22 | 1.1M LiPF$_6$ EC/VC/DMC/MEC (29/1/45/25) | —O—S(=O)$_2$—O$^-$ P$^+$(CH$_3$)(CH$_2$CH$_2$CH$_2$CH$_3$)$_3$ | 1 | 72 |
| Example V-23 | 1.1M LiPF$_6$ EC/VC/DMC/MEC (29/1/45/25) + Lithium methyl sulfate (0.18 wt %) | —O—S(=O)$_2$—O—Na | 0.12 | 77 |
| Example V-24 | 1.1M LiPF$_6$ EC/VC/DMC/MEC (29/1/45/25) | —O—S(=O)$_2$—O—Mg—O—S(=O)$_2$—O— | 0.3 | 76 |
| Example V-25 | 1.1M LiPF$_6$ EC/VC/DMC/MEC (29/1/45/25) | Me$_3$SiO—S(=O)$_2$—O—CH$_2$CH$_2$—O—S(=O)$_2$—OSiMe$_3$ | 1 | 81 |
| Comparative Example V-1 | 1.1M LiPF$_6$ EC/VC/DMC/MEC (29/1/45/25) | None | — | 60 |

TABLE 22-continued

| | Composition of electrolyte salt Composition of nonaqueous electrolytic solution (Volume ratio of solvent) | SO$_4$ group-containing compound (III) or (IV) Kind | Content in nonaqueous electrolytic solution (% by mass) | Discharge capacity retention rate at −10° C. after high-temperature charging storage at 65° C. (%) |
|---|---|---|---|---|
| Comparative Example V-2 | 1.1M LiPF$_6$ EC/VC/DMC/MEC (29/1/45/25) | 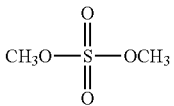 | 1 | 59 |

Example V-26 and Comparative Example V-3

A negative electrode sheet was produced by using silicon (elemental substance) (negative electrode active material) in place of the negative electrode active material used in Example V-1. 80% by mass of silicon (elemental substance) and 15% by mass of acetylene black (electroconductive agent) were mixed and then added to and mixed with a solution which had been prepared by dissolving 5% by mass of polyvinylidene fluoride (binder) in 1-methyl-2-pyrrolidone in advance, thereby preparing a negative electrode mixture paste. Coin-type batteries were produced in the same manner as in Example V-1, except that this negative electrode mixture paste was applied onto a copper foil (collector), dried, and treated under pressure, followed by cutting into a predetermined size, thereby producing a negative electrode sheet, and that the composition of the nonaqueous electrolytic solution was changed to a predetermined composition, and the batteries were evaluated. The results are shown in Table 23.

aluminum foil (collector), dried, and treated under pressure, followed by cutting into a predetermined size, thereby producing a positive electrode sheet.

80% by mass of Li$_4$Ti$_5$O$_{12}$ (negative electrode active material) and 15% by mass of acetylene black (electroconductive agent) were mixed and then added to and mixed with a solution which had been prepared by dissolving 5% by mass of polyvinylidene fluoride (binder) in 1-methyl-2-pyrrolidone in advance, thereby preparing a negative electrode mixture paste. This negative electrode mixture paste was applied onto one surface of a copper foil (collector), dried, and treated under pressure, followed by cutting into a predetermined size, thereby producing a negative electrode sheet.

The above-obtained positive electrode sheet, a microporous polyethylene film-made separator, and the above-obtained negative electrode sheet were laminated in this order, and a nonaqueous electrolytic solution having the composition shown in Table 24 was added thereto, thereby producing 2032 coin-type batteries.

TABLE 23

| | Composition of electrolyte salt Composition of nonaqueous electrolytic solution (Volume ratio of solvent) | SO$_4$ group-containing compound (III) Kind | Content in nonaqueous electrolytic solution (% by mass) | Discharge capacity retention rate at −10° C. after high-temperature charging storage at 65° C. (%) |
|---|---|---|---|---|
| Example V-26 | 1.2M LiPF$_6$ PC/FEC/DMC/MEC (15/15/45/25) | 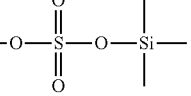 | 1 | 71 |
| Comparative Example V-3 | | None | — | 46 |

Example V-27 and Comparative Example V-4

90% by mass of LiMn$_{1.5}$Ni$_{0.5}$O$_4$ and 6% by mass of acetylene black (electroconductive agent) were mixed and then added to and mixed with a solution which had been prepared by dissolving 4% by mass of polyvinylidene fluoride (binder) in 1-methyl-2-pyrrolidone in advance, thereby preparing a positive electrode mixture paste. This positive electrode mixture paste was applied onto one surface of an The batteries were evaluated in the same manner as in Example V-1, except that in evaluating the battery, the final charging voltage and the final discharging voltage were set to 3.5 V and 2.5 V, respectively; and that the composition of the nonaqueous electrolytic solution was changed to a predetermined composition. The results are shown in Table 24.

TABLE 24

| | Composition of electrolyte salt Composition of nonaqueous electrolytic solution (Volume ratio of solvent) | SO₄ group-containing compound (III) Kind | Content in nonaqueous electrolytic solution (% by mass) | Discharge capacity retention rate at −10° C. after high-temperature charging storage at 65° C. (%) |
|---|---|---|---|---|
| Example V-27 | 1.2M LiPF₆ PC/DEC (30/70) | 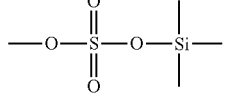 | 1 | 60 |
| Comparative Example V-4 | | None | — | 45 |

Example V-28

A lithium secondary battery was produced in the same manner as in Comparative Example V-1, except that a positive electrode produced by adding a predetermined amount of the compound of the present invention relative to 100% of the positive electrode active material was used. The results are shown in Table 25.

Example V-29

A lithium secondary battery was produced in the same manner as in Example V-28, except that the compound of the present invention was not added to the positive electrode but added to the negative electrode. The results are shown in Table 25.

under the same conditions as those in Example V-4 and Comparative Examples V-1 and V-2 after 200 cycles at 65° C. are 72%, 66%, and 67%, respectively. Thus, in the battery using the nonaqueous electrolytic solution having the SO₄ group-containing compound according to the present invention added thereto, the discharge capacity retention rate after 200 cycles at 65° C. was also remarkably improved relative to Comparative Examples V-1 and V-2.

From comparison of Example V-26 with Comparative Example V-3 and comparison of Example V-27 with Comparative Example V-4, the same effect is also seen even in the case of using silicon (elemental substance) Si or lithium titanate for the negative electrode, it is evident that the effect of the present invention is not an effect relying on a specified positive electrode or negative electrode.

TABLE 25

| | Composition of electrolyte salt Composition of nonaqueous electrolytic solution (Volume ratio of solvent) | SO₄ group-containing compound (IV) Kind | Addition site | Content relative to the active material (% by mass) | Discharge capacity retention rate at −10° C. after high-temperature charging storage at 65° C. (%) |
|---|---|---|---|---|---|
| Example V-28 | 1.1M LiPF₆ EC/VC/DMC/MEC (29/1/45/25) | 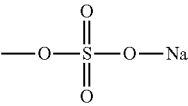 | Positive electrode | 0.3 | 74 |
| Example V-29 | | | Negative electrode | 0.3 | 73 |

In all of the lithium secondary batteries of Examples V-1 to V-25, the electrochemical characteristics in a broad temperature range are remarkably improved as compared with the lithium secondary batteries of Comparative Example V-1 in the case of not adding the SO₄ group-containing compound represented by the general formula (III) or (IV) and Comparative Example V-2 in the case of adding dimethyl sulfate, in the nonaqueous electrolytic solution of the present invention. In the light of the above, it has been clarified that the effect of the present invention is a peculiar effect to the case where the SO₄ group-containing compound according to the present invention is contained in the nonaqueous electrolytic solution having an electrolyte salt dissolved in a nonaqueous solvent. In addition, the discharge capacity retention rates of the lithium secondary battery produced From comparison of Examples V-28 and V-29 with Comparative Example V-1, even in the case of containing the SO₄ group-containing compound according to the present invention in a site other than the electrolytic solution, the effect is brought.

Furthermore, the nonaqueous electrolytic solution of the present invention also has an effect for improving discharging properties of a lithium primary battery in a broad temperature range.

INDUSTRIAL APPLICABILITY

By using the nonaqueous electrolytic solution of the present invention, an energy storage device having excellent electrochemical characteristics in a broad temperature range can be obtained. In particular, when the nonaqueous electrolytic solution of the present invention is used as a nonaqueous electrolytic solution for an energy storage device, such as a lithium secondary battery mounted in a hybrid electric vehicle, a plug-in hybrid electric vehicle, a battery electric vehicle, etc., an energy storage device whose electrochemical characteristics are hardly worsened in a broad temperature range can be obtained.

The invention claimed is:

1. A nonaqueous electrolytic solution, comprising:
an electrolyte salt dissolved in a nonaqueous solvent; and
as an additive, at least one $SO_4$ group-containing compound selected from the group consisting of compounds represented by the following formulae (I) to (IV):

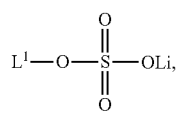
(I)

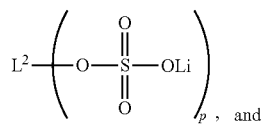
(II)

and

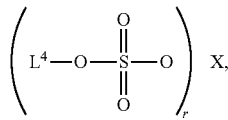
(IV)

wherein:
$L^1$ represents an alkyl group having 1 to 12 carbon atoms, an alkoxyalkyl group having 2 to 12 carbon atoms, an aryl group having 6 to 12 carbon atoms, an alkenyl group having 2 to 7 carbon atoms, an alkynyl group having 3 to 8 carbon atoms, a linear or cyclic ester group having 3 to 18 carbon atoms, a sulfur atom-containing organic group having 1 to 6 carbon atoms, a silicon atom-containing organic group having 4 to 10 carbon atoms, a cyano group-containing organic group having 2 to 7 carbon atoms, a phosphorus atom-containing organic group having 2 to 12 carbon atoms, a $-P(=O)F_2$ group, an alkylcarbonyl group having 2 to 7 carbon atoms, or an arylcarbonyl group having 7 to 13 carbon atoms,
provided that each of the alkyl group, the alkoxyalkyl group, the alkenyl group, the alkynyl group, and the alkylcarbonyl group is straight-chain or branched, and in each of the alkyl group, the alkoxyalkyl group, the aryl group, the ester group, the sulfur atom-containing organic group, the phosphorus atom-containing organic group, the alkylcarbonyl group, and the arylcarbonyl group, at least one hydrogen atom may be substituted with a halogen atom;
$L^2$ represents a p-valent hydrocarbon connecting group optionally comprising contain an ether bond, a thio-ether bond, or an $-S(=O)_2$ bond, provided that at least one hydrogen atom which $L^2$ has may be substituted with a halogen atom;
p is an integer of 2 to 4;
$L^4$ represents an alkyl group having 1 to 12 carbon atoms, an alkenyl group having 2 to 6 carbon atoms, an alkynyl group having 3 to 6 carbon atoms, an alkoxyalkyl group having 2 to 12 carbon atoms, a $-CR^{41}R^{42}C(=O)OR^{43}$ group, or an aryl group having 6 to 12 carbon atoms,
X represents an $SiR^{44}R^{45}$ group, an alkali metal belonging to the third or fourth period of the Periodic Table, or an alkaline earth metal belonging to the third or fourth period of the Periodic Table;
r is an integer of 1 or 2, provided that when X is an alkali metal belonging to the third or fourth period of the Periodic Table, then r is 1, and when X is an $SiR^{44}R^{45}$ group or an alkaline earth metal belonging to the third or fourth period of the Periodic Table, then r is 2;
each of $R^{41}$ and $R^{42}$ independently represents a hydrogen atom, a halogen atom, or an alkyl group having 1 to 4 carbon atoms;
$R^{43}$ represents an alkyl group having 1 to 8 carbon atoms, an alkenyl group having 2 to 6 carbon atoms, or an alkynyl group having 3 to 6 carbon atoms;
each of $R^{44}$ and $R^{45}$ independently represents an alkyl group having 1 to 12 carbon atoms, an alkenyl group having 2 to 3 carbon atoms, or an aryl group having 6 to 8 carbon atoms; and
in each of the alkyl group and the aryl group represented by $L^4$ and the alkyl group represented by each of $R^{41}$ to $R^{43}$, at least one hydrogen atom may be substituted with a halogen atom.

2. The nonaqueous electrolytic solution according to claim 1, wherein a content of the $SO_4$ group-containing compound in the nonaqueous electrolytic solution is 0.001 to 5% by mass in total.

3. The nonaqueous electrolytic solution according to claim 1, wherein the $SO_4$ group-containing compound is a compound represented by formula (I-1) or (I-2):

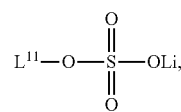
(I-1)

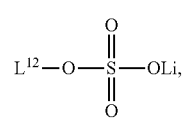
(I-2)

wherein:
$L^{11}$ represents an alkyl group having 1 to 4 carbon atoms, an alkoxyalkyl group having 2 to 12 carbon atoms, or an aryl group having 6 to 12 carbon atoms, provided that in each of the alkyl group, the alkoxyalkyl group, and the aryl group may be straight-chain or branched; and
$L^{12}$ represents a straight-chain or branched alkenyl group having 2 to 7 carbon atoms, a straight-chain or branched alkynyl group having 3 to 8 carbon atoms, a linear or cyclic ester group having 3 to 18 carbon atoms, a linear or cyclic carbonate group having 3 to 18 carbon atoms, a sulfur atom-containing organic group having 1 to 6 carbon atoms, a silicon atom-containing organic group having 4 to 10 carbon atoms, a cyano group-containing organic group having 2 to 7 carbon atoms, a phosphorus atom-containing organic group having 2 to 12 carbon atoms, a $-P(=O)F_2$ group, an alkylcarbonyl group having 2 to 7 carbon atoms, or an arylcarbonyl group having 7 to 13 carbon atoms, provided that each of the alkylcarbonyl group is straight-chain or branched.

4. The nonaqueous electrolytic solution according to claim 3, comprising the SO$_4$ group-containing compound represented by formula (I-1), which is at least one selected from the group consisting of lithium methyl sulfate, lithium ethyl sulfate, lithium propyl sulfate, lithium butyl sulfate, lithium isopropyl sulfate, lithium sec-butyl sulfate, lithium methoxyethyl sulfate, lithium ethoxyethyl sulfate, lithium methoxypropyl sulfate, lithium phenyl sulfate, and lithium 4-methylphenyl sulfate.

5. The nonaqueous electrolytic solution according to claim 3, comprising the SO$_4$ group-containing compound represented by formula (I-2), which is at least one selected from the group consisting of lithium vinyl sulfate, lithium allyl sulfate, lithium propargyl sulfate, lithium 1-oxo-1-ethoxypropan-2-yl sulfate, lithium 1-oxo-1-(2-propynyloxy) propan-2-yl sulfate, lithium 2-(acryloyloxy)ethyl sulfate, lithium 2-(methacryloyloxy)ethyl sulfate, lithium 2-((methoxycarbonyl)oxy)ethyl sulfate, lithium (2-oxo-1,3-dioxolan-4-yl)methyl sulfate, lithium 2-(methanesulfonyl) ethyl sulfate, lithium methanesulfonyl sulfate, lithium 2-(trimethylsilyl)ethyl sulfate, lithium 2-cyanoethyl sulfate, lithium 1,3-dicyanopropynyl 2-sulfate, lithium (diethoxyphosphoryl)methyl sulfate, lithium diethoxyphosphoryl sulfate, lithium dibutoxyphosphoryl sulfate, and lithium difluorophosphoryl sulfate.

6. The nonaqueous electrolytic solution according to claim 1, wherein the nonaqueous solvent comprises a cyclic carbonate and a linear carbonate.

7. The nonaqueous electrolytic solution according to claim 6, wherein the cyclic carbonate comprises at least one selected from the group consisting of ethylene carbonate, propylene carbonate, 1,2-butylene carbonate, 2,3-butylene carbonate, and a cyclic carbonate having a carbon-carbon unsaturated bond or a fluorine atom.

8. The nonaqueous electrolytic solution according to claim 7, wherein the cyclic carbonate comprises a cyclic carbonate having a carbon-carbon unsaturated bond which is at least one selected from the group consisting of vinylene carbonate, vinyl ethylene carbonate, and 4-ethynyl-1,3-dioxolan-2-one.

9. The nonaqueous electrolytic solution according to claim 7, wherein the cyclic carbonate comprises a cyclic carbonate having a fluorine atom which is at one selected from the group consisting of 4-fluoro-1,3-dioxolan-2-one, and trans-4,5-difluoro-1,3-dioxolan-2-one and cis-4,5-difluoro-1,3-dioxolan-2-one.

10. The nonaqueous electrolytic solution according to claim 6, wherein the nonaqueous solvent comprises a linear carbonate which is a symmetric linear carbonate or an asymmetric linear carbonate.

11. The nonaqueous electrolytic solution according to claim 10, wherein the nonaqueous solvent comprises an asymmetric linear carbonate which is at least one selected from the group consisting of methyl ethyl carbonate, methyl propyl carbonate, methyl isopropyl carbonate, methyl butyl carbonate, and ethyl propyl carbonate.

12. The nonaqueous electrolytic solution according to claim 10, wherein the nonaqueous solvent comprises a symmetric linear carbonate which is at least one selected from the group consisting of dimethyl carbonate, diethyl carbonate, dipropyl carbonate, and dibutyl carbonate.

13. The nonaqueous electrolytic solution according to claim 1, further comprising a fluorine-containing compound represented by formula (V):

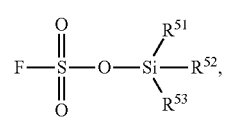

(V)

wherein each of $R^{51}$ to $R^{53}$ independently represents an alkyl group having 1 to 12 carbon atoms, an alkenyl group having 2 to 3 carbon atoms, an aryl group having 6 to 8 carbon atoms, or an $S(=O)_2F$ group.

14. The nonaqueous electrolytic solution according to claim 1, wherein the electrolyte salt comprises at least one lithium salts selected from the group consisting of LiPF$_6$, LiBF$_4$, LiSO$_3$F, lithium trifluoro((methanesulfonyl)oxy)borate, LiPO$_2$F$_2$, LiN(SO$_2$CF$_3$)$_2$, LiN(SO$_2$F)$_2$, lithium bis[oxalate-O,O']borate, and lithium difluorobis[oxalate-O,O'] phosphate.

15. An energy storage device, comprising:
a positive electrode;
a negative electrode; and
the nonaqueous electrolytic solution of claim 1.

16. The energy storage device according to claim 15, wherein an active material of the positive electrode is a complex metal oxide comprising lithium and at least one selected from the group consisting of cobalt, manganese, and nickel, or a lithium-containing olivine-type phosphate comprising at least one selected from the group consisting of iron, cobalt, nickel, and manganese.

17. The energy storage device according to claim 15, wherein an active material of the negative electrode comprises at least one selected from the group consisting of a lithium metal, a lithium alloy, a carbon material capable of absorbing and releasing lithium, tin, a tin compound, silicon, a silicon compound, and a lithium titanate compound.

* * * * *